(12) United States Patent
Ohira et al.

(10) Patent No.: US 7,024,616 B2
(45) Date of Patent: Apr. 4, 2006

(54) METHOD FOR ENCODING/DECODING ERROR CORRECTING CODE, TRANSMITTING APPARATUS AND NETWORK

(75) Inventors: Masaki Ohira, Yokohama (JP); Masahiro Takatori, Yokohama (JP); Takashi Mori, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 996 days.

(21) Appl. No.: 09/771,733

(22) Filed: Jan. 29, 2001

(65) Prior Publication Data

US 2001/0053225 A1   Dec. 20, 2001

(30) Foreign Application Priority Data

Jun. 9, 2000   (JP) ............... 2000-179377

(51) Int. Cl.
*H03M 13/03*   (2006.01)
(52) U.S. Cl. ............... 714/786; 714/772; 714/723
(58) Field of Classification Search ............... 714/786, 714/784, 762, 723, 738, 772
See application file for complete search history.

(56) References Cited

U.S. PATENT DOCUMENTS

| | | | | |
|---|---|---|---|---|
| 5,771,245 A | * | 6/1998 | Zhang | 714/762 |
| 6,188,335 B1 | * | 2/2001 | Roth et al. | 341/59 |
| 6,662,332 B1 | * | 12/2003 | Kimmitt | 714/762 |

FOREIGN PATENT DOCUMENTS

| | | | |
|---|---|---|---|
| EP | 0828248 | 3/1998 | 20/18 |
| JP | 62-221223 | 3/1998 | |
| WO | WO9963540 | 12/1999 | 20/18 |

* cited by examiner

*Primary Examiner*—Albert Decady
*Assistant Examiner*—Fritz Alphonse
(74) *Attorney, Agent, or Firm*—Sofer &Haroun, LLP

(57) ABSTRACT

A client signal having a constant bit rate is segmented every a bytes to create code information blocks. The bit rate of the client signal is increased such that the client signal has the code information block and an empty area comprised of b bytes, and the ratio c/a is equal to or higher than 110% to create a code block 3 comprised of c bytes. The code information block in the code block is encoded such that an error correcting code is included therein to have an encoding gain of 6 dB or higher for a bit error ratio of $10^{-12}$. Associated check bits are placed in the empty area to eventually generate a super FEC signal.

20 Claims, 22 Drawing Sheets

FIG.9A

| Nc | Kc | C1 code | |
|---|---|---|---|
| 256 | 252 | RS-1 code (255,253) | or BCH-2 code (2047,2025) on GF (2048) |
| | 248 | RS-3 code (255,249) | or BCH-5 code (2047,1992) on GF (2048) |
| | 244 | RS-5 code (255,245) | or BCH-7 code (2047,1970) on GF (2048) |
| | 240 | RS-7 code (255,241) | or BCH-10 code (2047,1937) on GF (2048) |
| | 238 | RS-8 code (255,239) | or BCH-12 code (2047,1915) on GF (2048) |
| | 236 | RS-9 code (255,237) | or BCH-13 code (2047,1904) on GF (2048) |
| | 232 | RS-11 code (255,233) | or BCH-16 code (2047,1871) on GF (2048) |
| | 228 | RS-13 code (255,229) | or BCH-19 code (2047,1838) on GF (2048) |
| | 224 | RS-15 code (255,225) | or BCH-22 code (2047,1805) on GF (2048) |
| | 220 | RS-17 code (255,221) | or BCH-25 code (2047,1772) on GF (2048) |
| | 216 | RS-19 code (255,217) | or BCH-28 code (2047,1739) on GF (2048) |
| | 212 | RS-21 code (255,213) | or BCH-31 code (2047,1706) on GF (2048) |
| | 208 | RS-23 code (255,209) | or BCH-34 code (2047,1673) on GF (2048) |
| | 204 | RS-25 code (255,205) | or BCH-37 code (2047,1640) on GF (2048) |
| | 200 | RS-27 code (255,201) | or BCH-39 code (2047,1618) on GF (2048) |
| 255 | 240 | RS-7 code (255,241) | or BCH-10 code (2040,1930) on GF (2048) |
| | 238 | RS-8 code (255,239) | or BCH-11 code (2040,1919) on GF (2048) |
| | 225 | RS-14 code (255,227) | or BCH-21 code (2040,1809) on GF (2048) |
| | 221 | RS-16 code (255,223) | or BCH-24 code (2040,1776) on GF (2048) |
| | 210 | RS-22 code (255,211) | or BCH-32 code (2040,1688) on GF (2048) |
| | 204 | RS-25 code (255,205) | or BCH-36 code (2040,1644) on GF (2048) |
| 128 | 116 | RS-5 code (128,118) | or BCH-8 code (1023,943) on GF (1024) |
| | 112 | RS-7 code (128,114) | or BCH-12 code (1023,903) on GF (1024) |
| | 108 | RS-9 code (128,110) | or BCH-15 code (1023,873) on GF (1024) |
| | 104 | RS-11 code (128,106) | or BCH-18 code (1023,843) on GF (1024) |
| | 100 | RS-13 code (128,102) | or BCH-21 code (1023,813) on GF (1024) |
| 64 | 56 | RS-3 code (64,58) | or BCH-6 code (511,457) on GF (512) |
| | 54 | RS-4 code (64,56) | or BCH-8 code (511,439) on GF (512) |
| | 52 | RS-5 code (64,54) | or BCH-9 code (511,430) on GF (512) |
| | 50 | RS-6 code (64,52) | or BCH-11 code (511,412) on GF (512) |
| 32 | 28 | RS-1 code (32,30) | or BCH-3 code (255,231) on GF (256) |
| | 27 | RS-2 code (32,28) | or BCH-4 code (255,223) on GF (256) |
| | 26 | RS-2 code (32,28) | or BCH-5 code (255,215) on GF (256) |
| | 25 | RS-3 code (32,26) | or BCH-6 code (255,207) on GF (256) |
| 16 | 15 | BCH-1 code (127,120) on GF (128) | |
| | 14 | BCH-2 code (127,113) on GF (128) | |

RS: Reed-Solomon code on GF (256)
RS/BCH-x code x multi errors correcting RS/BCH code
GF: Galois Field

FIG.9B

| Kr | Nr | m | ξ | C2 code |
|---|---|---|---|---|
| 4 | 5 | 1 | — | BCH-1 code (40,34) on GF (64) |
| | | 2 | — | RS-1 code (10,8) or BCH-2 code (80,66) on GF (128) |
| | | 4 | — | RS-2 code (20,16) or BCH-4 code (160,128) on GF (256) |
| | | 8 | — | RS-4 code (40,32) or BCH-7 code (320,257) on GF (512) |
| 7 | 8 | 1 | — | BCH-1 code (63,57) on GF (64) or Convolutional code with coding rate of 7/8 |
| | | 2 | — | RS-1 code (16,14) or BCH-2 code (127,113) on GF (128) |
| | | 4 | — | RS-2 code (32,28) or BCH-3 code (255,231) on GF (256) |
| | | 8 | — | RS-4 code (64,56) or BCH-7 code (511,448) on GF (512) |
| 8 | 9 | 1 | — | BCH-1 code (72,65) on GF (128) |
| | | 2 | — | RS-1 code (18,16) or BCH-2 code (144,128) on GF (256) |
| | | 4 | — | RS-2 code (36,32) or BCH-3 code (288,261) on GF (512) |
| | | 8 | — | RS-4 code (72,64) or BCH-6 code (576,516) on GF (1024) |
| | 10 | 1 | — | RS-1 code (10,8) or BCH-2 code (80,66) on GF (128) |
| | | 2 | — | RS-2 code (20,16) or BCH-4 code (160,128) on GF (256) |
| | | 4 | — | RS-4 code (40,32) or BCH-7 code (320,257) on GF (512) |
| | | 8 | — | RS-8 code (80,64) or BCH-12 code (640,520) on GF (1024) |
| 14 | 15 | 16 | — | RS-8 code (240,224) or BCH-11 code (1920,1799) on GF (2048) |
| | | 17 | — | RS-8 code (255,239) or BCH-12 code (2040,1908) on GF (2048) |
| | 16 | 1 | — | RS-1 code (16,14) or BCH-2 code (127,113) on GF (128) |
| | | 2 | — | RS-2 code (32,28) or BCH-3 code (255,231) on GF (256) |
| | | 4 | — | RS-4 code (64,56) or BCH-7 code (511,448) on GF (512) |
| | | 8 | — | RS-8 code (128,112) or BCH-12 code (1023,448) on GF (1024) |
| | | 16 | — | RS-15 code (255,225) or BCH-23 code (2047,1794) on GF (2048) |
| 15 | 16 | 1 | — | BCH-1 code (127,120) on GF (128) |
| | | 2 | — | RS-1 code (32,30) or BCH-1 code (255,247) on GF (256) |
| | | 4 | — | RS-2 code (64,60) or BCH-3 code (511,484) on GF (512) |
| | | 8 | — | RS-4 code (128,120) or BCH-6 code (1023,963) on GF (1024) |
| | | 16 | — | RS-7 code (255,241) or BCH-11 code (2047,1926) on GF (2048) |
| 16 | 17 | 1 | — | BCH-1 code (136,128) on GF (256) |
| | | 2 | — | RS-1 code (34,32) or BCH-1 code (272,263) on GF (512) |
| | | 4 | — | RS-2 code (68,64) or BCH-3 code (544,514) on GF (1024) |
| | | 8 | — | RS-4 code (136,128) or BCH-5 code (1088,1033) on GF (2048) |
| | 18 | 1 | — | RS-1 code (18,16) or BCH-2 code (144,128) on GF (256) |
| | | 2 | — | RS-2 code (36,32) or BCH-3 code (288,261) on GF (512) |
| | | 3 | — | RS-3 code (54,48) or BCH-5 code (432,387) on GF (512) |
| | | 4 | — | RS-4 code (72,64) or BCH-6 code (576,516) on GF (1024) |
| | | 8 | — | RS-8 code (144,128) or BCH-11 code (1152,1031) on GF (2048) |
| | | 14 | — | RS-14 code (252,224) or BCH-20 code (2016,1796) on GF (2048) |
| | 19 | 1 | — | RS-1 code (19,17) or BCH-3 code (152,128) on GF (256) |
| | | 2 | — | RS-3 code (38,32) or BCH-5 code (304,259) on GF (512) |
| | | 4 | — | RS-6 code (76,64) or BCH-9 code (608,518) on GF (1024) |
| | | 8 | — | RS-12 code (152,128) or BCH-17 code (1216,1029) on GF (2048) |
| a | b | c | — | THE SAME CODE IS APPLICABLE AMONG FOUR CASES SHOWN LEFT. WHERE a,b AND c ARE ARBITRARY INTEGERS β IS ARBITRARY DIVISOR |
| a×β | b×β | c÷β | | |
| c | — | a | b | |
| c÷β | — | a×β | b×β | |

RS: Reed-Solomon code on GF (256)
RS/BCH-x code x multi errors correcting RS/BCH code
GF: Galois Field

METHOD FOR ENCODING/DECODING ERROR CORRECTING CODE, TRANSMITTING APPARATUS AND NETWORK

BACKGROUND OF THE INVENTION

The present invention relates to a method for encoding/decoding an error correcting code, a transmitting apparatus and a network which are suitable for use in optical communication networks.

At present, with the advance of digital signal processing technologies based on LSIs and so on, encoding/decoding technologies for error correcting codes have been used in a wide variety of applications for purposes of ensuring a high signal quality. Particularly, among block codes which have a mathematically well-defined organization, a code called "systematic code" is usually used for engineering purposes due to its transparency to information. The systematic code involves segmenting a series of continuous signals into consistent blocks and encoding each of the segmented blocks, and features that only a check bit is added to an empty region, which has been previously determined within the signals, without manipulating information in the original signals. Traditionally, the Hamming code, BCH code (Bose-Chaudhuri-Hocquenghem code), Reed-Solomon code, and so on have been used as block codes. In the following, the encoding/decoding of an error correcting code will be simply called "encoding/decoding."

The optical fiber communication capable of transmitting a large capacity of data employs relatively high quality transmission paths implemented by optical fibers as media which generally exhibit a bit error ratio below $10^{-10}$. In addition, a redundancy configuration, which comprises protection optical fibers as well as working optical fibers, can realize switching of paths when a signal degradation occurs. For this reason, the optical fiber communication has been systematically constructed on the assumption that no error correcting code is used. As a representative example of the optical fiber communication, there is a digital synchronous transmission system for which global standards have been established. This system has been pervasive in transmissions in wide backbone networks all over the world as SDH (Synchronous Digital Hierarchy) defined by International Telecommunication Union (hereinafter called "ITU-T") in Recommendation G.707 and so on (established in 1988), and SONET (Synchronous Optical Network) defined by American National Standardization Institute (hereinafter called "ANSI") in Standard T1.105 (established in 1991).

An exceptional introduction of an error correcting code into the optical fiber communication is an application of an eight-error-correcting Reed-Solomon code (255, 239) to a frame format defined by ITU-T in Recommendation G.975 (established in 1996) for a submarine optical transmission system. Also, a known example is JP-A-62-221223.

With the presently widespreading Internet communications, the backbone networks and local networks based on optical fiber communications are required to have the abilities of transmitting increasingly larger capacities of data therethrough. The larger data capacities are being realized by time division multiplexing (TDM), wavelength division multiplexing (WDM), and composite technologies based on them.

However, since a higher degree of time division multiplexing causes a reduced bit width of signals and a degradation in the signal quality resulting from the influence of a variety of dispersion or nonlinearity, which are physical properties inherent to the optical fibers, a certain signal quality can be maintained only over a shorter transmission distance. The optical fiber communication often guarantees a bit rate error of $10^{-12}$ or less as the signal quality, and the degree of multiplexing tends to increase with a multiple of two. Also, since the transmittable distance is reciprocally proportional to a square root of the degree of multiplexing for a fixed transmission optical power due to the variance and nonlinearity possessed by an optical fiber, the transmittable distance is reduced to one quarter when the degree of multiplexing becomes twice higher. This reduction corresponds to a degradation loss of 6 dB, so that a compensation for the loss of 6 dB or more is required for increasing the transmission capacity twice as much through the time division multiplexing while the transmission distance is maintained. Thus, for making this compensation for the loss using an error correcting code, a coding gain of 6 dB or more is needed. Since the gain of the eight-error-correcting Reed-Solomon code is 5.4 dB for a bit error ratio of $10^{-12}$ in consideration of an increase in the transmission rate by approximately 7%, this error correcting code alone is not sufficient to realize the above-mentioned double increase of the transmission capacity.

Also, as the degree of wavelength division multiplexing becomes higher, this causes closer wavelength intervals of a plurality of optical signals transmitted through a single optical fiber core line, a degraded separation, and a resulting reduction in the transmission distance, similarly to the aforementioned case. In another case, even if the respective wavelength intervals are sufficiently spaced to prevent the degraded separation, the transmission distance is limited when all of bit rates at respective wavelengths are not the same. Specifically, since the transmission distance is determined by the highest bit rate, an optical signal at a low bit rate can be used only within a limited transmission distance although it can be transmitted to more distant locations. The bit rates of a plurality of optical signals transmitted through a single optical fiber core line may differ depending on the generation, the ratio is approximately two in many cases when viewed within a certain period. Therefore, for reasons similar to the aforementioned example, a high bit rate signal must be compensated for a loss of 6 dB or more in order to maximally extend a transmission distance when optical signals at different bit rates are mixed in the wavelength division multiplexed transmission. However, the eight-error-correcting Reed-Solomon code alone is not sufficient to realize such a compensation.

Further, when the distances between regenerators and between a regenerator and an end terminal (hereinafter simply called the "regenerator interval"), for electrically reproducing digital signals, are increased to reduce the number of the regenerators with the intention of reducing the cost associated with the construction of a network at the cost of an increase in the transmission capacity, the signal quality is more degraded as the regenerator interval is longer. For example, when the regenerator interval is increased four times, a compensation for a loss of 6 dB or more is required, in which case the eight-error-correcting Reed-Solomon code alone is not sufficient to realize such a compensation.

Also, the widespreading Internet communications increase a demand for the so-called Giga bits Ether signal of 1000 Base-SX, 1000 Base-LX, 1000 Base-XC defined by IEEE (Institute of Electrical and Electronics Engineers, Inc.) in Standard 802.3z, resulting in requirements for the transmission of the Giga bits Ether signals over a section of a long distance within a local network and a backbone network which accommodate the Giga bits Ether signals as optical signals. Since the Giga bits Ether signal uses a retransmission requesting scheme called ARQ (Auto Repeat Request) based on an end-to-end communication on a higher layer than a link layer, the Giga bits Ether signal comprises no error correcting code.

An error correcting scheme defined in Recommendation G.975 involves parallellizing an STM-16 signal of SDH having a bit rate of 2.48832 Gbit/s on a bit-by-bit basis, dividing the STM-16 signal into (8×n) subframes each having a length of 238 bits, encoding every eight subframes to an eight-error-correcting Read-Solomon code (255, 239), adding a check bit and information for framing structure to the resulting codes, converting the subframes such that each subframe has 255 bits, interleaving the converted (8×n) subframes on a bit-by-bit basis, and finally constructing an FEC frame having a bit rate of approximately 2.666 Gbit/s. In this event, the value of the above "n" is often set to 16 for facilitating the configuration of an encoder and a decoder, in which case, the processing rate is approximately 21 (exactly 19.44×255/238) Mbit/s for each of the subframes.

However, for rearranging the STM-64 signal of SDH, the bit rate of which is 9.95328 Gbit/s, i.e., four times as high as the foregoing, or the OC-192 signal of SONET in the FEC frame, the signal must be divided into four signals corresponding to STM-16 in parallel. This is because the error correcting scheme according to Recommendation G.975 defines the STM-16 signal as a minimum unit. In this event, therefore, the value of the aforementioned "n" is increased by a factor of four from 16 to 64, so that the processing speed in the encoder and the decoder is the same as approximately 21 Mbit/s as mentioned above, where, however, the scale must be increased four times. For example, with the use of encoders and decoders each having the processing capability of approximately 170 Mbit/s, 16 sets are sufficient for the STM-16 signal, whereas 64 sets are required for the STM-64 signal. Also, with the use of encoder/decoders each having the processing capability of approximately 2.7 Gbit/s, one unit is sufficient for the STM-16 signal, whereas four units are required for the STM-64 signal. The increase in the scale is proportional to an increase in the bit rate. For this reason, when a client signal is STM-64 or the like, a codec unit including an encoder and a decoder will be increased in size, resulting in a higher price of a device which contains the codec unit.

SUMMARY OF THE INVENTION

It is an object of the present invention to provide a method for encoding/decoding an error correcting code suitable for maintaining an original transmission distance when the degree of time division multiplexing for an optical signal is increased, for maximizing a transmission distance for a mixture of optical signals at different bit rates under the wavelength division multiplexing, and for increasing a regenerator interval on condition that the degree of time division multiplexing is not changed, a transmitting apparatus using the method, and a network.

More particularly, the present invention provides a method for encoding/decoding an error correcting code which has a gain sufficient to address a double increase in the degree of time division multiplexing of optical signals transmitted through a single-core optical fiber; maintenance of an original transmission distance when such optical signals are wavelength multiplexed; and realization of a increase in a regenerator interval of optical signals by a factor of four, a transmitting apparatus using the method, and a network.

It is another object of the present invention to provide a method for encoding/decoding an error correcting code which has a high gain while ensuring the mutual connectivity with an existing transmission network into which the eight-error-correcting Reed-Solomon code has been introduced, a transmitting apparatus using the method, and a network.

It is a further object of the present invention to provide a method for encoding/decoding an error correcting code suitable for long distance transmission of a Giga bits Ether signal, a transmitting apparatus using the method, and a network.

It is a further object of the present invention to provide a method for encoding/decoding an error correcting code for limiting an increase in the scale of apparatus when a client signal has a bit rate equal to or higher than that of STM-16, a transmitting apparatus using the same, and a network.

To provide solutions to the problems mentioned above, in a method for encoding an error correcting code according to the present invention, a client signal having a constant bit rate is segmented every a bytes to create code information blocks. The bit rate of the client signal is increased such that it has the code information block and an empty area of b bytes, and the ratio c/a is equal to or higher than 110% to create a code block 3 comprised of c bytes. The code information block in the code block is encoded such that an error correcting code is included therein to have an encoding gain of 6 dB or higher for a bit error ratio of $10^{-12}$. Associated check bits are placed in the empty area to eventually generate a super FEC signal.

Alternatively, a client signal having a constant bit rate is segmented every (Kr×Kc) bytes to create an information block 100. The bit rate of the information block 100 is increased by a factor of {(Nr×Nc)/(Kr×Kc)} to create an coded block 130 comprised of (Nr×Nc) bytes. The information block 100 is interleaved every arbitrary δ bytes Kr times, and placed within (Kr rows×Kc columns) in the coded block 130 to create empty areas 110B, 110C, 120B. Then, each code subblock 10-$i$ ($i$=1, 2, . . . , Kr) in each of Kr rows is subjected to k-error-correction encoding (C1-encoding), and associated check bits are placed in the empty area 110B. Subsequently, every m consecutive bytes are fetched from each of the Kr code subblocks 10-$i$, and each of jm code subblocks 20-$j$ ($j$=1, 2, 3, . . . , jm) comprised of (m×Nr) bytes is subjected to an n-error-correction encoding (C2-encoding), and associated check bits are placed in the empty area 120B.

Then, {(Nr×Nc)/(Kr×Kc)} is scaled to fall within a range of 110% to 130% in percentage notation, and the C1-encoding and the C2-encoding are combined to generate pseudo product codes or concatenated codes to provide a super FEC signal which has an encoding gain of 6 dB or higher for a bit error ratio of $10^{-12}$.

Also, the same frame structure is employed irrespective of the type of client signal.

BRIEF DESCRIPTION OF THE DRAWINGS

Preferred embodiments of the present invention will now be described in conjunction with the accompanying drawings, in which

FIGS. 9A and 9B are tables each showing the types of possible codes for use in the method for encoding an error correcting code according to an eighth embodiment of the present invention;

DETAILED DESCRIPTION OF THE EMBODIMENTS

The present invention will hereinafter be described in detail with reference to the accompanying drawings.

A signal applicable to an embodiment may be a signal which has a fixed bit rate and can be segmented into code blocks of a fixed length, and an error correcting code applied thereto may be a systematic signal. For example, SDH- or SONET-based transmission signal is a signal formatted in frames at a cycle of 125 microseconds, and can be arbitrarily segmented into code blocks of a fixed length, so that this signal satisfies the foregoing definition.

In the following, assume that a Reed-Solomon code is defined as a code on Galois field (256), and a BCH code as a binary BCH code. Also, the Reed-Solomon code is abbreviated as the "RS code" for simplification.

(First Embodiment)

A method of encoding an error correcting code according to one embodiment of the present invention will be described below with reference to FIGS. 1, 2, 20 and 21.

Figure 1:
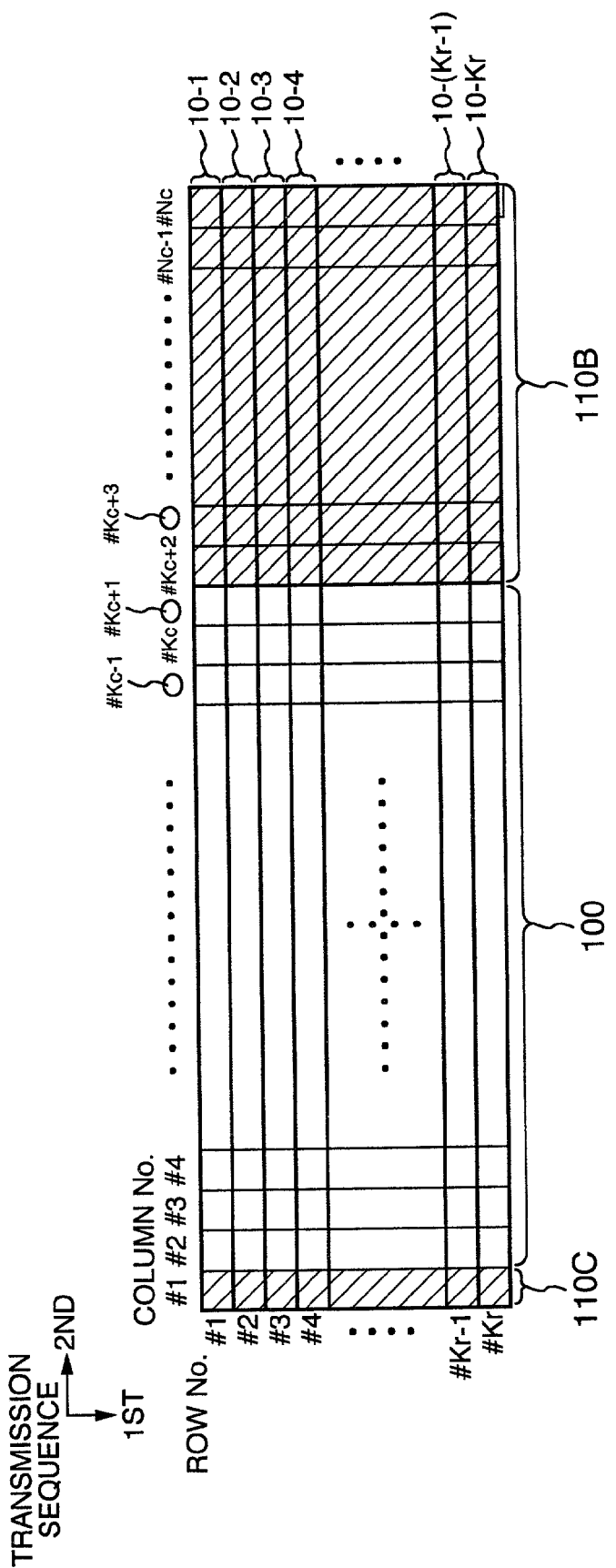
FIG. 1 is a diagram of a frame structure for showing a method for encoding an error correcting code according to a first embodiment of the present invention.
Figure 2:
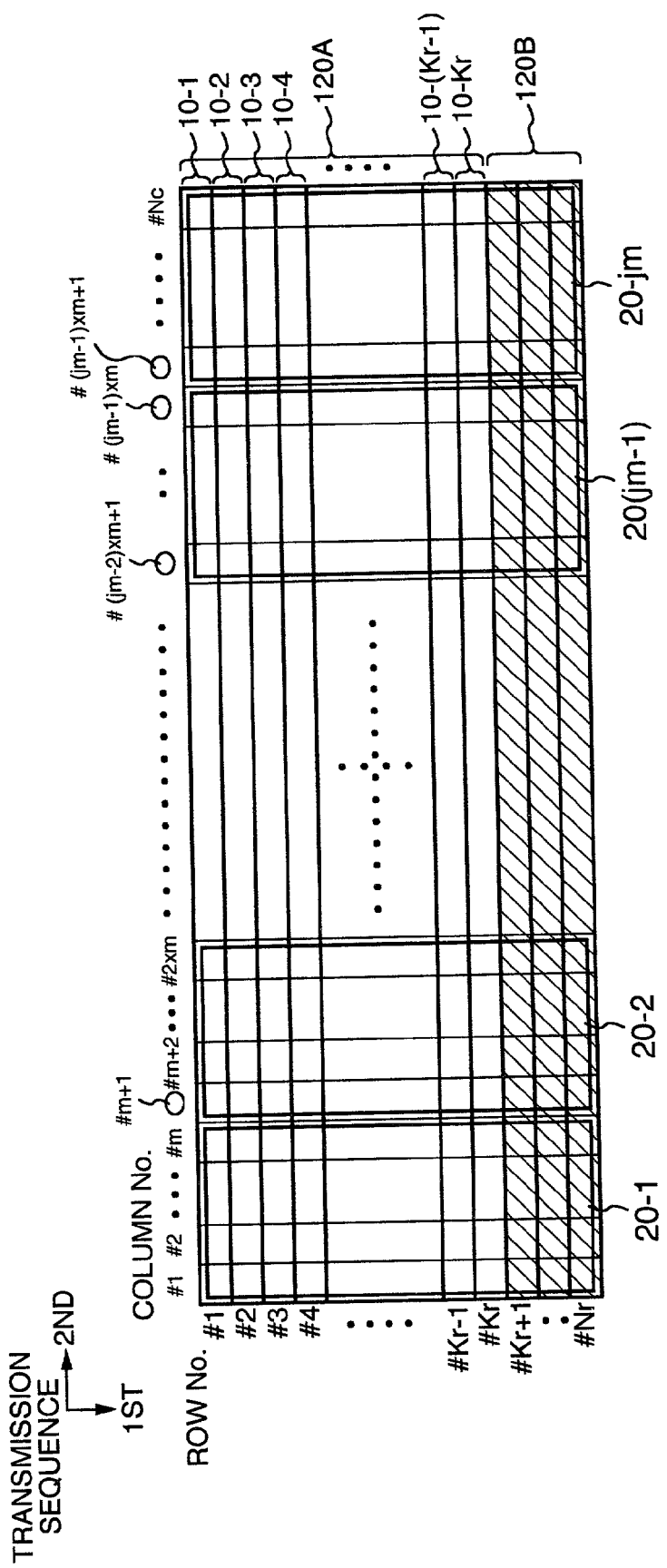
FIG. 2 is a diagram of a frame structure for showing the method for encoding the error correcting code according to the first embodiment of the present invention.

FIGS. 1 and 2 show an information data area and an encoded area in a frame structure.

(Description of Encoding Side)

The following description is directed to an encoding side which receives a client signal from a transmission path on a client side, error-correction-encodes the client signal, and then transmits the resulting signal to a super line side as a super FEC signal.

While the client signal may be either an electric signal or an optical signal in practice, it is assumed herein that, when an optical signal is concerned, the optical signal converted to an electric signal is the client signal.

A client signal having serial bits arranged on a time series basis is segmented into blocks of ($Kr \times Kc$) bytes (called the "first coded information block"), and each of the first coded information blocks is parallelly expanded in Kr stages every predetermined consecutive bytes (every $\delta$ bytes).

Here, Kr, Kc are arbitrary integer values, and for example, Kr=16 and Kc=238. A blank area 100 in FIG. 1 represents parallelly expanded first coded information blocks. Each rectangle field in FIG. 1 indicates one byte, wherein bits in each byte may be oriented in the row direction or in the column direction. Bits oriented in the row direction indicate a parallel expansion of Kr bits, while bits oriented in the column direction indicate a parallel expansion of ($Kr \times 8$) bits. In the following, the first coded information blocks are treated as the parallel expansion in a Kr stage, irrespective of the orientation of bits within a byte, however, with bits oriented in the column direction, ($Kr \times 8$) may be newly processed as Kr in a manner similar to the following.

Figure 20:
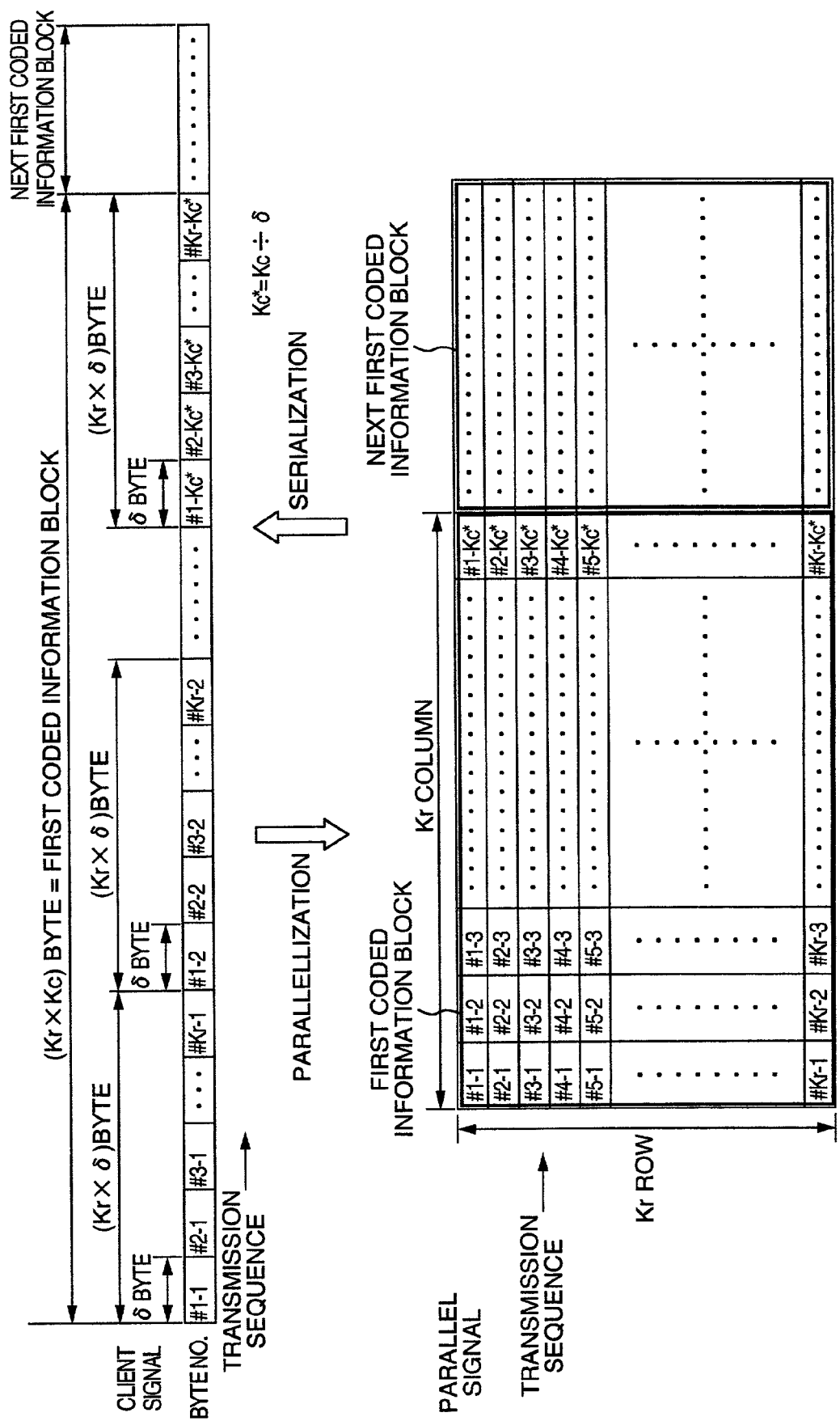
FIG. 20 is a diagram showing a time series relationship among a parallellized signal, a client signal and a super FEC signal.

The parallel expansion may be organized in a sequence such that $\delta$ consecutive bytes on a serial client signal are mapped to serial $\delta$ bytes on the first row in FIG. 1, the next continuous $\delta$ bytes on the client signal are mapped to $\delta$ serial bytes on a second row, and so on. The value of $\delta$ may be arbitrary as long as it is a divisor of Kc. For example, the value of $\delta$ may be one, or the number of bytes for the interleaving in the multiplexing rule when the client signal is a SONET/SDH signal. Further alternatively, in the parallel expansion, every $\delta$ bits may be mapped instead of every $\delta$ bytes. When every $\delta$ bits are mapped, "every $\delta$ bytes" may be replaced with "every $\delta$ bits" in the following description. FIG. 20 shows a relationship between sequences of serial bits and bits of the client signal and those of a parallel signal. In FIG. 20, Kc* indicates a value derived by dividing Kc by $\delta$.

FIG. 20 shows the relationship between sequences of bits and bytes of data when a client signal is converted into a parallellized client signal, and vice versa.

For converting a client signal into a parallellized client signal, $\delta$ consecutive bytes (#1-1) on the serial client signal are mapped to $\delta$ serial bytes (#1-1) of the first row in a parallel signal, and subsequently, every $\delta$ consecutive bytes (#2-1, #3-1, ..., #Kr-1) on the serial client signal are mapped to every δ bytes (#2-1, #3-1, ..., #Kr-1) on second through Kr-th rows of the parallel signal to arrange the (Kr×δ) consecutive bytes on the serial client signal in Kr parallel rows. Similarly to the above, subsequent (Kr×δ) consecutive bytes on the serial client signal are also arranged in Kr parallel rows. Of course, after the signal is parallellized in this way, the respective rows are simultaneously transmitted in an apparatus of interest.

Conversely, for serializing a parallellized client signal to a client signal, the operation reverse to the above is performed.

A first coded information block signal of the parallelly expanded (Kr×Kc) bytes is received, and its bit rate is increased by a factor of (Nc/Kc) to create an empty area of {Kr×(Nc−Kc)} bytes. Areas 110B, 110C indicated by rightwardly inclining hatchings in FIG. 1 correspond to the empty area. Here, Nc is an arbitrary integer value, for example, 255.

Next, regarding each of Kr rows (each having Nc bytes) as a code subblock 10-$i$ ($i$=1, 2, ..., Kr), first encoding is performed independently on each code subblock 10-$i$ (the resulting code is called the "C1 code"). Specifically, a check bit calculation associated with the C1-encoding is performed for a total of (Kc+1) bytes in the first to the (Kc+1)th columns in the area 110A in each of the code subblocks 10-$i$, and resulting check bits are placed in a total of (Nc−Kc−1) bytes in the (Kc+2)th to Nc-th columns in the area 110B.

As an example of the C1 code, a φ-error-correcting RS code (na, ka) or an η-error-correcting BCH code (nb, kb) may be used.

Here, the notation of an RS code (na, ka) generally refers to a symbol having a code length equal to na; a symbol having an information length equal to nb; and a symbol having (na−nb) check bits, wherein one symbol is one byte long in the case of a code on Galois field (256). The notation of a BCH code (nb, kb) means that the code length is nb bits; the information length is kb bits; and the check bits has a length of (nb−kb) bits.

As the foregoing RS codes, it is possible to use a code which has the respective parameters satisfying the following equations when Nc is 255 or less:

$1 \leq \phi \leq [(Nc-Kc-1)/2]$ $na=Nc$ $ka=na-2\times\phi$

Also, when Nc is 256, it is necessary to exclude one byte from a code region. If the first column is excluded, an RS code which has the parameters satisfying the following equations can be used:

$1 \leq \phi \leq [(Nc-Kc-1)/2]$ $na=Nc-1$ $ka=na-2\times\phi$

If the 256th column is excluded, an RS code which has the parameters satisfying the following equations can be used:

$1 \leq \phi \leq [(Nc-Kc-2)/2]$ $na=Nc-1$ $ka=na-2\times\phi$ where [z] represents a maximum integer equal to or less than z.

For the aforementioned BCH code, it is possible to use a BCH code based on Galois field ($2^r$) which has respective parameters satisfying the following equations:

$1 \leq \eta \leq [(Np-Kp-s)/r]$ $nb=Np$ $kb=nb-r\times\phi$ as a minimum integer that satisfies:

$Np<(2^r)$ when Np is not 2's factorial, where Np is the number of bits in each code subblock 10-$i$; and Kp is the number of bits in the second to (Kc+1)th columns in each code subblock 10-$i$.

On the other hand, when Np is $2^r$, it is necessary to exclude one byte from a code region. For example, it is possible to use a BCH code based on Galois field ($2^r$) which has parameters satisfying the following equations:

$1 \leq \eta \leq [(Np-Kp-s-1)/r]$ $nb=Np-1$ $kb=nb-r\times\phi$ with the last one bit selected as the excluded region in each code subblock 10-$i$, where s is one only when the number of parallel expansions in the parallel expansion of Kr stages is (Kr×8) bits, and the code subblock 10-$i$ ($i$=1, 2, ..., Kr×8) is constructed for each bit, and otherwise s is eight.

When the above ka is larger than (Kc+1) or when kb is larger than (Kp+s), a region except for that required for the check bits in the area 110B may be used as an information region for encoding or set to a virtual fixed value.

Also, if a C1 code has the above na less than 255 or nb less than (($2^r$)−1), it is regarded as a shortened code in which logically lacking information is virtually assumed to be zero.

Next, (Kr×Nc) bytes of the entire Kr C1-encoded subblocks 10-$i$ ($i$=1, 2, ..., Kr) are formatted into a second coded information block whose number of parallel stages is increased from Kr to Nr to create an empty area of {(Nr−Kr)×Nc} bytes. In FIG. 2, an area 120A indicated by blank corresponds to the second coded information block, while an area 120B indicated by rightwardly inclined hatchings corresponds to the empty area. Here, Nr is an arbitrary integer value larger than Kr, for example, 18.

Then, after the number of parallel stages has been increased, the resultant signal is segmented into arbitrary m columns, i.e., every (Nr×m) bytes. Each of the columns is designated a code subblock 20-$j$ ($j$=1, 2, ..., jm), and second encoding is performed independently on each of the code subblocks 20-$j$ (the resulting code is called the "C2 code").

Specifically, in each of the code subblocks 20-$j$, a check bit calculation for the C2-encoding is performed on a total of (Kr×m) bytes from the first to Kr-th rows in the area 120A, and resulting check bits are placed in a total of {(Nr−Kr)×m} bytes from the (Kr+1)th to Nr-th rows in the area 120B, where jm represents <Nc/m>, and <z> represents a minimum integer value equal to or larger than z.

Here, alternatively, the check bits of the code subblock 20-$j$ ($j$=1, 2, ..., jm) may be shifted and placed in a check bit area for the next code subblock 20-(j+1), in which case a delay time possibly caused by the encoding can be limited. In this event, the check bits of the last code subblock 20-$jm$ are placed in a check bit area for a code subblock 20-1 of the next frame.

In another way, when m is not a divisor of Nr including one, the number of columns in the last code subblock 20-*jm* results in less than m. In such a case, the code subblock 20-*jm* may be excluded from those subjected to the C2-encoding, or the code subblock 20-*jm* may be C2-encoded together with the next second coded information block without interruption. In the latter case, appropriate encoding/decoding can be realized by inserting a particular framing pattern as described later in a method of using the first column.

As an example of the C2 code, a λ-error-correcting RS code (nd, kd) or a ρ-error-correcting BCH code (ne, ke) may be used.

As the above RS code, it is possible to use a code which has the respective parameters satisfying the following equations when Nr is equal to or less than 255:

$$1 \leq \lambda \leq [(Nr-Kr) \times m/2]$$

$$nd=Nr$$

$$kd=nd-2\times\lambda$$

On the other hand, when Nr is 256, one byte must be excluded from the code region, wherein it is possible to use an RS code which has the respective parameters satisfying the following equations:

$$1 \leq \lambda \leq [\{(Nr-Kr)\times m-1\}/2]$$

$$nd=Nr-1$$

$$kd=nd-2\times\lambda$$

while predetermined bytes in the area 120B are chosen as an excluded region.

For the BCH code, on the other hand, it is possible to use a BCH code based on Galois field ($2^r$) which has the respective parameters satisfying the following equations:

$$1 \leq \rho \leq [\{(Nq-Kq)/r]$$

$$ne=Nq$$

$$ke=ne-r\times\rho$$

as a minimum integer which satisfies:

$$Nq<(2^r)$$

when Nq is not 2's fractional, where Nq is the number of bits in each of the code subblocks 20-*j*, and Kq is the number of bits in the first to Nr-th rows in each of the code subblocks 20-*j*.

On the other hand, when Np is $2^r$, one bit must be excluded from a code region, and it is possible to use a BCH code based on Galois field ($2^r$) which has the respective parameters satisfying the following equations:

$$1 \leq \rho \leq [\{(Nq-Kq-1)/r]$$

$$ne=Nq-1$$

$$ke=ne-r\times\rho$$

while predetermined bytes in the area 120B are chosen as an excluded region.

When the above kd is larger than (Kr×m) or when ke is larger than Kq, a region except for that required for the check bits in the area 120B may be used as an information region for encoding or set to a virtual fixed value.

Also, if a C2 code has the above nd less than 255 or ne less than (($2^r$)−1), it is regarded as a shortened code in which logically lacking information is virtually assumed to be zero.

Figure 21:
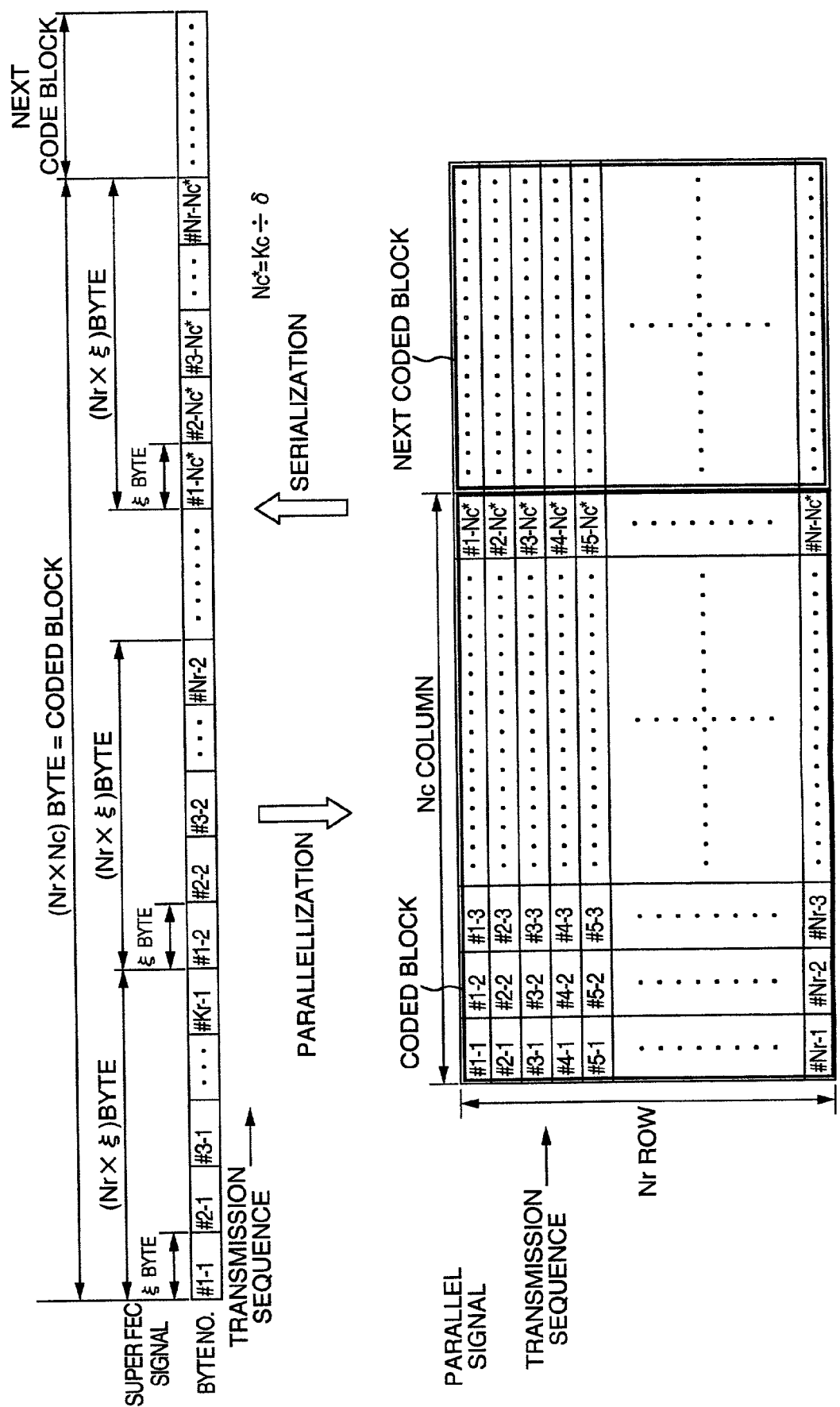
FIG. 21 is a diagram showing a time series relationship among a parallellized signal, a client signal and a super FEC signal.

Then, (Nr×Nc) bytes of a coded block 130, which has undergone the C1-encoding and the C2-encoding as described above, is interleaved in Nr stages every ε bytes from a row to another in the order reverse to the order in which the first coded information block was initially expanded in parallel, to convert the coded block 130 to a digital signal which has serially arranged bits on a time series basis. After the resulting digital signal is scrambled as required, it is transmitted to the super line side as a super FEC signal. Here, the interleaving is performed in a sequence such that ε consecutive bytes on the first row in FIG. 2 are mapped to ε consecutive bytes on the serial digital signal, ε consecutive bytes on the second row are mapped to the next ε consecutive bytes on the serial digital signal, and so on. The value of ε may be arbitrary as long as it is a divisor of Nc, for example, it may be one, identical to δ, or the number of bytes for the interleaving in the multiplexing rule when the client signal is a SONET/SDH signal. Further alternatively, in the digital conversion, every ε bits may be mapped instead of every ε bytes. When every ε bits are mapped, "every ε bytes" may be replaced with "every ε bits" in the aforementioned and following descriptions. FIG. 21 shows a relationship between sequences of serial bits and bytes of the parallel signal and those of a serialized super FEC signal. In FIG. 21, Nc* indicates a value derived by dividing Nc by δ.

FIG. 21 shows the relationship between sequences of bits and bytes of data when a super FEC signal is converted into a parallel signal, and vice versa.

For converting a super FEC signal to a parallel signal, ε consecutive bytes (#1-1) on the serial super FEC signal are mapped to ε serial bytes (#1-1) on the first row of the parallel signal, and subsequently, every ε consecutive bytes (#2-1, #3-1, . . . , #Nr-1) on the super FEC signal are mapped to every ε bytes (#2-1, #3-1, . . . , #Nr-1) on the second through Nr-th rows of the parallel signal to arrange the consecutive (Nr×ε) bytes on the super FEC signal in Nr parallel rows. Similarly to the above, subsequent consecutive (Nr×ε) bytes on the super FEC signal are also arranged in Nr parallel rows. Of course, after the signal is parallellized in this way, the respective columns are simultaneously transmitted in an apparatus of interest.

Conversely, for serializing a parallel signal to a super FEC signal, the operation reverse to the above is performed.

It can be seen that the parallel signal shown in FIG. 20, which has added thereto the check bits for the C1-encoding and the check bits for the C2-encoding, appears to be the parallel signal shown in FIG. 21.

As a result, the bit rate of the super FEC signal is {(Nr/Kr)×(Nc/Kc)} times as high as the bit rate of the client signal. It should be noted that the scrambling may be performed as appropriate in parallel. For example, the scrambling may be performed on a parallellized signal in Nr stages before it is interleaved.

In the foregoing description, after the client signal at a fixed bit rate has been segmented into first coded information blocks, each of which is (Kr×Kc) byes long, the bit rate may be increased at a time by a factor of {(Nr×Nc)/(Kr×Kc)} to correspond to the coded block 130 of (Nr×Nc) bytes long. Then, the first coded information blocks of (Kr×Kc) bytes long may be interleaved Kr times on a byte-by-byte basis, and placed in a region comprised of (Kr rows×Kc columns), which corresponds to the coded block 130, to create empty areas 110B, 110C, 120B.

(Method for Using First Column and Method for Inserting Information into First Column)

Into the first column in FIGS. 1, 2, a framing pattern, and overhead for OAM&P (Operation, Administration, Maintenance and Provisioning) of a transmission network are inserted for establishing synchronization on the reception side. Specifically, at a stage after increasing the bit rate of the first coded information block having (Kr×Kc) bytes by a factor of (Nc/Kc), the framing pattern is inserted into a portion or the entirety of the first column, and the overhead for OAM&P of the transmission network is inserted into the remaining area. It should be noted that the overhead for OAM&P may not be essentially inserted.

Assume herein that at least two types or more of predetermined fixed values are inserted for the framing pattern, in which case the same pattern values are sequentially arranged in an interleaving direction. For example, the same value (F6) hex as the A1 byte defined in SONET or SDH is inserted into a framing area F1 of ix bytes long from the first to ix-th rows, while the same value (28) hex as the A2 byte defined in SONET or SDH is inserted into a framing area F2 of (iy−ix) bytes long from (ix+1)th to iy-th rows. Here, (z) hex represents a value in hexadecimal notation. Also, ix and iy are arbitrary integer values which satisfy $1 \leq ix \leq iy \leq Nr$, where iz may be an arbitrary integer value in a range of one to [Nr/2], so that (ix, iy)=(iz,iz×2) is satisfied.

Of course, the framing pattern values may be other than the foregoing, and are preferably pattern values which have the least possible repetitions of the same values.

In another way, a plurality (p) of second coded information blocks or a plurality (p) of coded blocks may be chosen to be a single multiframe, wherein a previously determined framing pattern may be inserted into an area assigned to the top second coded information block in the single multiframe or a portion or the entirety of the first column in the plurality of encoded blocks, while the overhead for OAM&P of a transmission line may be inserted into the remaining area and into the first column of each of second to p-th blocks.

Further, when m is not a divisor of Nr including one, and the last code subblock 20-jm in the current second coded information block undergoes the C2-encoding together with the next second coded information block without interruption, a framing pattern set A is inserted into the first column in the current second coded information block, and a framing pattern set B different from the framing pattern set A is inserted into the first column of each of the next second coded information block to a second coded information block in which a certain code subblock 20-jp ($1 \leq jp \leq jm$) ends exactly on the Nr-th column. The decoding side can detect a second coded information block in which a code subblock 20-1 begins from the first column by finding the framing pattern set A, so that an appropriate decoding operation can be realized by beginning an decoding operation at the time this block position is first detected. As an example of the framing pattern set A, a value (F6) hex may be inserted into the framing area F1, and a value (28) hex may be inserted into the framing area F2. In this event, as an example of the framing pattern set B, a value (AA) hex may be inserted into the framing area F1, and a value (33) hex may be inserted into the framing area F2.

Alternatively, the overhead for OAM&P of a transmission network may be inserted instead of the framing pattern set B.

Also, when the super FEC signal is scrambled as described above, the scrambling is omitted in the areas in which the framing patterns are inserted.

(Description of Decoding Side)

Now, description will be made on the decoding side which receives and decodes a super FEC signal and then transmits the decoded signal to a communication path on the client side as a client signal.

On the decoding side, a signal is processed in the order reverse to the encoding side. After a super FEC signal, encoded as described above, is received through a transmission line from the super line side and frame-synchronization is established, the resulting signal is descrambled as required, and each of encoded blocks having (Nr×Nc) bytes is parallelly expanded (de-interleaved) in Nr stages every $\epsilon$ bytes. The entire region in FIG. 2 corresponds to the coded blocks that have been parallelly expanded. It should be noted that the frame synchronization and descrambling may be performed adequately in parallel. For example, the coded blocks may be parallelly expanded in Nr stages every $\epsilon$ bytes at this stage.

Here, the de-interleaving is performed in a sequence such that $\epsilon$ consecutive bytes on a serial super FEC signal are mapped to $\epsilon$ serial bytes on the first row in FIG. 2, the next $\epsilon$ consecutive bytes on the super FEC signal are mapped to $\epsilon$ serial bytes on the second row, and so on, as shown in FIG. 21.

Subsequently, for jm code subblocks 20-j (j=1, 2, . . . , jm), C2 codes are decoded in the order in which these code blocks have been received (called the "C2 decoding").

Next, a check bit area 120B for the C2 code of {(Nr−Kr)×Nc} bytes long in the jm C2-decoded code subblocks 20-j (j=1, 2, . . . , jm) are terminated for erasure, or completely ignored in a subsequent process.

Next, C1 codes are decoded independently for Kr coded subblocks 10-i (i=1, 2, . . . , Kr) after the C2 decoding (called the "C1 decoding").

Finally, the bit rate of the C1-decoded code subblocks 10-i (i=1, 2, . . . , Kr) is reduced by a factor of (Kc/Nc), and the check bit area for the C1 code of {Kr×(Nc−Kc)} bytes long, the framing pattern area and the overhead area are erased. Then, the code subblocks 10-i are interleaved every δ bytes from the first to Kr-th rows in FIG. 1 from one row to another in Kr stages to restore an original client signal which has its bits serially arranged in a time serial manner. If necessary, the restored client signal is converted into an optical signal which is then outputted to the transmission path on the client side. Here, the interleaving is performed in a sequence such that δ consecutive bytes on the first row in FIG. 1 are mapped to δ consecutive bytes on the serial client signal, δ consecutive bytes on the second row are mapped to the next δ consecutive bytes on the serial client signal, and so on, as shown in FIG. 20.

(Description of Separation/Termination of Overhead, and Performance Monitoring Method)

Assume that the processing involved in separation/termination of the overhead for OAM&P of a transmission network is performed at a particular position after the frame synchronization has been established, and before the bit rate is reduced for the C1-decoded code subblocks 10-i (i=1, 2, . . . , Kr).

For monitoring the performance such as the number of bit errors and a bit error ratio on a transmission network, a BIP (Bit Interleaved Parity) parity may be added to the overhead for OAM&P, such that the performance can be monitored on the decoding side based on the number of error bits which can be detected by matching the BIP parity both or either of before decoding and after decoding. Alternatively, the performance may be monitored directly based on the number of error bits which were corrected in a decoder. Further alternatively, when either the C1 code or the C2 code is a Reed-Solomon code or a BCH code and its generator polynomial G(z) includes a factor (z+1), the performance may be monitored using the result of a syndrome calculation associated with $\alpha$ to zero-th power in the decoder. This monitoring utilizes the fact that the syndrome calculation associated with $\alpha$ to zero-th power has a function equivalent to the BIP parity matching. Here, $\alpha$ is a primitive element of Galois field ($2^n$) which is the basis for the Reed-Solomon code and BCH code.

In another way, threshold values may be set for the number of bit errors and the bit error ratio from an external control system, such that the actual number of bit errors and bit error ratio found by the foregoing performance monitoring method are compared with the thus set threshold values, respectively, and the external control system is notified of degradation alarm if any threshold value is exceeded.

The method for encoding a generator polynomial for the RS code and BCH code, check bit calculating method, decoding algorithm, i.e., syndrome calculating method, method for calculating an error position and error value based on the syndrome, and method for compensating for code shortening are well known, so that detailed description thereon is omitted.

The first embodiment can facilitate the encoding of an error correcting code which has a sufficient gain of 6 dB or more for a bit error ratio of $10^{-12}$. As a result, it is possible to readily encode an error correcting code which is suitable for maintaining a transmission distance when the degree of multiplexing is increased in the time division multiplexing, maximizing the transmission distance for a mixture of optical signals at different bit rates in the wavelength division multiplexing, and increasing a regenerator interval on condition that the degree of multiplexing is not changed in the time division multiplexing.

(Second Embodiment)

Figure 3:
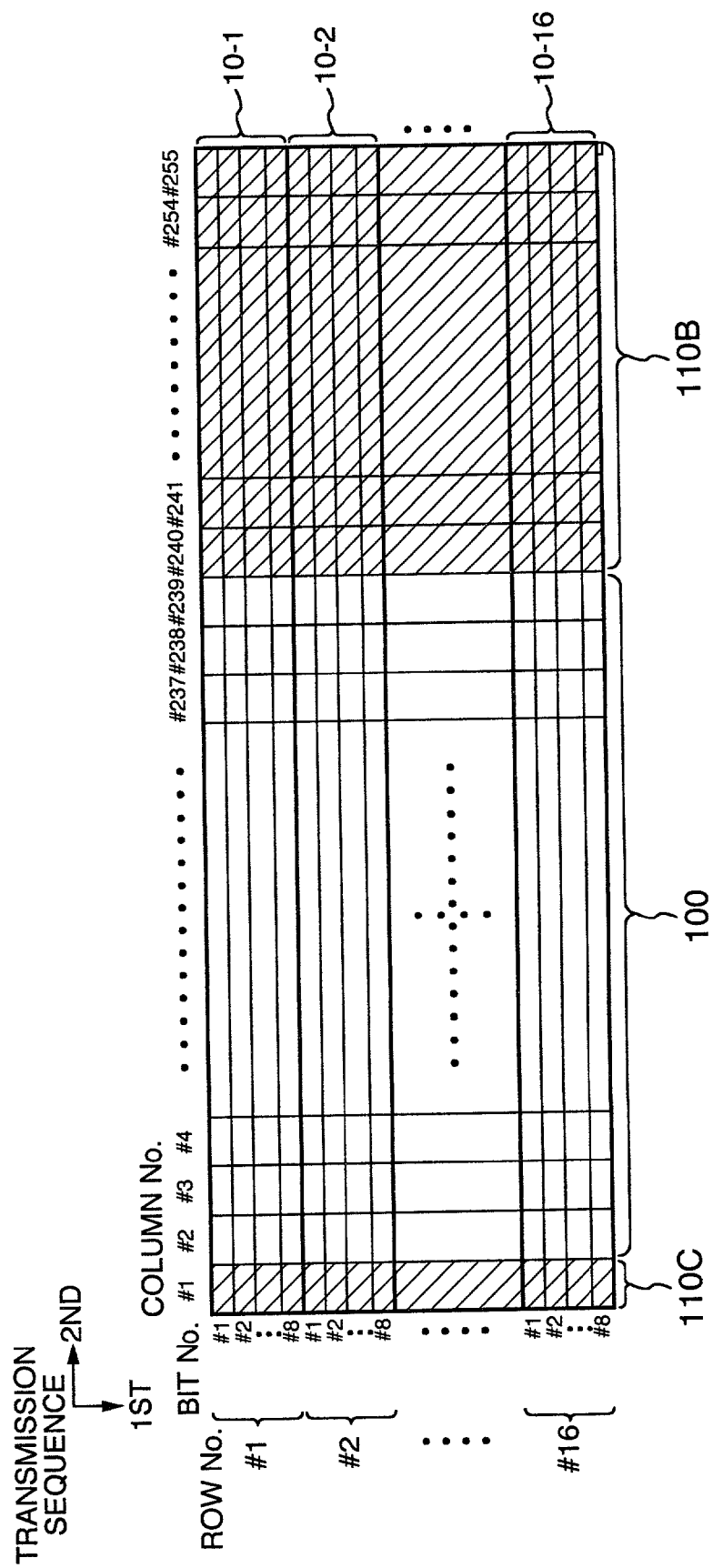
FIG. 3 is a diagram of a frame structure for showing a method for encoding an error correcting code according to a second embodiment of the present invention.
Figure 4:
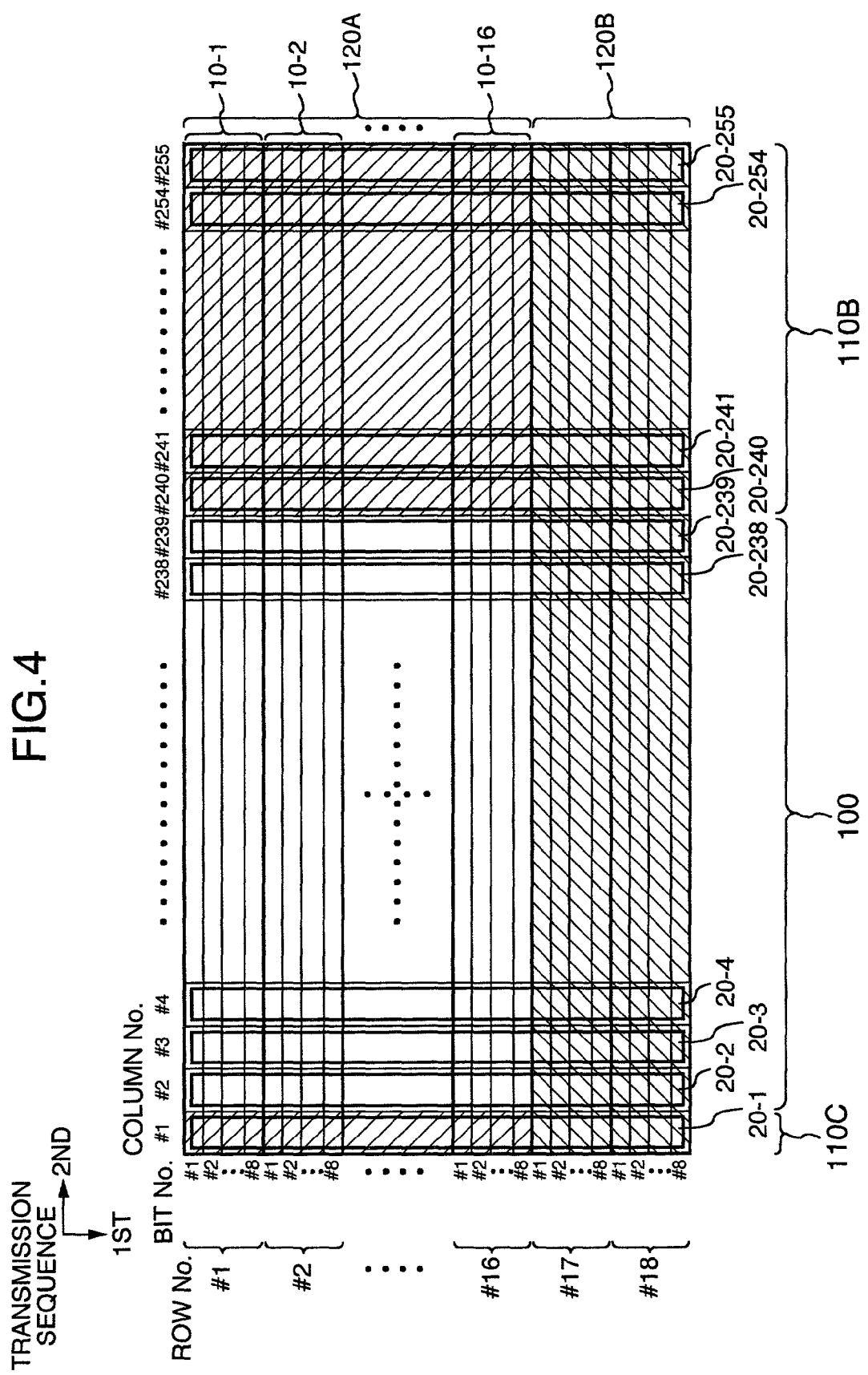
FIG. 4 is a diagram of a frame structure for showing the method for encoding an error correcting code according to the second embodiment of the present invention.

A second embodiment of the method for encoding an error correcting code according to the present invention is shown in FIGS. 3 and 4. Here, FIGS. 3 and 4 each show an area for coded data in a frame structure.

The embodiment shown in FIGS. 3, 4, which are similar to the embodiment shown in FIGS. 1, 2, respectively, is a particular case where Kc=238, Nc=255, Kr=16, and Nr=18.

Also, with $\delta$=1, a client signal is parallellized to 16 bytes on a byte-by-byte basis. Each of the parallellized 16 bytes corresponds to 16 rows. Also, each byte is parallellized on a bit-by-bit basis, so that the client signal is parallellized to 128 row in consequence.

When code subblocks 10-$i$ for the C1-encoding comprise 16 subblocks each having a length of 255 bytes corresponding to each of 16 rows, either of the following two can be employed as the C1 code:
  an eight-error-correcting RS code (255, 239); and
  an eleven-error-correcting shortened BCH code (2040, 1919) based on Galois field (2048).

Of course, a code having a lower correcting capability may also be used.

In another way, when the code subblocks 10-$i$ for the C1-encoding comprise 128 subblocks each having a length of 255 bits corresponding to 128 parallellized bits, the following may be employed as the C1 code:
  a double-error-correcting BCH code (255, 239) based on Galois field (256)

In FIG. 4, with m set to one, 255 code subblocks 20-$j$ for the C2-encoding exist, wherein each code subblock has its bits arranged serially in the column direction. In this case, either of the following two can be employed as the C1 code:
  a single-error-correcting shortened RS code (18, 16); and
  a double-error-correcting shortened BCH code (144, 128) based on Galois field (256).

Alternatively, when m is set to two to create 128 code subblocks 20-$j$ for the C2-encoding, and one column lacking in the last code subblock 20-128 is regarded virtually as zero, either of the following two may be employed as the C2 code:
  a double-error-correcting shortened RS code (36, 32); and
  a triple-error-correcting BCH code (288, 261) based on Galois field (512).

Further alternatively, when m is set to eight to create 32 code subblocks 20-$j$ for the C2-encoding, and one column lacking in the last code subblock 20-32 is regarded virtually as zero, either of the following two may be employed as the C2 code:
  an eight-error-correcting shortened RS code (144, 128); and
  an eleven-error-correcting shortened BCH code (1152, 1031) based on Galois field (2048).

The bite rate of a super FEC signal in the second embodiment is approximately 1.2054 times as high as that of a client signal.

The second embodiment can facilitate the encoding of an error correcting code which has a sufficient gain of 8 dB for a bit error ratio of $10^{-12}$. As a result, it is possible to readily encode an error correcting code which is suitable for maintaining a transmission distance when the degree of multiplexing is increased in the time division multiplexing, maximizing the transmission distance for mixed optical signals at different bit rates in the wavelength division multiplexing, and increasing a regenerator interval on condition that the degree of multiplexing is not changed in the time division multiplexing.

(Third Embodiment)

Figure 5:
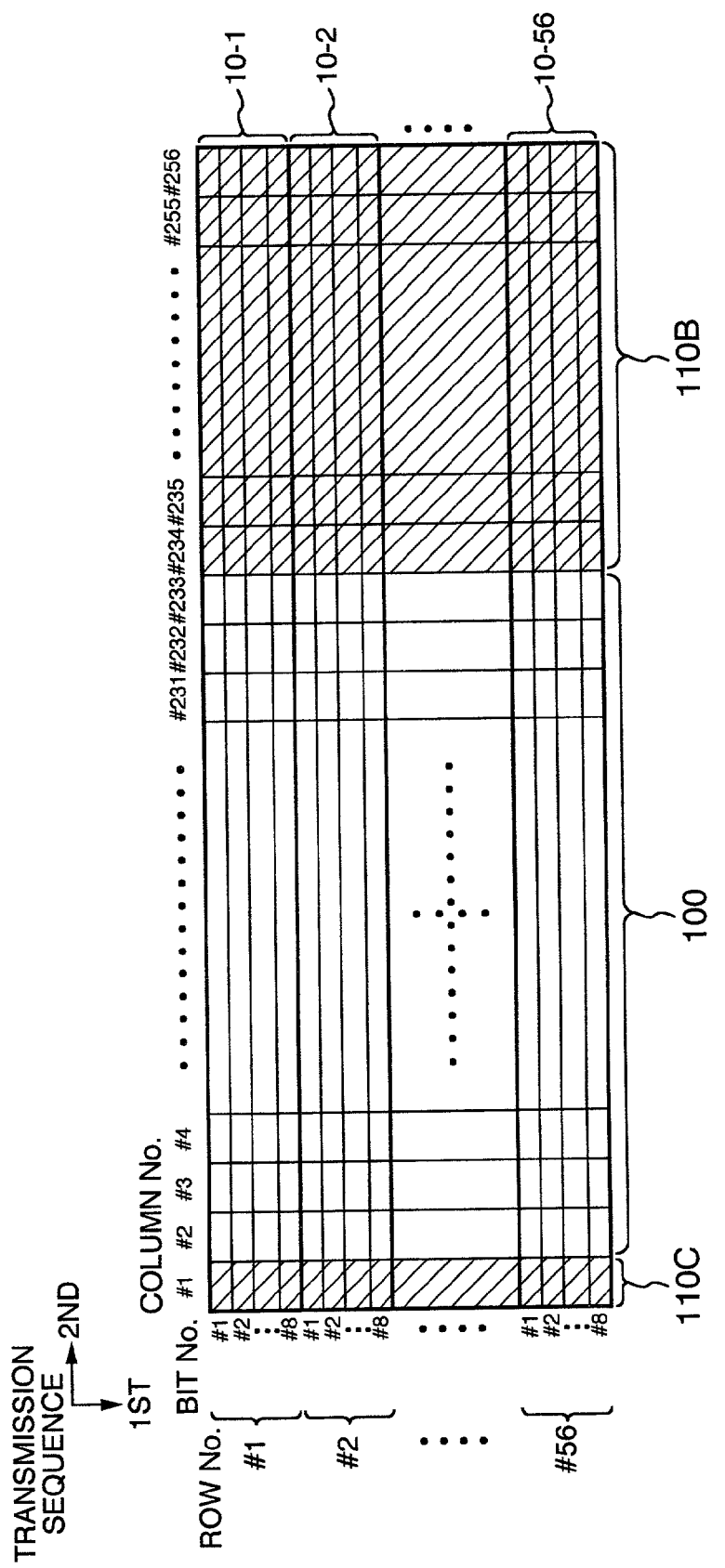
FIG. 5 is a diagram of a frame structure for showing a method for encoding an error correcting code according to a third embodiment of the present invention.
Figure 6:
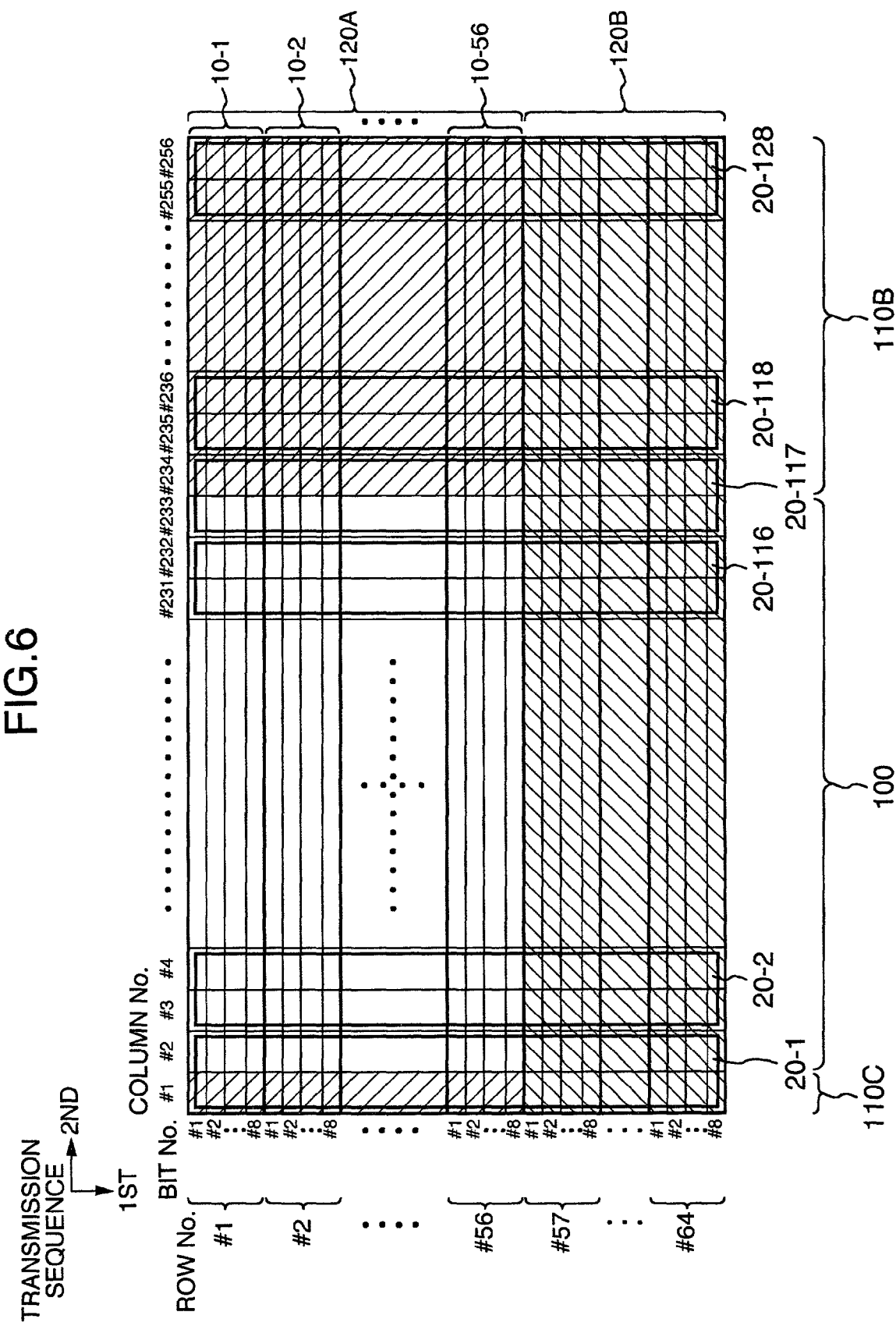
FIG. 6 is a diagram of a frame structure for showing the method for encoding an error correcting code according to the third embodiment of the present invention.

Another embodiment of the method for encoding an error correcting code according to the present invention is shown in FIGS. 5 and 6. Here, FIGS. 5 and 6 each show an area for coded data in a frame structure.

The embodiment shown in FIGS. 5, 6, which are similar to the embodiment shown in FIGS. 1, 2, respectively, is a particular case where Kc=232, Nc=256, Kr=56, and Nr=64.

Also, in a manner similar to the second embodiment, with $\delta$=1, a client signal is parallellized to 56 bytes on a byte-by-byte basis. Each of the parallellized 56 bytes corresponds to 56 rows. Also, each byte is parallellized on a bit-by-bit basis, so that the client signal is parallellized to 448 bits as a consequence.

When code subblocks 10-$i$ for C1-encoding comprise 56 subblocks each having a length of 256 bytes corresponding to each of 56 rows, either of the following two may be employed as the C1 code:
  an eleven-error-correcting RS code (255, 233) which has the last one byte excluded from a code region; and
  a 16-error-correcting BCH code (2047, 1904) based on Galois field (2048) which has the last one byte excluded from a code region.

Of course, a code having a lower correcting capability may also be used.

In another way, when the code subblocks 10-$i$ for the C1 coding comprise 448 subblocks each having 256 bits corresponding to 448 parallellized bits, the following may be employed as the C1 code:

a double-error-correcting BCH code (255, 239) based on Galois field (256) which has the last one bit excluded from a code region.

In FIG. 6, when m is set to one, either of the following two may be employed as a C2 code:

a four-error-correcting RS code (64, 56); and a seven-error-correcting BCH code (511, 448) based on Galois field (512) which has the last one bit excluded from a code region.

Alternatively, when m is set to two, either of the following two may be employed as the C2 code:

an eight-error-correcting shortened RS code (128, 112); and a 12-error-correcting BCH code (1023, 448) based on Galois field (1024) which has the last one bit excluded from a code region.

Further alternatively, when m is set to four, either of the following two may be employed as the C2 code:

a 15-error-correcting RS code (255, 225) which has the last one byte excluded from a code region; and A 23-error-correcting BCH code (2047, 1794) based on Galois field (2048) which has the last one bit excluded from a code region.

The bite rate of a super FEC signal in the third embodiment is approximately 1.2611 times as high as that of a client signal.

The third embodiment can further facilitate the encoding of an error correcting code having a higher gain than the second embodiment.

While all of the foregoing embodiments have shown an example in which the bit rate of the first coded information block arranged in (Kr rows×Kc columns) is increased to convert it into a coded block arranged in (Nr rows×Nc columns), a predetermined check bit area may be created by increasing only the number of columns while maintaining the number of rows Kr constant. The following fourth and fifth embodiments show examples of this scheme.

(Fourth Embodiment)

Figure 7:
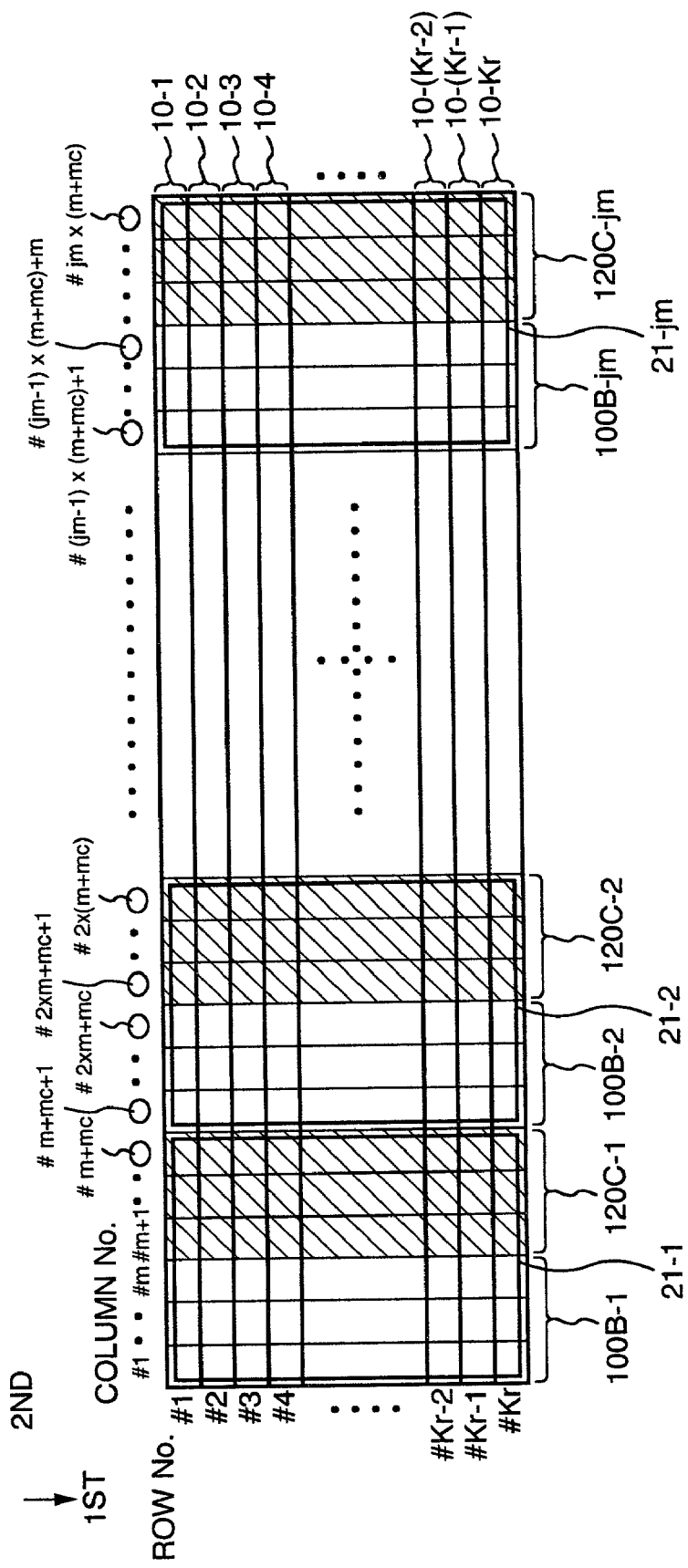
FIG. 7 is a diagram of a frame structure for showing a method for encoding an error correcting code according to a fourth embodiment of the present invention.

FIG. 7 shows another embodiment of the method for encoding an error correcting code according to the present invention. Here, FIG. 7 shows an area for coded data in a form structure.

The fourth embodiment implements C2-encoding/decoding shown in FIG. 7, premised on the C1-encoding/decoding previously described in the first embodiment in connection with FIG. 1, and differs from the first embodiment in that a check bit area for a C2 code is defined at a position different from that shown in FIG. 2 (of the first embodiment). The following description will be centered on this difference.

In the foregoing embodiments, (Nr−Kr) rows, which were created by increasing the number of parallel stages upon the C2-encoding, are used as the check bit area 120B for the C2 code.

On the other hand, in the fourth embodiment shown in FIG. 7, the bit rate of each code subblock 10-$i$ ($i=1, 2, \ldots$, Kr) is increased by a factor of (Nr/Kr), and an empty area of $\{(Nr-Kr)\times m/Kr\}$ columns (designated mc) is created for every m columns and used as a check bit area 120C-j (j=1, 2, . . . , jm) for the C2 code, only when Nc is an integer multiple of m and (Nr×m) is an integer multiple of Kr. As a result, a total of (Nc+jm×mc) columns are created. This number is also equal to (Nc×Nr/Kr). Here, in the fourth embodiment, jm is equal to (Nc/m).

Then, each of (m+mc) columns, i.e., each of a region comprised of (Nr×m) bytes is defined as a code subblock 21-$j$ (j=1, 2, . . . , jm). Here, an area 100 corresponding to an original first coded information block is divided into the respective code subblocks 21-$j$ to define areas 100B-j (j=1, 2, . . . , jm).

The C2-encoding is performed independently for each of the code subblocks 21-$j$ segmented in the foregoing manner. For example, mc=1 when Kr=16, Nr=18, and m=8.

Also, for converting the code subblocks into a serial super FEC signal after the C2-encoding, interleaving is performed in Kr stages instead of Nr stages. As a result, the bit rate of the super FEC signal is increased to $\{(Nr/Kr)\times(Nc/Kc)\}$ times as high as the bit rate of a client signal, thus providing the same result as the first embodiment.

According to the fourth embodiment, the check bits for the C2 code can be positioned at the end of the C2 code in the transmission sequence, in other words, in the reception sequence, thereby making it possible to simplify a scheme for parallelly processing the encoding/decoding of the C2 code, and suppress a delay time possibly occurring due to the encoding.

(Fifth Embodiment)

Figure 8:
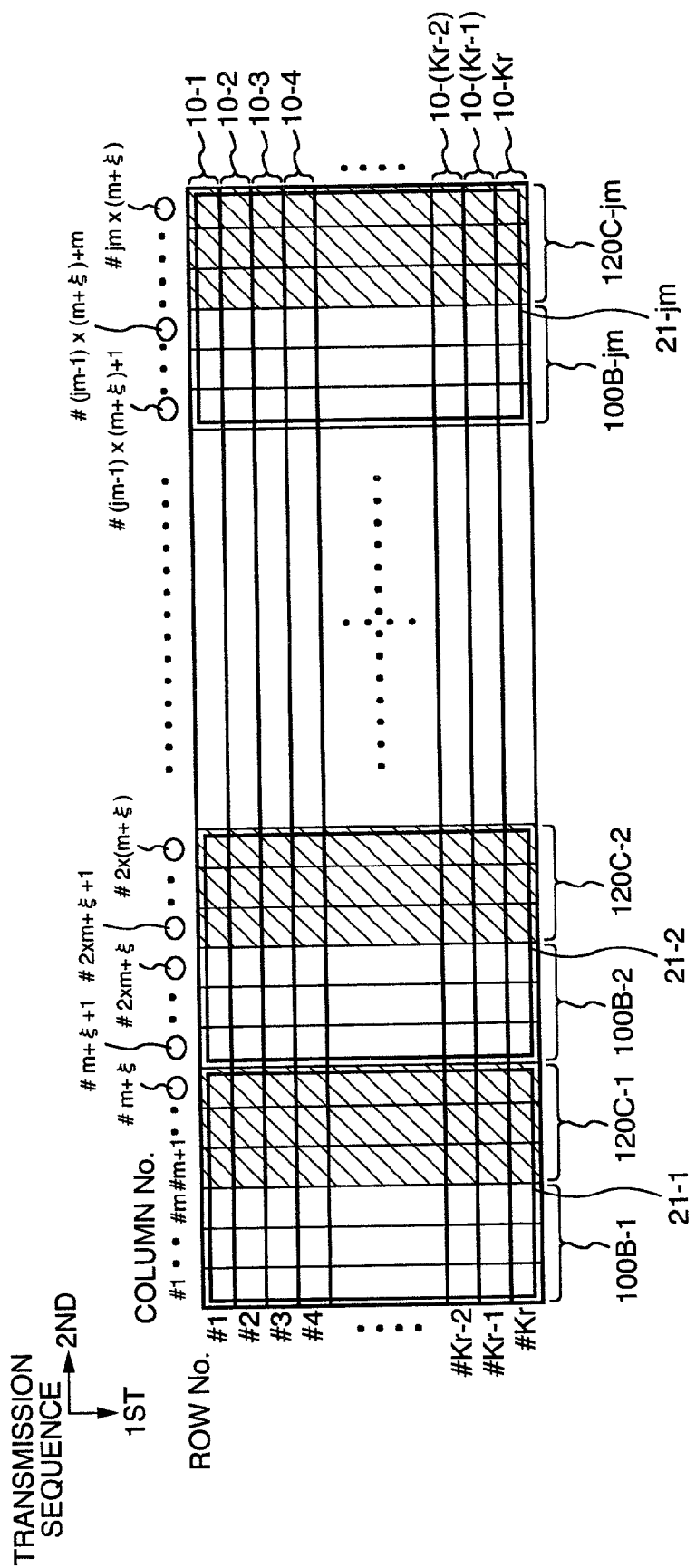
FIG. 8 is a diagram of a frame structure for showing a method for encoding an error correcting code to a fifth embodiment of the present invention.

FIG. 8 shows another embodiment of the method for encoding an error correcting code according to the present invention. Here, FIG. 8 shows an area for data to be encoded in a frame structure.

The fifth embodiment is generally similar to the preceding fourth embodiment except that the fifth embodiment employs a more general approach including the fourth embodiment. The following description will be centered on this respect.

In the fourth embodiment, the bit rate of each code subblock 10-$i$ ($i=1, 2, \ldots$, Kr) is increased by a factor of (Nr/Kr), and an empty area of $\{(Nr-Kr)\times m/Kr\}$ columns is created for every m columns and used as a check bit area 120C-j (j=1, 2, . . . , jm) for the C2 code, on condition that "Nc is an integer multiple of m and (Nr×m) is an integer multiple of Kr."

On the other hand, in the fifth embodiment, the bit rate of each of the code subblocks 10-$i$ ($i=1, 2, \ldots$, Kr) is increased by a factor of $\{1+(\xi/m)\}$, and an arbitrary empty area of $\xi$ columns is created for every m columns and used as a check bit area 120c-j (j=1, 2, . . . , jm) for the C2 code. As a result, a total of (Nc+jm×$\xi$) columns are created.

Then, every (m+$\xi$) columns, i.e., each of segmented regions comprised of $\{Kr\times(m+\xi)\}$ bytes, are defined as a code subblock 21-$j$ (j=1, 2, . . . , jm). Here, an area 100 corresponding to the original first coded information block is divided into the respective code subblocks 21-$j$ to define areas 100B-j (j=1, 2, . . . , jm).

The C2-encoding is performed independently for each of the code subblocks 21-$j$ segmented as described above.

Also, for converting the code subblocks into a serial super FEC signal after the C2-encoding, interleaving is performed in Kr stages. As a result, the bit rate of the super FEC signal is increased to $\{(1+(\xi/m))\times(Nc/Kc)\}$ times as high as the bit rate of a client signal.

According to the fifth embodiment, the check bits for the C2 code can be positioned at the end of the C2 code in the transmission sequence, thereby making it possible to simplify a scheme for parallelly processing the encoding/decoding of the C2 code, and more flexibly encode a code which can suppress a delay time possibly occurring due to the encoding.

The transmission sequences shown in FIGS. 1 through 8 indicate a sequence in which information is transmitted on a client signal and a sequence in which information is transmitted on a super FEC signal. A transmission sequence as a parallellized signal is a "second direction of the transmission sequence" indicated in each figure. In other words, the respective rows are simultaneously transmitted for processing. It should be noted that for the C1-encoding/decoding, the columns may be processed in accordance with a further parallellization scheme, for example, in (Kr×four stages), (Kr×16 stages) or the like. Also, for the C2-encoding/decoding, the respective columns may be transmitted in a "first direction of the transmission sequence" indicated in each figure for simultaneous processing.

Also, as an overhead area, a predetermined area in the check bit area 120B for the C2 code may be used as a second overhead area, in addition to the area 110C, for inserting a portion or the entirety of the framing pattern and the information for OAM&P of a transmission line into this additional area.

(Sixth Embodiment)

Another embodiment of the encoding method will be described below for the case where a client signal already has the frame structure shown in FIG. 1.

When a client signal is received and converted into a super FEC signal, the client signal is reframed for C1-encoding, without increasing the bit rate by a factor of (Nc/Kc) for creating a check bit area for a C1 code, followed by a transition to the C2-encoding process which specifically involves an increase in the bit rate for C2 codes, the C2-encoding, and the insertion of overhead. This scheme is called "single stage wrapper." Here, the reframing of a client signal means that a framing pattern of the client signal is detected to arrange the client signal as shown in FIG. 1, and information in an overhead area 110C of the client signal is terminated to insert again new information as required.

Further, when a client signal has been encoded with the same code as the C1 code, the client signal may be once C1-decoded for the existing C1 code and subsequently C1-encoded again (method 1); the client signal may be newly C1-encoded ignoring the existing C1 code (method 2); or the client signal may be once C1-decoded for the existing C1 code and left as it is (method 3), followed by a transition to the C2-encoding process, respectively.

Of course, double stages wrapper may be employed, wherein the bit rate of the client signal is increased and C1-encoded, followed by a transition to the C2-encoding process in the same method as the foregoing embodiments, without taking into account the frame format of the client signal (method 4).

Further alternatively, the overhead area 110C may be processed in a transparent manner without using as an overhead area, and a predetermined area in the bit check area 120B for the C2 code may be used as a second overhead area.

On the contrary, when a super FEC signal is received and converted into a client signal, and either of the methods 1–3 has been used on the encoding side, the super FEC signal may be once C1-decoded for a C1 code and again C1-encoded (method 1B) after a C2 decoding process; the super FEC signal may be newly C1-encoded again without C1 decoding (method 2B); or the super FEC signal may be once C1-decoded and left as it is (method 3B). Then, the resulting signal may be outputted as the client signal without reducing the bit rate by a factor of (Kc/Nc) in either of the methods. Alternatively, when the method 4 has been used on the encoding side, the super FEC signal may be C2-decoded and C1-decoded using the same method as the foregoing embodiments, and outputted as the client signal after its bit rate is reduced (method 4B). Here, when the method 1, for example, is used on the encoding side, either of the methods 1B–3B may be performed on the decoding side.

Further alternatively, a selection as to which of these methods 1–4 should be performed may be made on the encoding side based on settings from an external control system.

In addition, a selection as to which of these methods 1B–4B should be performed may be made on the decoding side based on settings from an external control system, or automatically. When the selection is made automatically, an arbitrary predetermined area in the overhead for OAM&P within the first column, for example, may be defined as an FSI byte into which a predetermined code value is inserted corresponding to an operation instruction for the decoding on the encoding side. On the decoding side, the code value in the FSI byte is detected to select any of the methods 1B–4B corresponding to the detected code value, and the selected method is performed. In this case, a similar selection may be made as to the insertion of a code value corresponding to which operation instruction into the FSI byte on the encoding side based on settings from the external control system.

According to the sixth embodiment, it is possible to encode a high gain code to generate a super FEC signal while ensuring the mutual connectivity when a client signal has been C1-encoded.

In either of the foregoing embodiments, the C1-encoding and the C2-encoding may be performed in the reverse order on the encoding side, while the C1-decoding and the C2-decoding may be preformed in the reverse order on the decoding side. In this event, on the encoding side, the bit rate is first increased by a factor of (Nr/Kr), and jmb code subblocks 20-$j$ ($j$=1, 2, . . . , jmb) are encoded with the C2 code. Subsequently, the bit rate is increased by a factor of (Nc/Kc), and Nr code subblocks 10-$i$ ($i$=1, 2, . . . , Nr) are encoded with the C1 code. Here, jmb is equal to <Kc/m>. Then, on the decoding side, the processing reverse to the foregoing is performed.

Also, in either of the foregoing embodiments, the two increases in the bit rate by a factor of (Nx/Kc) and by a factor of (Nr/Kr) or $\{1+(\xi/m)\}$ may be initially performed in succession. In this case, the bit rate of serial data of a received client signal before parallel expansion, or the bit rate after the parallel expansion is increased by a factor of $\{(Nc/Kc)\times(Nr/Kr)\}$ and $[(Nc/Kc)\times\{1+(\xi/m)\}]$, respectively, and the first coded information block is relocated at a predetermined position.

(Seventh Embodiment)

In the foregoing embodiments, the check bit areas 120B and 120C for the C2 codes may be left as they are, rather than eliminating them after the C2 decoding, such that the C2 decoding is performed again after the C1 decoding has been performed ignoring the check bit areas 120B, 120C for the C2 codes. Further, the C1 decoding may be performed again after this, or subsequently, the C2 decoding and the C1 decoding may be alternately repeated in sequence. The bit rate may be eventually reduced by a factor of $\{(Kr/Nr)\times(Kc/Nc)\}$ such that an original client signal can be restored. In another way, after each of the C2 decoding and the C1 decoding has been eventually terminated, the bit rate may be reduced by a factor of (Kr/Nr) and by a factor of (Kc/Nc) in each process such that an original client signal can be restored.

According to the seventh embodiment, the C2 decoding and the C1 decoding are alternately repeated in sequence, so that a higher gain can be provided than the case where the C2 decoding and the C1 decoding are each performed only once.

(Eighth Embodiment)

FIG. 9A shows examples of possible C1 codes which can be applied to a combination of Kc, Nc, and FIG. 9B shows examples of possible C2 codes which can be applied to a combination of Kr, Nr, $\xi$.

FIG. 9B shows the C2 codes for a set of (Kr, Nr, m) in the first through fourth embodiments, and also shows the C2 codes for a set of (Kr, m, $\xi$) in the fifth embodiment in the following relationship. Specifically, a certain set of (Kr, Nr, m)=(a, b, c) and a set of (Kr, m, $\xi$)=(c, a, b) have the same code length and check bit areas, the same code can be applied to these sets. Likewise, since a set of (Kr, Nr, m)=(a, b, c) and a set of (Kr, Nr, m)=(a×β, b×β, c/β) also have the same code length and check bit areas, the same code can be applied to these sets. Further, for a set of (Kr, Nr, m)=(a, b, c) and a set of (Kr, Nr, m)=(d, e, f), when (a×c) is equal to (d×f) and (b×c) is equal to (e×f), the same code can be applied to these sets. Likewise, for a set of (Kr, m, $\xi$)=(a, b, c) and a set of (Kr, m, $\xi$)=(d, e, f), when (a×b) is equal to (d×e) and (a×c) is equal to (d×f), the same code can be applied to these sets. Here, a, b, c are arbitrary integers, and β is an arbitrary integer which is a divisor of c.

If a code having a shorter code length, for example, in a range of 127 to 144 bits/bytes, and a simple decoding algorithm, for example, a one- to three-error-correcting RS/BCH code is employed as the C2 code at the cost of a lower correcting capability, it is possible to reduce a delay time associated with the encoding and decoding and simplify the scheme of encoding/decoding.

Also, generally, from the fact that with an optical fiber, a transmittable distance is reciprocally proportional to approximately a square of the bit rate due to variance and nonlinearity effects, and an increase in the encoding gain of an error correcting code is gradually reduced even if the bit rate is increased to extend a check bit area, the most efficient code can be provided by limiting the increase in the bit rate in a range of 110% to 130% for encoding. For this reason, the ratio of the super FEC signal to the client signal in bit rate, when expressed in percentage, may be determined in a range of 110% to 130%, and the C1-encoding and the C2-encoding are performed such that check bits can be accommodated in such a redundancy bit area or empty area.

According to the eighth embodiment, it is possible to encode the most efficient code which allows for flexible C1-encoding and C2-encoding and maximizes the transmittable distance.

(Ninth Embodiment)

Figure 10:
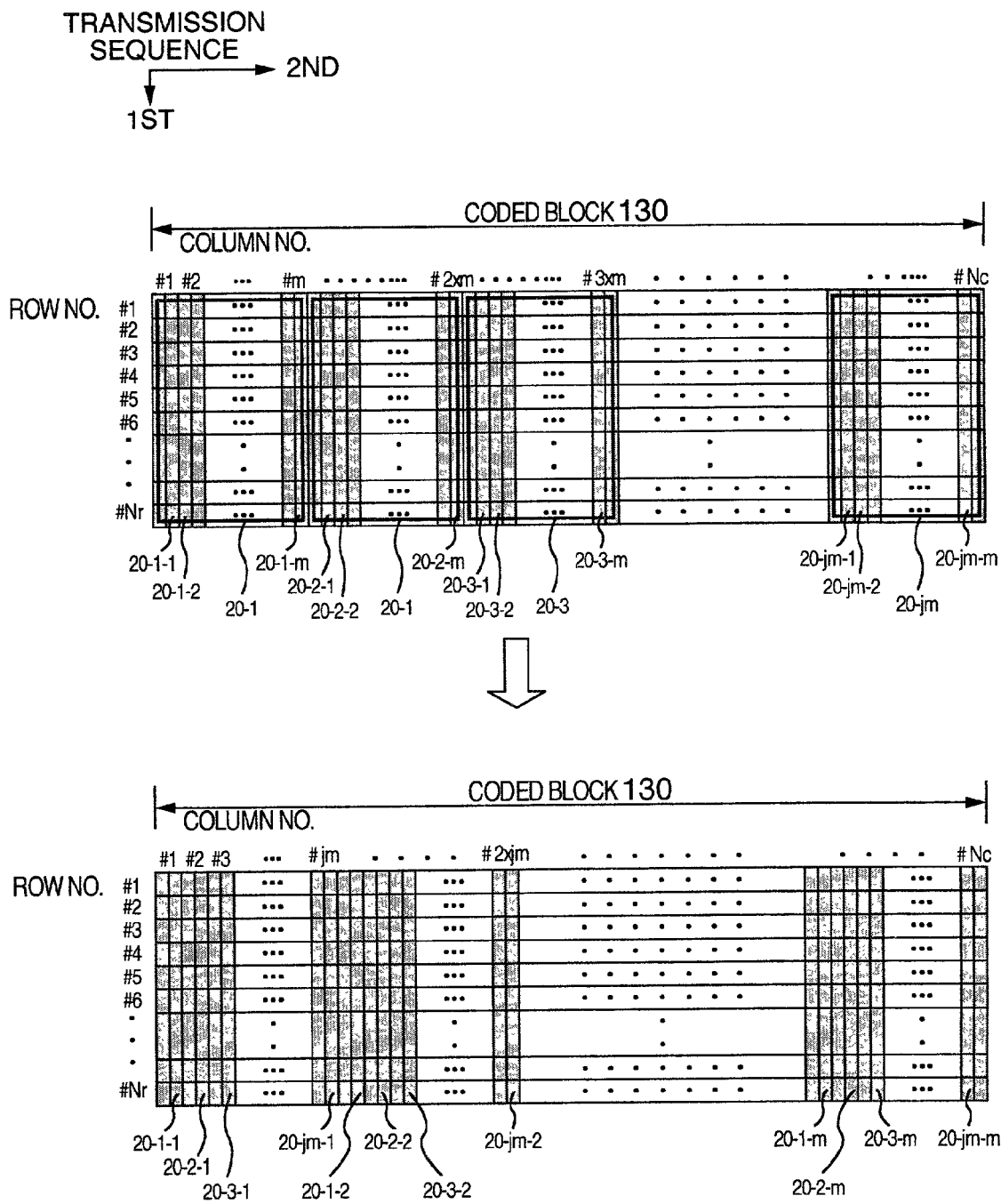
FIG. 10 a diagram of a frame structure for showing a method of encoding an error correcting code according to a ninth embodiment of the present invention.

FIG. 10 shows another embodiment of the method for encoding an error correcting code according to the present invention.

The ninth embodiment differs from the aforementioned embodiments in that the sequence of columns is exchanged before encoded code subblocks are interleaved in Nr stages, after the C2-encoding has been performed as described in the first through fifth embodiments. The following description will be centered on this difference.

After the C2-encoding has been performed, the first columns 20-$j$-1 in respective code subblocks 20-$j$ (j=×1, 2, . . . , jm) are arranged in order from the subblock having the smallest value of j to create jm columns. Next, the second columns 20-$j$-2 in the respective code subblocks 20-$j$ are arranged in order likewise from the subblock having the smallest value of j to create a total of (2×jm) columns.

Subsequently, the third columns 20-$j$-3 through the m-th columns 20-$j$-m in the respective code subblocks 20-$j$ are similarly manipulated to create a total of (m×jm) columns. The signal relocated in this way is used as the coded blocks which is then interleaved in Nr stages every $\epsilon$ bytes from a row to another, in a manner similar to the first through fifth embodiments, to generate a super FEC signal.

On the decoding side, the original code subblocks 20-$j$ (j=1, 2, . . . , jm) are restored in the original sequence by performing the reverse arrangement, followed by the C2 decoding and the C1 decoding.

When the above Nr is replaced with Kr, and m with mc, the ninth embodiment may be applied to the fourth embodiment. Also, when the above Nr is replaced with Kr, and m with (m+$\xi$), the ninth embodiment may also be applied to the fifth embodiment.

of course, the ninth embodiment may be applied to the sixth and seventh embodiments.

Further, when the above Nr is replaced with Kr, and jm with a proper value equal to or larger than two, and the rearrangement is performed in a manner similar to the foregoing after the C1-encoding has been performed, the ninth embodiment may also be applied to single encoding with the C1 code.

Also, regarding the super FEC signal rearranged in the manner described above as a client signal, the bit rate may be further increased to perform the C1-encoding and the C2-encoding as in the aforementioned embodiments, or the rearrangement may be repeated a plurality of times to generate a super FEC signal. In this event, on the decoding side, the operation reverse to that on the encoding side, i.e., a sequence of reverse arrangement→C2 decoding→C1 decoding→bit rate reduction are repeated the same number of times as the encoding side.

While in the foregoing description, the C2-encoding is performed before the sequence of the columns is changed, the sequence of the columns may be changed immediately after the C1-encoding is performed and subsequently the C2-encoding may be preformed. In this case, similar to the single encoding with the C1 code, the rearrangement similar to the foregoing may be performed after the above Nr is replaced with Kr, and jm with a proper value equal to or more than two.

According to the ninth embodiment, even if the super FEC signal suffers a large burst of errors, the errors are distributed to different C1 code areas and different C2 code areas by the reverse arrangement on the decoding side, so that the super FEC signal can have a high error correcting capability.

(Tenth Embodiment)

Figure 11:
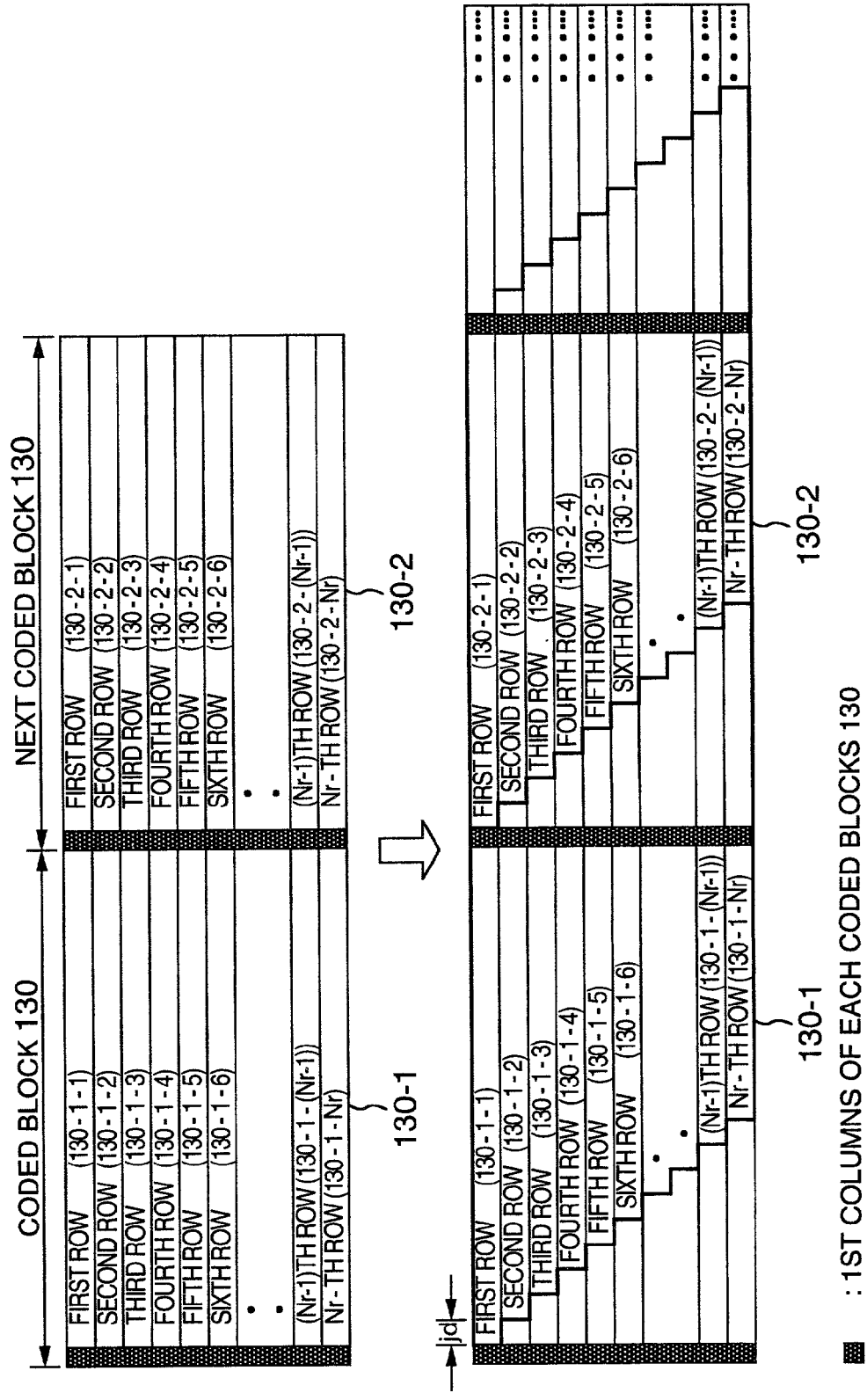
FIG. 11 a diagram of a frame structure for showing a method of encoding an error correcting code according to a tenth embodiment of the present invention.

FIG. 11 shows another embodiment of the error correcting code according to the present invention.

The tenth embodiment differs from the foregoing embodiments in that, after performing the C2-encoding described in the first through third embodiments, respective rows are slightly moved in a forward or backward direction before code subblocks are interleaved in Nr stages. The following description will be centered on this difference.

After the C2-encoding is performed, for a total of Nr rows of code subblocks 10-$i$ (i=1, 2, . . . , Kr) and (Nr−Kr) rows for the C2 code, a second row (designated 130-1-2 in FIG. 11) is shifted temporally backwardly by jd bytes and located at the shifted position, where jd is an arbitrary integer value equal to or more than one. Next, a third row (designated 130-1-3 in FIG. 11) is shifted temporally backwardly by (2×jd) bytes and located at the shifted position. Subsequently, similar manipulations are performed for third through Nr-th rows, with the result that an Nr-th row (designated 130-1-Nr in FIG. 11) is located at a position shifted temporally backwardly by (Nr×jd) bytes. As a result, data in adjacent coded blocks before the rearrangement coexist in at least (Nr×jd) columns after the rearrangement.

Here, in FIG. 11, the first column in the coded block 130 is excluded from the rearrangement such that the framing pattern can be readily detected on the decoding side. However, the first column may also be rearranged as the case may be.

The signal rearranged in the manner described above is interleaved in NR stages every ε bytes from a row to another in a manner similar to the first through third embodiments, to generate a super FEC signal. On the decoding side, a reverse arrangement is performed to restore the original sequence of the rows, followed by the C2 decoding and the C1 decoding.

The tenth embodiment can also be applied to the fourth and fifth embodiments when the above Nr is replaced with Kr.

Of course, the tenth embodiment can also be applied to the sixth and seventh embodiments.

The tenth embodiment can further be applied to the single encoding with the C1 code when the above Nr is replaced with Kr, and the rearrangement similar to the foregoing is performed after the C1-encoding.

Also, regarding the super FEC signal rearranged in the manner described above as a client signal, the bit rate may be further increased to perform the C1-encoding and the C2-encoding as in the aforementioned embodiments, or the rearrangement may be repeated a plurality of times to generate a super FEC signal. In this event, on the decoding side, the operation reverse to that on the encoding side, i.e., a sequence of reverse arrangement→C2 decoding→C1 decoding→bit rate reduction are repeated the same number of times as the encoding side.

While in the foregoing description, the positions of the respective rows are shifted after the C2-encoding has been performed, the positions of the respective rows may be shifted immediately after the C1-encoding is performed and subsequently the C2-encoding may be preformed. In this case, similar to the single encoding with the C1 code, the rearrangement may be performed in a manner similar to the foregoing after the above Nr is replaced with Kr and the C1-encoding is performed.

According to the tenth embodiment, even if the super FEC signal suffers a large burst of errors, the errors are distributed to different C1 code areas and different C2 code areas by the reverse arrangement on the decoding side, so that the super FEC signal can have a high error correcting capability.

(Eleventh Embodiment)

The framing pattern area and the overhead area for OAM&P of a transmission network in the super FEC signal, for example, the first column in FIGS. 1 through 7, may be excluded from data subjected to the C1-encoding and the C2-encoding. When these areas are excluded, the first column may be encoded as virtually regarded as (00) hex on the encoding side, while the first column may be decoded as regarded virtually as (00) hex likewise on the decoding side. In addition, an external control system may be used to control whether or not these areas are excluded.

In this event, the encoding/decoding may be performed by selecting whether values in the first column are used as they are or they are virtually regarded as (00) hex when "excluded"/"not excluded" is set. Further, in each of the C1 decoding and the C2 decoding on the decoding side, settings from the external control system may be relied on to determine whether or not the first column should be excluded from a C1 code area and a C2 code area, or such a determination may be automatically performed. When the determination is automatically performed, an arbitrary predetermined area of the overhead for OAM&P in the first column is defined as an FSIB byte, and a predetermined code value corresponding to the determination as to whether or not the first column is encoded is inserted into the FSIB byte on the encoding side. On the decoding side, the code value in the FSIB byte is detected to perform an operation corresponding to the detected code value. The FSIB byte may be the aforementioned FSI byte. Alternatively, the foregoing settings and automatic operation may be performed independently on the framing pattern area and the overhead area for OAM&P of a transmission network. Further alternatively, the overhead area for OAM&P may be divided into a plurality of areas such that the foregoing settings and automatic operation are performed independently on the respective divided areas. In addition, the foregoing settings and automatic operation may be performed independently on the C1 code and the C2 code, respectively.

According to the eleventh embodiment, it is possible to independently set whether or not the framing pattern area and the overhead area for OAM&P should be encoded for each of the C1 code and the C2 code, to make OAM&P of a transmission network more flexible and easier, and to automatically perform OAM&P of the transmission network without intervention of the operator.

(Twelfth Embodiment)

Similar to the automatic operation approach in the eleventh embodiment, the decoding operation may be automatically turned ON and OFF. For example, an arbitrary predetermined area of the overhead for OAM&P in the first column is defined as an FSIC byte, and a predetermined code value corresponding to a determination as to whether or not the encoding is performed is inserted into the FSIC byte on the encoding side. On the decoding side, the code value in the FSIC byte is detected to turn the decoding operation ON when the code value indicates that the encoding has been performed, and to turn the decoding operation OFF when the code value indicates that the encoding has not been performed. Here, the FSIC byte may be the aforementioned FSI byte or FSIB byte. Also, when a transition is made from "not encoded" to "encoded," a predetermined code value corresponding to the encoded case may be inserted into the FSIC byte which belongs to a block that is temporally previous to the first encoded block, from which the encoding is actually started, or the second encoded block. Further, on the decoding side, an operation corresponding to a detected code value may be performed only when the same code value is detected in the FSIC byte temporally continuously M times. In addition, the insertion of a code value into the FSIC byte and automatic decoding may be independently performed on the C1 code and the C2 code, respectively, in the manner described above.

According to the twelfth embodiment, it is possible to automatically decode the C1 code and the C2 code independently of each other, to make OAM&P of a transmission network more flexible and easier, and to automatically perform OAM&P of the transmission network without intervention of the operator.

In all of the foregoing embodiments, the client signal may be any of the following signals. Additionally, other than the following signals, the client signal may be an arbitrary binary digital signal which has a temporally constant bit rate, or an optical signal converted from such a binary digital signal.

Any of OC-1, OC-3, OC-12, OC-48, OC-192 and OC-768 signals conforming to the SONET standard.

Any of STM-1, STM-4, STM-16, STM-64 and STM-256 signals conforming to the SDH standard.

Any of 1000 Base-SX, 1000 base-LX and 1000 Base-Cx signals defined in IEEE standard 802.3z (so-called Giga bits Ether signals).

A signal, the bit rate of which is increased to 125% using an 8B10B code defined in IEEE standard 802.3Z.

A signal generated by terminating the above-mentioned Giga bits Ether signal or an 8B10B code of a signal which comprises the 8B10B code, and reducing the bit rate to 80%.

A signal generated by compressing an arbitrary data signal using a predetermined data compression tool.

An output signal of a multiplexing transmitting apparatus disclosed in Japanese Patent Application No. 8-138011.

A signal defined in ITU-T Recommendation G.975.

A signal on the OCh (Optical Channel) layer defined in ITU-T Recommendation G.872 (established in 1999).

For any of the signals listed above, a signal generated by time division multiplexing a plurality of arbitrary signals; a signal having a bit rate of 4.97664 Gbit/s generated by time division multiplexing two OC-48 signals; a signal having a bit rate of 19.90656 generated by time division multiplexing two STM-64 signals; and a signal having a bit rate of 5.0 Gbit/s generated by time division multiplexing four 1.25 Gbit/s Giga bits Ether signals.

Any of the signals listed above, the bit rate of which is increased by a factor of (255/238) or (256/240).

Any of the signals listed above, the bit rate of which is increased by a factor of two, and encoded with convolutional codes with coding ratio of a half.

A super FEC signal which is encoded as described in the foregoing embodiments with any of the signals listed above used as a client signal.

A signal generated by time division multiplexing a plurality of super FEC signals.

As an example, with an OC-48 signal having a bit rate of 2.48832 Gbit/s or an STM-16 signal used as a client signal, when the number of stages Kr in the parallel expansion is chosen to be four, and all bits in each byte are parallelly expanded, a total of 32 bits of parallel expansion is provided, and the bit rate per bit is 77.76 Mbit/s (Mega Bits Per Second). In another way, when Kr is chosen to be eight, the bit rate per bit is 38,88 Mbit/s; and when Kr is chosen to be 16, the bit rate per bit is 19.44 Mbit/s.

Similarly, with an OC-192 signal having a bit rate of 9.95328 Gbit/s or an STM-64 signal used as a client signal, when the number of stages Kr in the parallel expansion is chosen to be 16, and all bits in each bytes are parallelly expanded, a total of 128 bits of parallel expansion is provided, and the bit rate per bit is 77.76 Mbit/s. In another way, when Kr is chosen to be 32, the bit rate per bit is 38,88 Mbit/s; and when Kr is chosen to be 64, the bit rate per bit is 19.44 Mbit/s.

Also, with the number of stages Kr in the parallel expansion fixed to 16, i.e., for a total of 128 bits, the bit rate per bit may be varied in accordance with the bit rate of a client signal, such that the bit rate per bit of a parallel signal is set to 77.76 Mbit/s when the client signal is an OC-192 signal or an STM-64 signal; the bit rate per bit is set to 19.44 Mbit/s when the client signal is an OC-48 signal or an STM-16 signal; and the bit rate per bit is set to 4.86 Mbit/s when the client signal is an OC-12 signal or an STM-4 signal.

Further, when the aforementioned Giga bits Ether signal or 8B10B encoded signal is used as a client signal, the bit rate may be maintained unchanged while the 8B10B code is terminated. The termination of the 8B10B code, used herein, means restoration of data before it is 8B10B encoded. In this way, the amount of data is reduced to 80%, so that the remaining 20% of capacity, i.e., 25% of capacity for the amount of data after the termination of the 8B10B code, is provided as an empty area which can be freely used. For example, with 1.25 Gbit/s Giga bits Ether signal, a capacity of 0.25 Gbit/s is provided as an empty area which can be freely used. For terminating the 8B10B code, an idle pattern previous to the end of the 8B10B code may be removed and a proper delimiter pattern may be inserted instead so as to clearly find the boundary between adjacent packets. Alternatively, the idle pattern previous to the end of the 8B10B code may be converted into a proper pattern for identification such that the capacity is reduced to Y % (Y<100) after the termination of the 8B10B code. Further alternatively, each 8-bit data may be converted into 9-bit data by a predetermined method after the termination of the 8B10B code to reduce the bit rate to 90%. For example, a bit having the value "0" may be added to the head of each 8-bit data in packets to increase the number of bits to a total of nine bits, while an arbitrary 9-bit section having the first bit having the value "1" and the subsequent eight bits arranged in a predetermined pattern may be used as a delimiter pattern which may be placed between packets.

In any case, when a capacity of 6% or more is provided as an empty area, which can be freely used, with respect to the entire data capacity after the termination of the 8B10B code, this area may be used as a check bit area for the C1 code, and as a check bit area for the C2 code to perform the C1-encoding in the aforementioned embodiments, and further the C2-encoding as well. Then, the 8B10B code may be restored upon reproducing the client signal on the decoding side. In this way, the super FEC signal can be encoded without increasing the bit rate.

Likewise, it is also possible to encode the super FEC signal without increasing the bit rate when an arbitrary data signal is compressed to reduce the amount of data using a predetermined data compression tool, while a capacity of 6% or more with respect to the capacity of compressed data is provided as an empty area, which can be freely used, for a signal, the bit rate of which is maintained unchanged.

Further, it is also possible to perform the encoding/decoding on each of wavelength division multiplexed signals at respective wavelengths in a single optical fiber core line as a client signal, or to perform the encoding/decoding on a signal generated by time division multiplexing the signals at respective wavelengths as a client signal. It is further possible to assign a plurality of super FEC signals to different wavelengths to transmit the plurality of super FEC signals through a single optical fiber core line in a wavelength division multiplexing scheme.

While any of the foregoing embodiments employs a pseudo product code or concatenated code using the C1 code as an outer code and the C2 code as an inner code, the encoding may be performed only with a single code. For example, a client signal is converted into the frame structure shown in FIG. 1, in a manner similar to the foregoing embodiments, and then is subjected to the C1-encoding. The C1-encoded data is interleaved in Kr stages every ε bytes as it is to generate a super FEC signal. On the decoding side, the operation reverse to the above is performed to restore the client signal.

As an example in this case, δ related to the parallellization of a client signal having a bit rate (ζ) Gbit/s is set to one; Kr to 16 to parallellize all bits in each byte to a total of 128 parallel signals; Kc to 238; Nc to 255; C1 to an eight-error-correcting Reed-Solomon code (255, 239); and the encoding processing speed for each of the total of the 128 parallel signals to {(ζ/128)×1000} Mbit/s before increasing the bit rate, and to {ζ/128)×(255/238)×1000} Mbit/s after increasing the bit rate. The processing speed for the decoding is set in a similar manner. For example, when the client signal is an OC-192 signal having a bit rate of 9,95328 Gbit/s or an STM-64 signal, the processing speed for each parallel signal is set to 77.76 Mbit/s before increasing the bit rate, and to approximately 83.4 Mbit/s after increasing the bit rate. Also, for example, for a client signal having a bit rate of 12.5 Gbit/s, the processing speed for each parallel signal is set to 97.65625 Mbit/s before increasing the bit rate, and to approximately 104.7 Mbit/s after increasing the bit rate. Further, for example, for a client signal having a bit rate of 19,90656 Gbit/s, the processing speed for each parallel signal is set to 155.52 Mbit/s before increasing the bit rate, and to approximately 166.7 Mbit/s after increasing the bit rate. Further, for a client signal having a bit rate of 39.81312 Gbit/s, the processing speed for each parallel signal is set to 311.04 Mbit/s before increasing the bit rate, and to approximately 333.3 Mbit/s after increasing the bit rate. In any case, since each of 16 parallel signal sets, each comprised of eight parallel signals, is independently encoded and decoded, so that apparatus involved in the encoding/decoding have a constant scale suitable for 16 sets, irrespective of the bit rate of any client signal. By thus employing a consistent parallellization scheme at all times irrespective of the bit rate of a particular client signal, it is possible to limit an increase in the scale of apparatus involved in the encoding/decoding since the number of parallellized signals is consistent even if the bit rate of the client signal is increased.

Furthermore, when a client signal is an OC-192 signal, an STM-64 signal, or a signal having a bit rate of 12.5 Gbit/s, the client signal is parallellized in a manner similar to the foregoing, whereas for a signal having a bit rate equal to an integer multiple of the bit rate of these signals, the number of parallellized signals may be increased by a factor of the integer multiple (ω). For example, for a signal having a bit rate of 9.95328 Gbit/s, Kr is set to 16, and all bits in each byte are parallellized to generate a total of 128 parallellized bits in the manner described above, whereas for a signal having a bit rate of (ω×9.95328) Gbit/s, Kr is set to (ω×16), and all bits in each byte are parallellized to generate a total of (ω×128) parallellized bits. In this way, the processing speed for each parallel signal is fixed to 77.76 Mbit/s before increasing the bit rate, and to approximately 83.4 Mbit/s after increasing the bit rate, thereby making it possible to conform to the operating speed of LSIs fabricated by a silicon process and to limit an increase in the scale of apparatus involved in the encoding/decoding.

(Thirteenth Embodiment)

Figure 12:
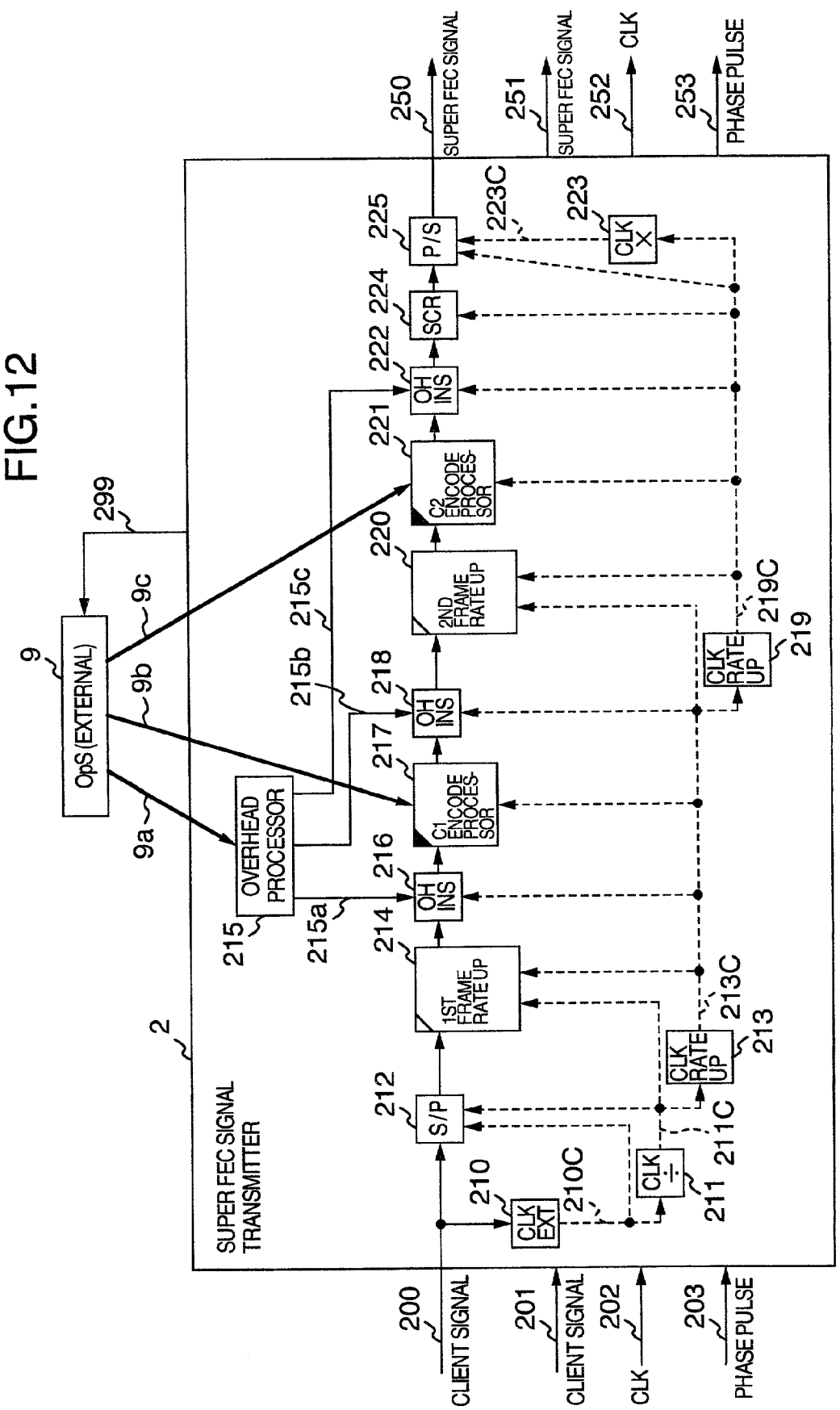
FIG. 12 is a block diagram illustrating the configuration of a super FEC signal transmitter according to a thirteenth embodiment of the present invention.

FIG. 12 illustrates a super FEC signal transmitter according to a thirteenth embodiment of the present invention. Here, FIG. 12 is a block diagram of the super FEC signal transmitter 2.

The super FEC signal transmitter 2 receives a client signal 200, and outputs it as a super FEC signal 250. A clock extraction unit 210 restores from the received client signal 200 a clock signal 210C at the same bit rate as that of the client signal 200. A clock divider unit 211 divides the clock signal 210C from the clock extraction unit 210 to a processing rate at a first stage in the super FEC signal transmitter 2, for example, at a frequency 1/Kr times or 1/(8×Kr) times as high as the original clock signal, and outputs the divided clock signal as a clock signal 211C. Alternatively, the super FEC signal transmitter 2 may receive a clock signal at a predetermined frequency from the outside as required, and synchronize this clock signal to the clock signal extracted in the clock extraction unit 210, using a PLL (Phase Locked Lop) circuit or the like. The resulting signal may be used as the clock signal 211C.

A serial/parallel conversion unit 212 parallellizes the received client signal 200 in Kr stages every δ bytes such that the period and phase of one bit thereof are equal to those of the clock signal 211C, and outputs the parallellized client signal.

A first clock rate conversion unit 213 increases the frequency of the clock signal 211C from the clock divider unit 211 by a factor of (Nc/Kc), and outputs the resulting clock signal as a first clock signal 213C.

A first frame conversion unit 214 increases the bit rate of each of parallel data signals from the serial/parallel conversion unit 212 by a factor of (Nc/Kc) using the timing of the first clock signal 213C from the first clock rate conversion unit 213, places the original parallel data signals in the area 100 within the frame format as shown in FIGS. 1, 3, 5, and outputs the signals.

An overhead processor unit 215 generates overhead information for OAM&P of a transmission network, framing pattern and so on, which are to be inserted into a super FEC signal for transmission, and outputs a portion or the entirety of a variety of the information 215a, 215b, 215c to a first overhead insertion unit 216, a second overhead insertion unit 218 and a third overhead insertion unit 222, respectively, for processing therein.

The first overhead insertion unit 216 inserts a variety of information 215a from the overhead processor unit 215 into predetermined positions within a data signal from the first frame conversion unit 214, for example, predetermined positions in the area 110C shown in FIGS. 1, 3, 5, and outputs the data signal having the information 215a inserted therein.

A first encode processor unit 217 performs the C1-encoding described in the aforementioned embodiments on the output data signal from the first overhead insertion unit 216. The C1-encoding is performed independently and simultaneously on each of Kr code subblocks 10-i (i=1, 2, . . . , Kr). The processor unit 217 may be comprised of Kr C1-encode modules 217-MDJ-i (i=1, 2, . . . , Kr) which handle Kr code subblocks 10-i, respectively.

The second overhead insertion unit 218 inserts a variety of information 215b from the overhead processor unit 215 into predetermined positions previously defined in the data signal from the first encode processor unit 217, for example, predetermined positions in the area 110C shown in FIGS. 1, 3, 5, and outputs the data signal having the information 215b inserted therein.

A second clock rate conversion unit 219 increases the frequency of the first clock signal 213C from the first clock rate conversion unit 213 by a factor of (Nr/Kr) or {1+(ξ/m)}, and outputs the resulting clock signal as a second clock signal 219C.

A second frame conversion unit 220 increases the bit rate of each of the parallellized data signals from the second overhead insertion unit 218 by a factor of (Nr/Kr) or {1+(ξ/m)} using the timing of the second clock signal 219C from the second clock rate conversion unit 219, places the original parallel data signals in the area 100B within the frame format as shown in FIG. 7 or 8, and outputs the signals. This is designated the "case 1." Alternatively, the second frame conversion unit 220 creates (Nr−Kr) stages of parallel areas for the data signals from the second overhead insertion unit 218, places the original parallel data signals in the area 100 within the frame format as shown in FIGS. 2, 4, 6, and outputs the parallel data signals in the frame format. This is designated the "case 2."

A second encode processor unit 221 performs the C2-encoding described in the aforementioned embodiments on the output data signal from the second frame conversion unit 220. In this event, the second encode processor unit 221 performs the C2-encoding on each of jm code subblocks 20-j (j=1, 2, . . . , jm) on a time series basis in such a way that the C2-encoding of a code subblock 20-2 is started after a code subblock 20-1 has been C2-encoded or while it is being C2-encoded. Then, the second encode processor unit 221 processes each of the code subblocks 20-j which remain parallelly expanded in Kr stages or Nr stages. For example, in a check bit calculation, parallelly inputted Kr bytes or Nr bytes may be subjected to a division/residue calculation using a generator polynomial, after performing a carry operation in accordance with the position of each byte or bit in the parallel arrangement. A delay time associated with the encoding can be reduced by using a code of a short length which has a small m as the C2 code.

A third overhead insertion unit 222 inserts a variety of information 215c from the overhead processor unit 215 into predetermined positions in the data signal from the second encode processor unit 221, for example, predetermined positions in the area 110C shown in FIGS. 1, 3, 5, and outputs the data signal having the information 215c inserted therein.

A clock multiplier unit 223 multiplies the frequency of the second clock signal 219C from the second clock rate conversion unit 219 by an integer multiple, for example, by Kr or (8×Kr) when the second frame conversion unit 220 is in the case 1 and by Nr or (8×Nr) when in the case 2, and outputs the resulting clock signal as a third clock signal 223C. Alternatively, a clock signal at a predetermined frequency may be received from the outside as required, and used as the third clock signal 223C.

A scrambler 224 randomizes the data signal and outputs the randomized data signal so as to prevent the same bit values from being transmitted successively. For example, the scrambler 224 performs parallel processing so as to provide the same result as that produced when a serial data signal from the next parallel/serial conversion unit 225 is scrambled using a primitive polynomial of a predetermined order number as a generator polynomial. Alternatively, the scrambler 224 may be located subsequent to the parallel/serial converter 225 and used as a 1-bit serial processing scrambler.

The parallel/serial conversion unit 225 interleaves a parallel data signal in Kr stages or Nr stages from the scrambler 224 every ε bytes such that the period and phase of its one bit are equal to those of the third clock signal 223C to serialize the sequence of the bits on a time series basis, and outputs the serialized signal as a super FEC signal 250.

In the components described above, each component from the first overhead insertion unit 216 to the second overhead insertion unit 218 operates at the timing of the clock signal 213C. Each component from the second encode processor unit 221 to the scrambler 224 operates at the timing of the clock signal 219C.

In the foregoing configuration, the super FEC signal transmitter 2 may be controlled from an external control system 9. For example, the external control system 9 may control the overhead processor unit 215 through a control signal 9a to generate a portion or the entirety of the overhead information for OAM&P and the framing pattern, and to insert which of the overhead information and the framing pattern in the first overhead insertion unit 216, second overhead insertion unit 218 and third overhead insertion unit 222, respectively. In addition, the external control system 9 may control the first encode processor unit 217 and the second encode processor unit 221 through control signals 9b, 9c as to which of methods 1–4, previously described in the sixth embodiment, should be performed, or whether or not the framing pattern and the overhead area for OAM&P should be encoded, as described in the eleventh embodiment, or whether or not the C1-encoding and the C2-encoding should be performed, as described in the twelfth embodiment. Further, if a faulty state such as an interrupted signal is detected in the client signal 200, or if the super FEC signal transmitter 2 presents a faulty operation, the external control system 9 may be supplied with an alarm 299 notifying the fault.

According to the thirteenth embodiment, it is possible to readily configure a super FEC transmitter which realizes the encoding to an error correcting code that has a sufficient gain of 6 dB or more for a bit error ratio of $10^{-12}$ by performing the C2-encoding on a client signal after it has undergone the C1-encoding to convert the client signal into a super FEC signal.

(Fourteenth Embodiment)

Figure 13:
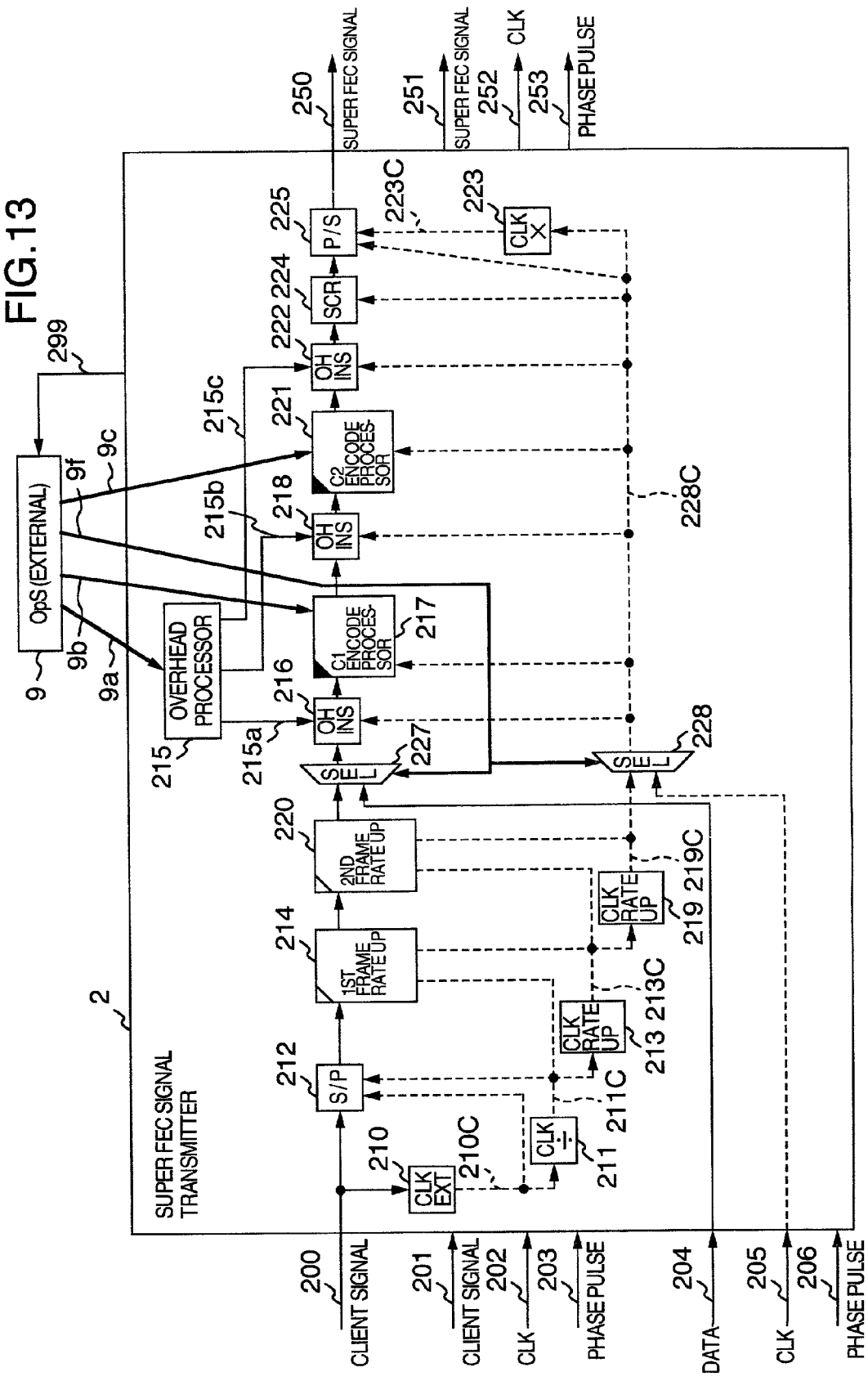
FIG. 13 is a block diagram illustrating the configuration of a super FEC signal transmitter according to a fourteenth embodiment of the present invention.

FIG. 13 illustrates a super FEC signal transmitter according to another embodiment of the present invention.

While the super FEC signal transmitter 2 of the fourteenth embodiment is similar in configuration and operation to the thirteenth embodiment illustrated in FIG. 12, the former differs from the latter in that a first frame conversion unit 214 is located adjacent to a second frame conversion unit 220; a first clock rate conversion unit 213 is located adjacent to a second clock rate conversion unit 219; and a selector 227 and a selector 228 are added. The super FEC signal transmitter 2 of the fourteenth embodiment also differs in that it receives a parallel data signal 204 having a data format equivalent to a data format of the output signal of the second frame conversion unit 220; a clock signal 205 synchronized with the parallel data signal 204 and having the same frequency as the second clock signal 219C; and a phase pulse signal 206 indicative of the phase of the parallel data signal 204 from the outside.

The first clock rate conversion unit 213, first frame conversion unit 214 and second clock rate conversion unit 219 are similar in operation to their counterparts in the thirteenth embodiment.

The second frame conversion unit 220 performs similar processing to that in the thirteenth embodiment on a parallel data signal from the first frame conversion unit 214. Further, in the case 1, the first frame conversion unit 214 can be removed, in which case the bit rate of each parallel data signal from a serial/parallel conversion unit 212 may be increased directly by a factor of {(Nr/Kr)×(Nc/Kc)} or [{1+(ξ/m)×(Nc/Kc)}] using the timing of a second clock signal 219C from the second clock rate conversion unit 219, and the original parallel data signal may be placed in the area 100B within the frame format as shown in FIG. 7 or 8, and outputted.

The selector 227 receives the parallel data signal from the second frame conversion unit 220 and the parallel data signal 204 received from the outside, selects either of these signals, and outputs the selected signal.

The selector 228 receives the second clock signal 219C from the second clock rate conversion unit 219, and the clock signal 205 received from the outside, selects either of these clocks, and outputs the selected clock signal as a clock signal 228C.

It should be noted that the selector 227 and the selector 228 select signals in the same system. Specifically, when the selector 227 selects the parallel data signal from the second frame conversion unit 220, the selector 228 selects the second clock signal 219C. Conversely, when the selector 227 selects the parallel data signal 204, the selector 228 selects the clock signal 205. In addition, the external control system 9 may control through a control signal 9f the selections made by the selectors 227, 228.

When the selector 227 selects the parallel data signal 204, the frame position of the parallel data signal 204 is recognized based on the phase pulse signal 206 received from the outside in each process subsequent to a first overhead insertion unit 216.

As to the operation in the remaining components, the fourteenth embodiment is similar to the thirteenth embodiment except that the first overhead insertion unit 216 processes a data signal from the selector 227, and a second encode processor unit 221 processes a data signal from a second overhead insertion unit 218.

According to the fourteenth embodiment, it is possible to readily configure a super FEC transmitter which realizes the encoding to an error correcting code which has a sufficient gain for a bit error ratio of $10^{-12}$ by performing the C1-encoding and C2-encoding on a client signal after its bit rate is increased to a predetermined bit rate to convert the client signal into a super FEC signal.

When the encoding is performed once with the C1 code, the second clock rate conversion unit 219, second frame conversion unit 220, second encode processor unit 221 and third overhead insertion unit 222 may be removed in the configuration of FIG. 12 or 13 such that the previous and subsequent components are directly connected.

Alternatively, either one, or two, or three of the first overhead insertion unit 216, second overhead insertion unit 218 and third overhead insertion unit 222 may be removed in the configuration of FIG. 12 or 13 to make a direct connection. When the three units are all removed, a predetermined framing pattern is inserted in either the first encode processor unit 217 or the second encode processor unit 221.

(Fifteenth Embodiment)

Figure 14:
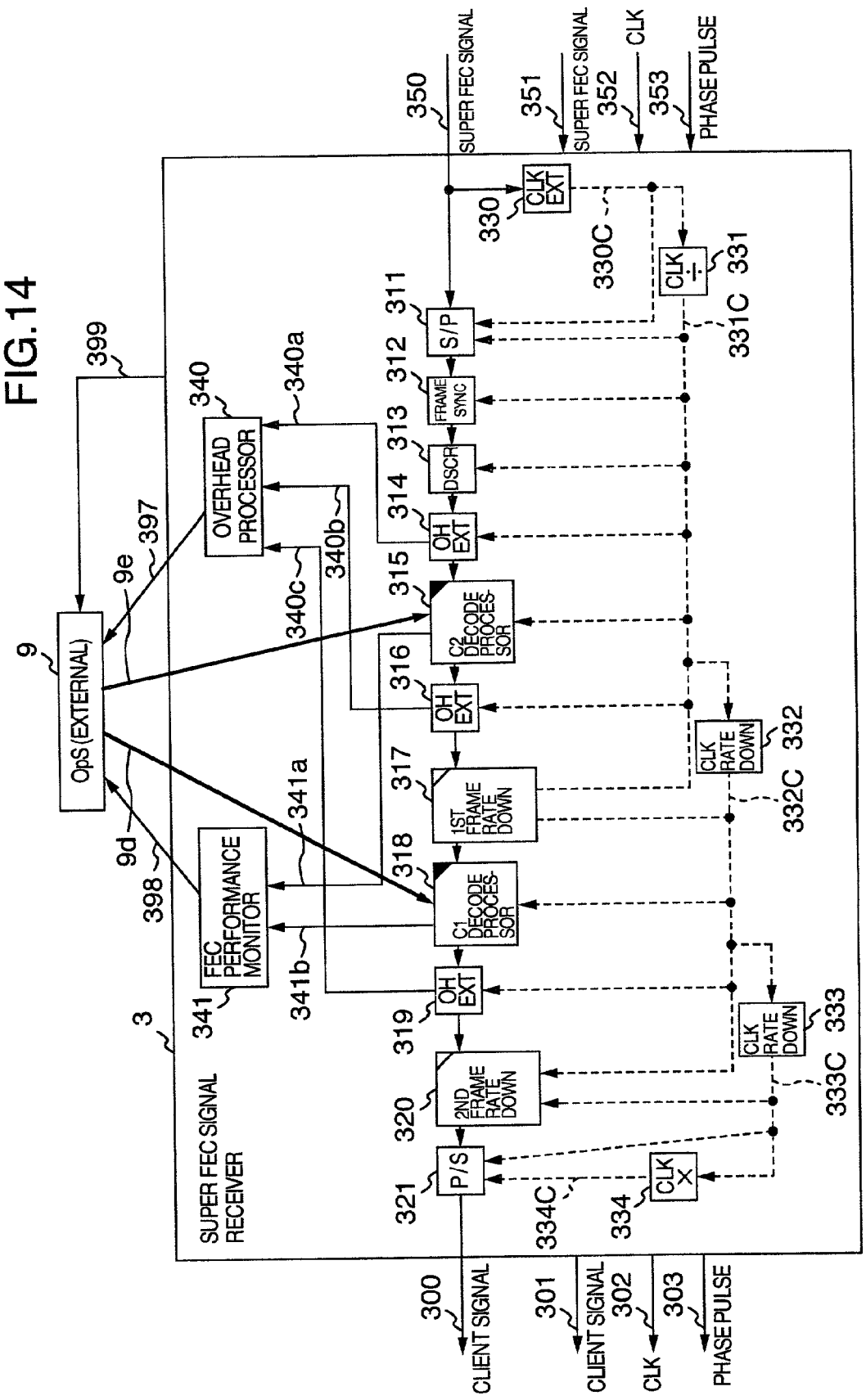
FIG. 14 is a block diagram illustrating the configuration of a super FEC signal receiver according to a fifteenth embodiment of the present invention.

FIG. 14 illustrates a super FEC signal receiver according to a fifteenth embodiment of the present invention. Here, FIG. 14 is a block diagram of the super FEC signal receiver.

The super FEC signal receiver 3 receives a super FEC signal 350, and outputs it as a client signal 300. A clock extraction unit 330 restores from the super FEC signal 350 a clock signal 330C having the same bit rate as the super FEC signal 350, and outputs the clock signal 330C.

A clock divider unit 331 divides the frequency of the clock signal 330C extracted in the clock extraction unit 330, for example, to be 1/Pr or 1/(8×Pr) of the original clock signal to generate a processing rate at the firs t stage in the super FEC signal receiver 3, and outputs the resulting clock signal as a clock signal 331C. Alternatively, the super FEC signal receiver 3 may receive a clock signal at a predetermined frequency from the outside as required, and synchronize this clock signal to the clock signal extracted in the clock extraction unit 330, using a PLL circuit or the like. The resulting signal may be outputted as the clock signal 331C.

Here, in the super FEC signal transmitter 2 illustrated in FIG. 12, which is the source of the super FEC signal 350, when the second frame conversion unit 220 converts the frame in accordance with the approach of case 1, Pr=Kr stands, and when in accordance with the approach of case 2, Pr=Nr stands. The former case is designated the "source case 1" and the latter case, the "source case 2."

A first clock conversion unit 332 reduces the frequency of the clock signal 331C from the clock divider unit 331 by a factor of (Pr/Nr) or $\{m/(m+\xi)\}$, and outputs the resulting clock signal as a first clock signal 332C. A second clock rate conversion unit 333 reduces the frequency of the first clock signal 332C from the first clock rate conversion unit 332 by a factor of (Kr/Nc), and outputs the resulting clock signal as a second clock signal 333C. A clock multiplier 334 multiplies the frequency of the second clock signal 333C from the second clock rate conversion unit 333 by an integer, for example, by Kr or (8×Kr), and outputs the resulting clock signal as a third clock signal 334C. Alternatively, a clock signal at a predetermined frequency may be received from the outside as required and used as the third clock signal 334C.

A serial/parallel conversion unit 311 parallellizes the received super FEC signal 350 in Pr stages every $\epsilon$ bytes such that the period and phase of one bit thereof are equal to those of the clock signal 331C, and outputs the parallel-lized super FEC signal. A frame synchronization unit 312 detects a predetermined framing pattern from the parallel data signal from the serial/parallel conversion unit 311, and rearranges the signal in a proper sequence to output a signal in the frame format shown in FIGS. 2, 4, 6, 7.

A descrambler 313 performs the reverse operation to that performed in the scrambler 224 in the super FEC signal transmitter 2 illustrated in FIG. 12, which is the source of the super FEC signal 350, on the parallel data signal from the frame synchronization unit 312, to restore the data before it was scrambled.

A first overhead extraction unit 314 extracts information at predetermined positions previously defined in the data signal from the descrambler 313, for example, at predetermined positions in the area 110C shown in FIGS. 2, 4, 6, 7, and then outputs the data signal as it is to a first decode processor unit 315 as well as outputs the extracted information 340a to an overhead processor unit 340.

The first decode processor unit 315 performs the C2 decoding described in the aforementioned embodiments on the output data signal from the first overhead extraction unit 314, and outputs the decoded data signal to a second overhead extraction unit 316 as well as outputs a C2 decoding result 341a (the number of corrected bits, an estimated number of uncorrectable bits if uncorrectable errors were found, and the number of error corrected bits when errors were corrected) to a FEC performance monitor unit 341. Here, the C2 decoding is performed on each of jm code subblocks 20-j (j=1, 2, . . . , mj), in a manner similar to the C2-encoding, such that the C2 decoding of a code subblock 20-2 is started after a code subblock 20-1 has been C2-decoded or while it is being C2-decoded. Then, each of the code subblocks 20-j is processed as they remain parallelly expanded in Kr stages or Nr stages. For example, in a syndrome calculation, parallelly inputted Kr bytes or Nr bytes may be subjected to the syndrome calculation, after performing a carry operation in accordance with the position of each byte or bit in the parallel sequence. For calculations intended to find an error locator polynomial (hereinafter abbreviated as "ELP") indicative of an error position and each polynomial coefficient of an error evaluator polynomial (hereinafter abbreviated as "EVP") indirectly indicative of an error value from the result of the syndrome calculation, a method using Euclidean mutual division is widely known. This method does depend on the parallel state of Kr bytes or Nr bytes. The error position calculation is performed by substituting an element of Galois field corresponding to a symbol position for an RS code and to a bit position for a BCH code into an ELP polynomial to determine whether or not an error exists at the symbol position or the bit position by examining whether or not the substitution results in "zero." Likewise, for the error value calculation, an element of Galois field corresponding to a symbol position or a bit position is substituted into an EVP polynomial or an ELP differential polynomial, and if an error is found at the symbol position or the bit position, the error value is calculated.

These error position and error value are calculated independently corresponding to a parallel position of each byte or bit in the Kr byte or Nr byte. In this event, the calculation may be made with a carry operation performed in accordance with each parallel position.

It is also possible to perform sequential decoding which involves correcting an error at a bit of interest and outputting the corrected bit while calculating the foregoing error position and error value for the bit, or to calculate error positions and error values for all bit positions and then correct errors at positions at which the errors are found and output the resulting error-free bits. Since the latter case can detect the irrationality of the ELP polynomial and EVP polynomial which is found when errors occur beyond the error correcting capability, erroneous corrections can be prevented.

It should be noted that the calculations of polynomial coefficients and error values for ELP and EVP require a division of Galois field, i.e., multiplication by an inverse element. As approaches for deriving an inverse element of Galois field, there are an approach for searching for an element which derives "1" as a result of a multiplication with an element of predetermined Galois field (called the "search approach"); an approach for deriving an inverse element by creating an original adjoint matrix of predetermined Galois field and calculating a reverse matrix or an upper triangle matrix or a lower triangle matrix (called the "matrix approach"); an approach for deriving an inverse element by previously storing inverse elements corresponding to all elements of Galois field and reading information corresponding to a predetermined element of Galois field from the memory (called the "memory approach"); and an approach for previously inputting all elements of Galois field in a selector and configuring the selector such that the selector selects and outputs an inverse element corresponding to a predetermined element of Galois field (called the "selector approach"). Any of these approaches may be used for deriving an inverse element.

Further, the calculation within the processor unit 315 may be performed at a higher speed, i.e., using a local clock which may be generated by multiplying the first clock signal 331C by a proper value.

Further, error positions and error values corresponding to a pattern of syndrome may be previously stored in a memory, such that the decoding may be performed directly by reading information in the memory corresponding to the result of a calculation of the syndrome.

When a code having a low correcting capability is used as the C2 code, polynomial coefficients of ELP and EVP may be previously found as an equation which includes the syndrome as a variable, so that the calculation can be simplified.

When the C2 code is a BCH code, the polynomial coefficient calculation and error value calculation for EVP are not required. Further, a delay time associated with the decoding can be reduced by using a code which has a short code length with a small m as the C2 code.

A second overhead extraction unit 316 extracts information at predetermined positions previously defined in a data signal from the first decode processor unit 315, for example, at predetermined positions in the area 110C shown in FIGS. 2, 4, 6, 7, and then outputs the data signal as it is to a first frame conversion unit 317 as well as outputs the extracted information 340b to the overhead processor unit 340.

In the transmission source case 1, the first frame conversion unit 317 increases the bit rate of each parallellized data signal from the second overhead extraction unit 316 by a factor of (Kr/Nr) or {m/(m+ξ)} using the timing of the first clock signal 332C from the first clock rate conversion unit 332, and places the original parallel data signal in the area 100 within the frame format as shown in FIGS. 1, 3, 5, and outputs the signal. In the transmission source case 2, in turn, the first frame conversion unit 317 deletes or terminates parallel signals corresponding to (Nr–Kr) stages, which form a check bit area for the C2 code of the data signal from the second overhead extraction unit 316, so as to prevent the parallel signal from propagating to respective processes subsequent thereto, and places the original parallel data signal in the area 100 within the frame format as shown in FIGS. 1, 3, 5, and outputs the signal.

A second decode processor unit 318 performs the C1 decoding described in the aforementioned embodiments on the output data signal from the first frame conversion unit 317, and outputs the decoded signal to a third overhead extraction unit 319 as well as outputs a C1 decoding result 341b (the number of corrected bits, an estimated number of uncorrectable bits if uncorrectable errors were found, and the number of error corrected bits when errors were corrected) to the FEC performance monitor unit 341. Here, the C1 decoding is performed, in a manner similar to the C1-encoding, independently and simultaneously on each of Kr code subblocks 10-$i$ ($i$=1, 2, ..., Kr). The processor unit 318 may be comprised of Kr C1 decode modules 318-MDJ-$i$ ($i$=1, 2, ..., Kr) which handle Kr code subblocks 10-$i$, respectively. Each of the C1 decode modules 318-MDJ-$i$ calculates a syndrome from input data, polynomial coefficients of ELP and EVP from the syndrome, and error positions and error values from the polynomial coefficients of ELP and EVP.

Here, the calculations of the polynomial coefficients of ELP and EVP from the syndrome may be shared by the respective C1 decode modules 318-MDJ-$i$. In this case, for example, the calculations may be performed for the respective code subblocks 10-$i$ in sequence such that after the polynomial coefficients of ELP and EVP have been calculated for a code subblock 10-1, the polynomial coefficients of ELP and EVP are calculated for a code subblock 10-2. Alternatively, the shared code subblocks may be divided by two into 10-1–10-$is$ ($is$<Kr) and 10-($is$+1)–10-Kr, or divided by four. Similar to the first decode processor unit 315, the calculations of polynomial coefficients and error values for ELP and EVP require a division of Galois field, i.e., multiplication by an inverse element, wherein the inverse element can be derived using any of the aforementioned search approach, matrix approach, memory approach and selector approach. Of course, the calculation within the processor unit 318 may be performed at a higher speed, i.e., using a local clock which may be generated by multiplying the second clock signal 332C by a proper value. Further, error positions and error values corresponding to a pattern of syndrome may be previously stored in a memory, such that the decoding may be performed directly by reading information in the memory corresponding to the result of the calculation of the syndrome. When the C1 code is a BCH code, the polynomial coefficient calculation and error value calculation for EVP are not required.

The third overhead extraction unit 319 extracts information at predetermined positions previously defined in the data signal from the second decode processor unit 318, for example, at predetermined positions in the area 110C shown in FIGS. 1, 3, 5, and then outputs the data signal as it is to a second frame conversion unit 320 as well as outputs the extracted information 340c to the overhead processor unit 340.

The second frame conversion unit 320 increases the bit rate of each parallellized data signal from the third overhead extraction unit 319 by a factor of (Kc/Nc) using the timing of the second clock signal 333C from the second clock rate conversion unit 333, and restores parallel data equivalent to that inputted to the first frame conversion unit 214 in the super FEC signal transmitter 2 illustrated in FIG. 12, which is the source of the super FEC signal 350.

A parallel/serial conversion unit 321 interleaves a parallel data signal in Kr stages from the second frame conversion unit 320 every δ bytes such that the period and phase of its one bit are equal to those of the third clock signal 334C to serialize the sequence of the bits, and outputs the serialized signal as a client signal 300.

In the manner described above, the outputted client signal 300 restores the client signal 200 received at the super FEC signal transmitter 2 illustrated in FIG. 12 which is the source of the super FEC signal 350.

The overhead processor unit 340 edits the overhead information 340a, 340b, 340c for OAM&P of a transmission network received from the first overhead extraction unit 314, second overhead extraction unit 316 and third overhead extraction unit 319, respectively, determines from the information whether or not the super FEC signal 350 is normal, monitors the performance quality such as a bit error ratio and the number of bit errors of the super FEC signal 350 to determine whether or not the super FEC signal 350 is degraded, or monitors an operating state and a maintenance state of a transmission network to notify the external control system 9 of PM information 397.

The FEC performance monitor unit 341 totalizes the respective decoding results from the C1 decoding result 341b and the C2 decoding result 341a received from the first decode processor unit 315 and the second decode processor unit 318, respectively, and notifies the external control system 9 of the respective decoding results and the total result as an FEC-PM result 398.

Among the foregoing components, each component from the frame synchronization unit 312 to the second overhead extraction unit 316 operates at the timing of the clock signal 331C. The second decode processor unit 318 and the third overhead extraction unit 319 operate at the timing of the clock signal 332C.

In the foregoing configuration, the super FEC signal receiver 3 may be controlled from the external control system 9. For example, the external control system 9 may control the first decode processor unit 315 and the second decode processor unit 318 to perform which of the methods 1B–4B described in the sixth embodiment; to determine whether or not the framing pattern area and the overhead area for OAM&P should be decoded, as described in the eleventh embodiment; and to determine whether or not the C1 decoding and C2 decoding are performed, as described in the twelfth embodiment, through control signals 9d, 9e. Further, if a faulty state such as an interrupted signal is detected in the super FEC signal 350, or if the super FEC signal receiver 3 presents a faulty operation, the external control system 9 may be supplied with an alarm 399 notifying the fault.

According to the fourteenth embodiment, it is possible to readily configure a super FEC receiver which generates a sufficient gain of 6 dB or more for a bit error ratio of $10^{-12}$ by performing C1-decoding on a super FEC signal after it has undergone C2-decoding to convert the super FEC signal into a client signal.

(Sixteenth Embodiment)

Figure 15:
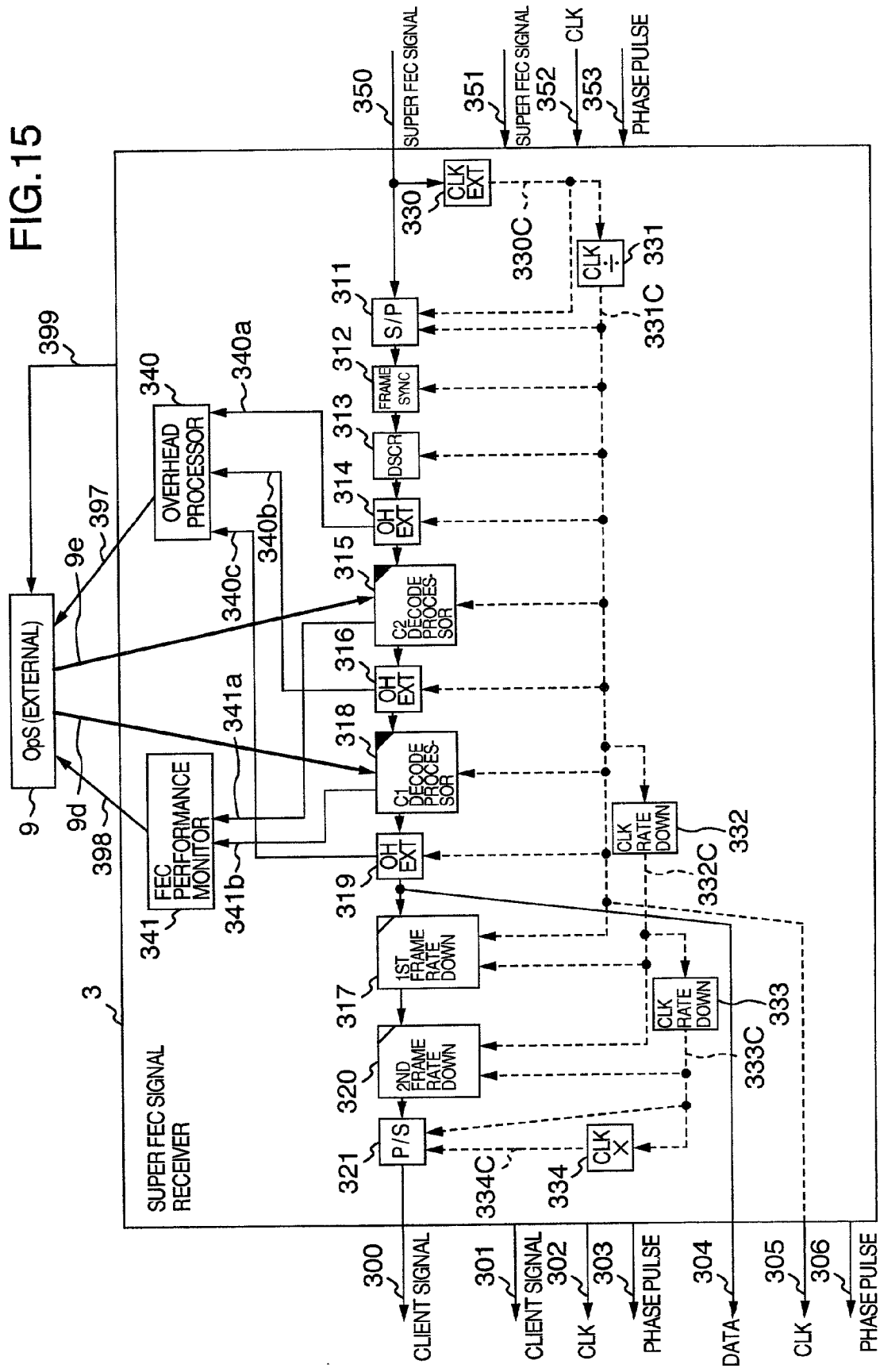
FIG. 15 is a block diagram illustrating the configuration of a super FEC signal receiver according to a sixteenth embodiment of the present invention.

FIG. 15 illustrates a super FEC signal receiver according to another embodiment of the present invention.

The super FEC signal receiver 3 of the sixteenth embodiment is similar in configuration and operation to the fifteenth embodiment illustrated in FIG. 14, except that a first frame conversion unit 317 is located adjacent to a second frame conversion unit 320; a first clock rate conversion unit 332 is located adjacent to a second clock rate conversion unit 333. Further, the super FEC signal receiver 3 of the sixteenth embodiment differs in that one of parallel data signals 304 branched from a third overhead extraction unit 319, a clock signal synchronized to the parallel data signal 304, i.e., one of clock signals 305 from the clock divider unit 331, and a phase pulse signal 306 indicative of the phase of the parallel data signal 304 are outputted to the outside of the super FEC signal receiver 3.

The first clock rate conversion unit 332, first frame conversion unit 317, and second clock rate conversion unit 333 are similar in operation to their counterparts in the fifteenth embodiment.

The second frame conversion unit 320 performs similar processing to its counterpart in the fifteenth embodiment on each parallel data signal from the first frame conversion unit 317. Further, in the transmission source case 1, the first frame conversion unit 317 can be removed, in which case, the bit rate of each of parallel data signals from the third overhead extraction unit 319 is directly increased by a factor of $\{(Kr/Nr) \times (Kc/Nc)\}$ or $\{(m/(m+\xi)) \times (Kc/Nc)\}$ using the timing of a second clock signal 333C from the second clock rate conversion unit 333 to restore parallel data equivalent to that inputted to the first frame conversion unit 214 in the super FEC signal transmitter 2 illustrated in FIG. 12, which is the source of a super FEC signal 350.

As to the operation in the remaining components, the sixteenth embodiment is similar to the fifteenth embodiment only except that the second decode processor unit 318 processes a data signal from the second overhead extraction unit 316.

According to the sixteenth embodiment, it is possible to readily configure a super FEC receiver which generates a sufficient gain by reducing the bit rate of a super FEC signal to a predetermined bit rate after the super FEC signal has been C2-decoded and C1-decoded to convert the super FEC signal into a client signal.

When the decoding is performed once with the C1 code, the first clock rate conversion unit 332, first frame conversion unit 317, first decode processor unit 315 and first overhead extraction unit 314 may be removed in the configuration of FIG. 14 or 15 such that the previous and subsequent components are directly connected.

Alternatively, each of the first overhead extraction unit 314, second overhead extraction unit 316 and third overhead extraction unit 319 may be removed, corresponding to the first overhead insertion unit 216, second overhead insertion unit 218 and third overhead insertion unit 222 in the super FEC signal transmitter 2 in FIG. 12, which is the source of the super FEC signal 350, to simply make a direct connection.

Further alternatively, in FIGS. 12 through 15, properly parallellized client signals 201, 301 may be used instead of the client signals 200, 300.

Together with the parallellized client signals 201, 301, clock signals 202, 302, which are synchronized with these signals 201, 301 and have a bit rate equal to the bit rate of these signals 201, 301, may be received and transmitted.

If the client signal 200 or the client signal 201 includes a freely usable empty area which accounts for at least a capacity corresponding to $\{(Nr \times Nc - Kr \times Kc)/(Nr/Nc)\}$ times or more the total data capacity thereof, the first frame conversion unit 214 and the second frame conversion unit 220 need not convert the bit rate, but only have to properly relocate data positions within the client signal 200 or the client signal 201.

When the data formats of the client signal 100 and the parallellized client signal 201 have previously been defined as shown in FIGS. 1 through 7 and all of the areas 110B, 110C, 120B, 120C are freely usable empty areas, the first frame conversion area 214 and the second frame conversion area 220 are not required. In this case, by inserting, separating and matching a predetermined diagnosis pattern at an arbitrary position in the areas 110B, 110C, 120B, 120C, it is possible to perform diagnosis related to signal transmission and reception between the source transmitter of the client signal 200 and the super FEC signal transmitter 2, or between the destination apparatus of the client signal 300 and the super FEC signal receiver 3. In addition, periodic phase pulse signals 203, 303 may also be received and transmitted for indicating predetermined positions in the data formats of the client signals 200, 300 and the parallellized client signals 201, 301.

Similarly, the super FEC signals 250, 350 may be parallellized super FEC signals 251, 351 which have been properly parallellized. Also, together with the parallellized super FEC signals 251, 351, clock signals 252, 352 synchronized with these signals and having a bit rate equal to the bit rate of these signals, and periodic phase pulse signals 253, 353 indicative of predetermined positions in the data formats of the super FEC signals 250, 350 and the parallellized super FEC signals 251, 351 may be received and transmitted.

The first encode processor unit 217 and the second encode processor unit 221, and the first decode processor unit 315 and the second decode processor unit 318 may be built in separate LSIs or FPGAs in which encoding/decoding logics are fixedly implemented, or in separate microprocessors which operate the respective logics implemented as software, respectively.

Alternatively, the two types of units may be implemented in one and the same LSI/FPGA, or in the same CPU which is installed with both software programs associated the respective units and operates the programs in time division.

(Seventeenth Embodiment)

Figure 16:
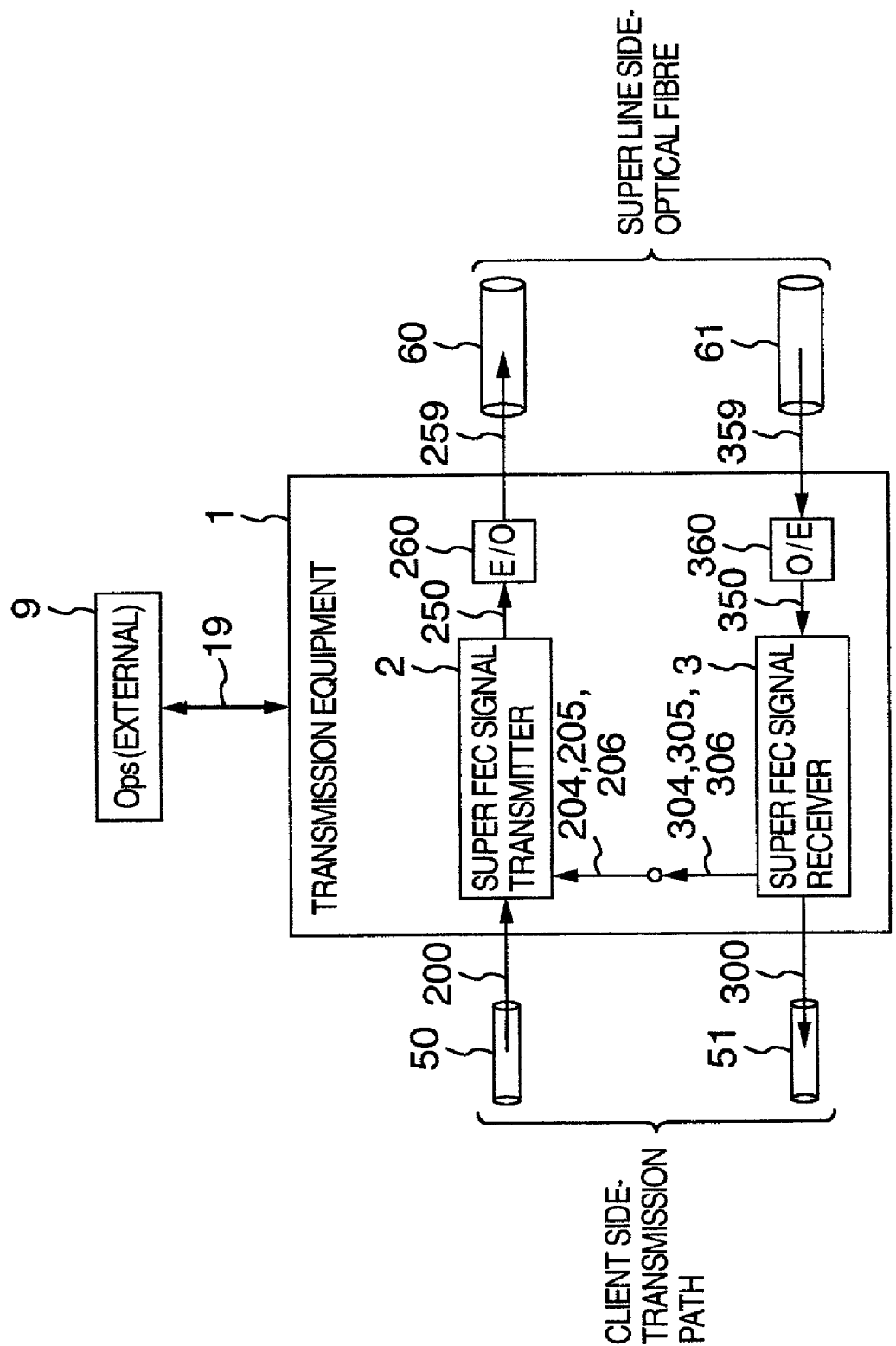
FIG. 16 is a block diagram illustrating the configuration of a transmitting apparatus according to a seventeenth embodiment of the present invention.

FIG. 16 illustrates a transmitting apparatus according to an embodiment of the present invention which employs one of the super FEC signal transmitters and one of the super FEC signal receivers described in the foregoing embodiments.

Specifically, the transmitting apparatus 1 of the seventeenth embodiment comprises the super FEC signal transmitter 2 illustrated in FIG. 13 and the super FEC signal receiver 3 illustrated in FIG. 15.

The super FEC signal transmitter 2 receives a client signal 200 from a transmission path 50 on the client side, converts the client signal 200 into a super FEC signal 250 which is outputted to an electro-optical conversion unit 260.

The electro-optical conversion unit 260 converts the super FEC signal 250 from the super FEC signal transmitter 2 to an optical signal 259 which has a waveform equivalent to that of the super FEC signal 250, a predetermined wavelength, and an optical power density, and outputs the optical signal 259 to an optical fiber transmission path 60 on the super line side.

An opto-electric conversion unit 360 receives an optical signal 359 from an optical fiber transmission path 61 on the super line side, converts the optical signal 359 to an electric signal having a waveform equivalent to that of the optical signal 359, and outputs the electric signal as a super FEC signal 350.

The super FEC signal receiver 3 converts a received super FEC signal 350 to a client signal 300 which is outputted to a transmission path 51 on the client side, and outputs a parallel data signal 304 after C1 decoding and C2 decoding, a clock signal 305 and a phase pulse signal 306 to a super FEC signal transmitter 2. This operation is designated the "operation mode A."

A different operation from the above, performed by the super FEC signal transmitter 2 in the following manner, is designated the "operation mode B."

Specifically, in the operation mode B, the super FEC signal transmitter 2 converts a parallel data signal 204, a clock signal 205 and a phase pulse signal 206 (connected to 304, 305, 306, respectively) received from the super FEC signal receiver 3 again to a super FEC signal 250 which is outputted to the electro-optical conversion unit 260. This operation is defined as the operation mode B.

The selection of the two types of operation mode may be made by fixed wiring on hardware or controlled by the external controller 9 through a monitor control line 19.

When the transmitting apparatus of this embodiment is operated in the operation mode A, conversions can be made bidirectionally between a client signal and a super FEC signal. On the other hand, when the transmitting apparatus is operated in the operation mode B, the super FEC signal can be regenerated.

Also, a client signal 300 from the super FEC signal receiver 3 may be branched such that one of branched signals is looped back to the super FEC signal transmitter 2, in which case the transmitting apparatus is operated in the operation mode A.

Alternatively, the super FEC signal transmitter 2 illustrated in FIG. 12 may be used instead of that illustrated in FIG. 13, and the super FEC signal receiver 3 illustrated in FIG. 14 may be used instead of that illustrated in FIG. 15. In this configuration, the transmitting apparatus operates only in the operation mode A.

According to the seventeenth embodiment, it is possible to configure the transmitting apparatus which is capable of converting a client signal into a super FEC signal for transmission, or regenerating and transmitting a super FEC signal.

(Eighteenth Embodiment)

Figure 17:
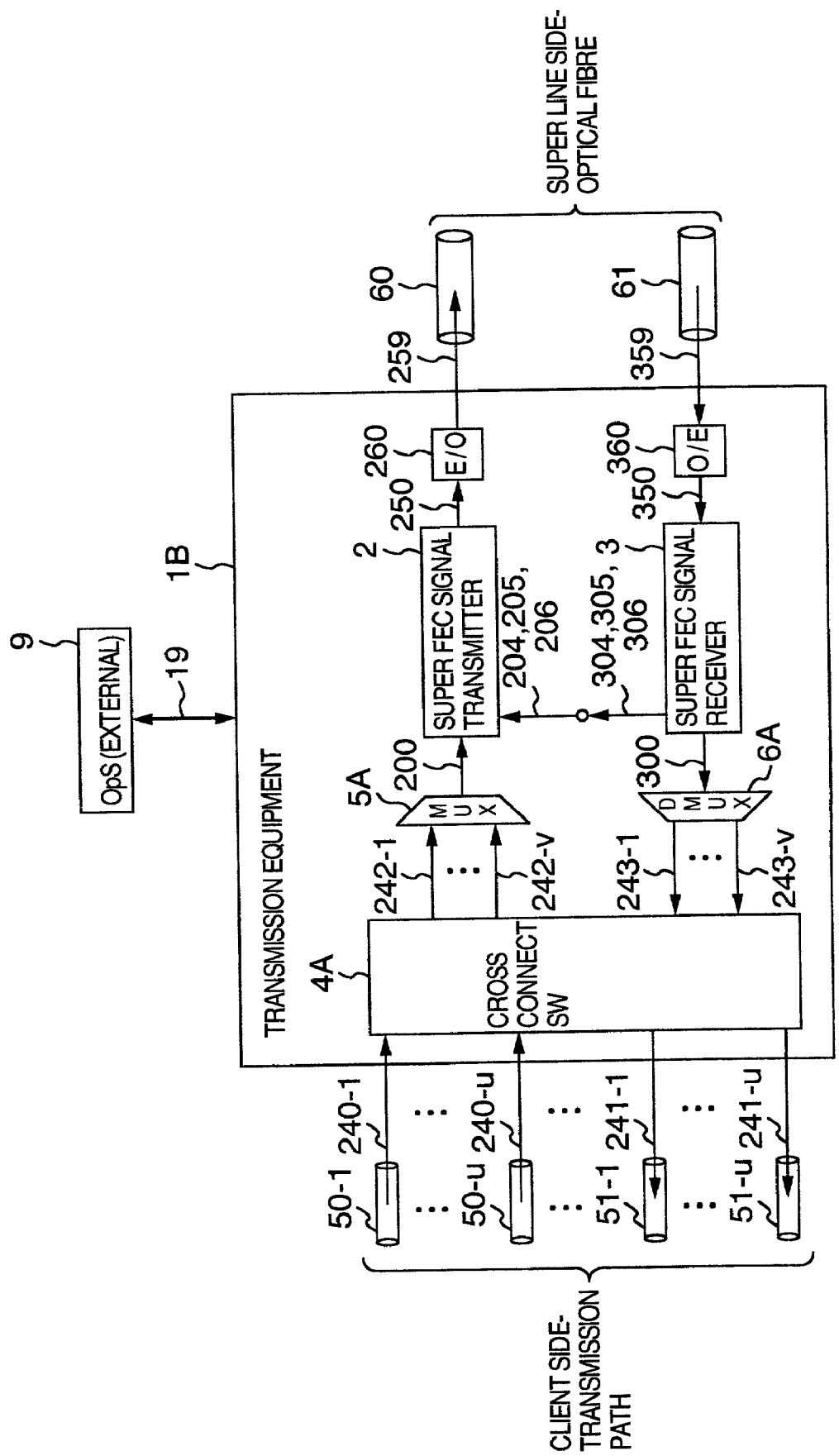
FIG. 17 is a block diagram illustrating the configuration of a transmitting apparatus according to an eighteenth embodiment of the present invention.

FIG. 17 illustrates a transmitting apparatus according to another embodiment of the present invention which employs one of the super FEC signal transmitters and one of the super FEC signal receivers described in the aforementioned embodiments.

The transmitting apparatus 1B according to the eighteenth embodiment differs from the seventeenth embodiment in that a first cross-connect switch 4A, a first multiplexing unit 5A, and a first demultiplexing unit 6A are added to the configuration of the seventeenth embodiment.

The first cross-connect switch unit 4A independently cross-connects/branches a plurality of inputted subclient signals 240-$i$ ($i=1, 2, \ldots, u$) and a plurality of intermediate client signals 243-$j$ ($j=1, 2, \ldots, v$), and outputs as a plurality of subclient signals 241-$i$ ($i=1, 2, \ldots, u$) and a plurality of intermediate client signals 242-$j$ ($j=1, 2, \ldots, v$).

The first multiplexing unit 5A time division multiplexes the intermediate client signals 242-$j$ ($j=1, 2, \ldots, v$) from the first cross-connect switch unit 4A, and outputs the multiplexed signal to the super FEC signal transmitter 2 as a client signal 200.

The first demultiplexing unit 6A demultiplexes the client signal 300 from the super FEC signal receiver 3 into intermediate client signals 243-$j$ ($j=1, 2, \ldots, v$) which are then outputted to the first cross-connect switch unit 4A.

The remaining components are similar to their respective counterparts in the seventeenth embodiment. Alternatively, the super FEC signal transmitter illustrated in FIG. 12 may be used instead of that illustrated in FIG. 13, and the super FEC signal receiver 3 illustrated in FIG. 14 may be used instead of that illustrated in FIG. 15.

According to the eighteenth embodiment, it is possible to configure the transmitting apparatus which is capable of converting a plurality of subclient signals into a super FEC signal for transmission, or regenerating and transmitting a super FEC signal.

(Nineteenth Embodiment)

Figure 18:
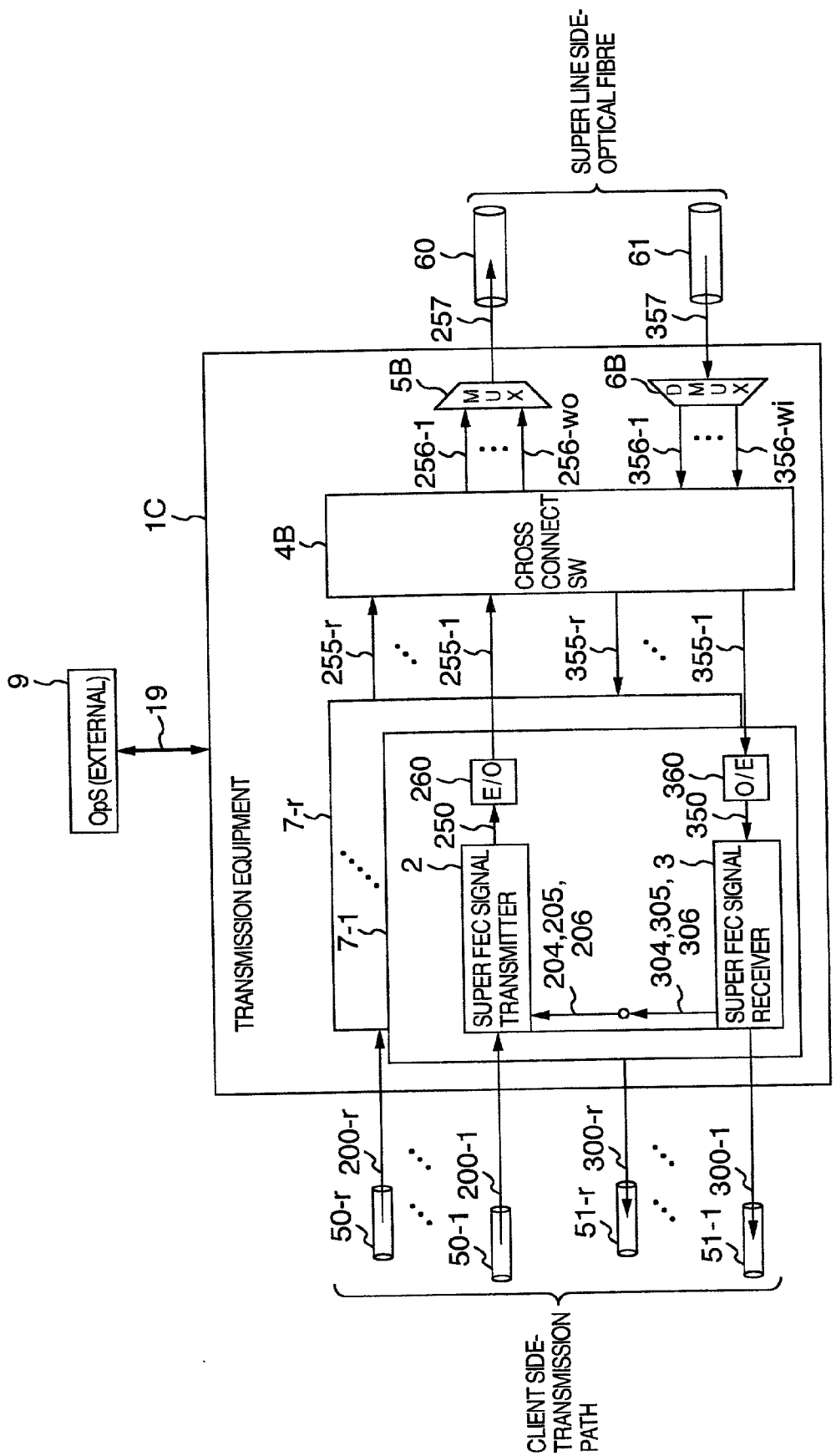
FIG. 18 is a block diagram illustrating the configuration of a transmitting apparatus according to a nineteenth embodiment of the present invention.

FIG. 18 illustrates a transmitting apparatus according to another embodiment of the present invention which employs one of the super FEC signal transmitters and one of the super FEC signal receivers described in the aforementioned embodiments.

The transmitting apparatus 1C according to the nineteenth embodiment differs from the aforementioned transmitting apparatus 1, 1B in that it uses a plurality of the configurations of the seventeenth embodiment or the eighteenth embodiment, and a second cross-connect switch unit 4B, a second multiplexing unit 5B and a second demultiplexing unit 6B are further added.

Each of r client/super FEC conversion units 7-$k$ ($k=1, 2, \ldots, r$) is similar in configuration to the transmitting apparatus 1A illustrated in FIG. 16 or the transmitting apparatus 1B illustrated in FIG. 17. These client/super FEC conversion units 7-$k$ operate independently of one another. Specifically, the client/super FEC conversion units 7-$k$ convert client signals 200-$k$ into optical signals 255-$k$ which carry super FEC signals, and convert optical signals 355-$k$ which carry super FEC signals into client signals 300-$k$.

The second cross-connect switch 4B independently cross-connects/branches r optical signals 255-$a$ ($a=1, 2, \ldots, r$) inputted from the r client/super FEC conversion units 7-$k$ ($k=1, 2, \ldots, r$), and wi optical signals 356-$b$ ($b=1, 2, \ldots, $ wi) inputted from the second demultiplexing unit 6B, and outputs the resulting optical signals as r optical signals 355-$c$ ($c=1, 2, \ldots, r$) and wo optical signals 256-$d$ ($d=1, 2, \ldots, $ wo).

The second multiplexing unit 5B wavelength division multiplexes the wo optical signals 256-$d$ ($d=1, 2, \ldots, $ wo) from the second cross-connect switch unit 4B, and outputs the resulting signal to a transmission path 60 on the super line side as a wavelength multiplexed signal 257.

The second demultiplexing unit 6B demultiplexes a wavelength multiplexed signal 357 received from a transmission path 61 on the super line side at each wavelength to generate wi optical signals 356-$b$ ($b=1, 2, \ldots, $ wi) which are outputted to the second cross-connect switch unit 4B.

Here, the client/super FEC conversion units 7-$k$ ($k=1, 2, \ldots, r$) and the second cross-connect switch unit 4B are adjusted such that the wo optical signals 256-$d$ ($d=1, 2, \ldots, $ wo) have the wavelengths of light different from one another. Specifically, the wavelengths are adjusted either by assigning different wavelengths to the wo optical signals 256-$d$ in the former or by converting the wavelengths in the latter, or by performing both expedients.

When the second cross-connect switch unit 4B internally performs electric signal processing, and an interface is adapted for optical signal processing, the inputted r optical signals 255-$a$ ($a=1, 2, \ldots, r$) and wi optical signals 356-$b$ ($b=1, 2, \ldots, $ wi) may be converted into electric signals which are then cross-connected/branched and again converted into r optical signals 355-$c$ ($c=1, 2, \ldots, r$) and wo optical signals 256-$d$ ($d=1, 2, \ldots, $ wo) which may be eventually outputted from the second cross-connect switch unit 4B.

In the above configuration, electric signals may be communicated between the second cross-connect switch unit 4B and the client/super FEC conversion units 7-$k$ ($k=1, 2, \ldots, r$). In this event, the electro-optical conversion unit 260 and the opto-electric conversion units 360 are not required in each of the client-super FEC conversion units 7-$k$, and electro-optical conversions and opto-electric conversions may be performed on the super line side of the cross-connect switch unit 4B, i.e., toward the wo optical signals 256-$d$ ($d=1, 2, \ldots, $ wo) and the wi optical signals 356-$b$ ($b=1, 2, \ldots, $ wi).

Also, in the nineteenth embodiment, the second multiplexing unit 5B and the second demultiplexing unit 6B may be adapted to time division multiplexing and time division demultiplexing, respectively, instead of wavelength division multiplexing and wavelength division demultiplexing. In this configuration, r optical signals 255-$a$ ($a=1, 2, \ldots, r$), wi optical signals 356-$b$ ($b=1, 2, \ldots, $ wi), r optical signals 355-$c$ ($c=1, 2, \ldots, r$) and wo optical signals 256-$d$ ($d=1, 2, \ldots, $ wo) may be replaced with respective electric signals corresponding thereto. Of course, in this case, the client/super FEC conversion unit 7-$k$ ($k=1, 2, \ldots, r$) and the second cross-connect switch unit 4B do not require the function of converting electric signals into optical signals and vice versa. Then, the second multiplexing unit 5B time division multiplexes wo electric signals 256-$d$ ($d=1, 2, \ldots, $ wo), converts the multiplexed electric signal into an optical signal 257, and outputs the optical signal 257. The second demultiplexing unit 6B in turn converts an optical signal 357 into an electric signal, time division demultiplexes the electric signal to generate wi electric signals 356-$b$ ($b=1, 2, \ldots, $ wi), and outputs the wi electric signals 356-$b$.

(Twentieth Embodiment)

Figure 19:
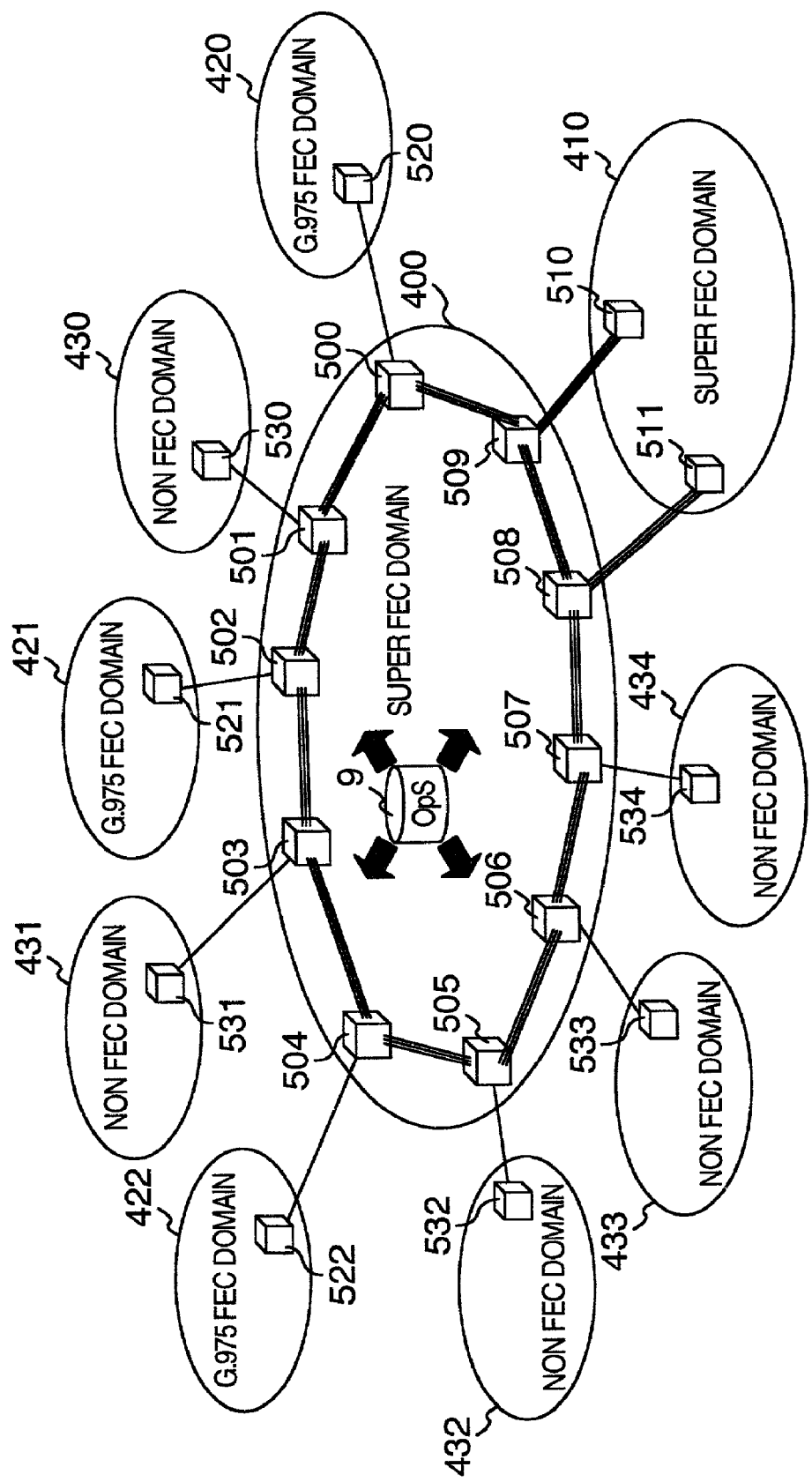
FIG. 19 is a diagram illustrating a network topology according to a twentieth embodiment of the present invention.

FIG. 19 illustrates a network topology according to an embodiment of the present invention which employs one of the transmitting apparatus described in the aforementioned embodiments.

A super FEC domain 400, which is a network for internally processing a super FEC signal received through an optical fiber or an electric transmission path and transmitting the processed signal, comprises network elements 500–509 similar to the transmitters in the aforementioned embodiments; optical fibers or electric transmission paths for interconnecting these network elements; and an operating system 9 for controlling the network elements 500–509 and executing OAM&P of the domain 400.

A super FEC domain 410, which is a network for internally processing a super FEC signal received through an optical fiber or an electric transmission path and transmitting the processed signal, connects each of network elements 510, 511 to the network elements 509, 508 in the super FEC domain 400, respectively. For example, an optical fiber or an electric transmission path is used for a connection between the network elements 508, 511 to communicate super FEC signals both from the network element 508 to 511 and from the network element 511 to 508 in the opposite direction. Here, the network elements 510, 511 are also similar to the transmitting apparatus in the aforementioned embodiments.

G.975 FEC domains 420–422, which are networks for internally processing signals defined in ITU-T Recommendation G.975 (hereinafter called the "G.975 signal") received through transmission paths and transmitting processed signals, connect associated network elements 520–522 to the network elements 500, 502, 504 in the super FEC domain 400, respectively. For example, an optical fiber or an electric transmission path is used for a connection between the network elements 500, 520 to communicate G.975 defined signals both from the network element 500 to 520 and from the network element 520 to 500 in the opposite direction.

Non-FEC domains 430–434 are networks for internally processing arbitrary digital signals received through transmission paths and transmitting processed signals, wherein the digital signals are not the G.975 signals nor super FEC signals. Then, the non-FEC domains 430–434 connect associated network elements 530–534 to the network elements 501, 503, 505–507 in the super FEC domain 400, respectively. For example, an optical fiber or an electric transmission path is used for a connection between the network elements 503 and 531 to communicate signals in the same format as those in the non-FEC domain (called the "non-FEC signal") both from the network element 503 to 531 and from the network element 531 to 503 in the opposite direction. Further, when the network element 530 in the non-FEC domain 430 comprises an interface for handling a signal defined in the above-cited G.975, the G975 signal may be communicated from the network element 501 to 530 and from the network element 530 to 501 in the opposite direction.

In the network configured as described above, the network elements 500–509 in the super FEC domain 400 handle signals communicated among the external super FEC domain 410, G.975 FEC domains 420–422, and non-FEC domains 430–434 as client signals, and perform the conversion between a client signal and the super FEC signal, multiplexing, demultiplexing, regenerating, cross-connect switching, and notification of a variety of information for OAM&P of the network to the operating system 9.

The operating system 9 executes OAM&P of the super FEC domain 400 based on a variety of information for OAM&P notified from the respective network elements 500–509, and information which is set by the operator. Further, the operating system 9 controls the respective network elements 500–509 to execute appropriate operations in accordance with the type of client signals, controls multiplexing, demultiplexing, regenerating, and cross-connection switching between super FEC signals and between client signals, and also controls protection switching and restoration switching between super FEC signals, as the case may be.

FIG. 19 shows that a cable connecting between network elements for transmitting a super FEC signal is indicated by a set of three lines; a cable for transmitting a G.975 signal by a solid line; and a cable for transmitting a non-FEC signal by a broken line.

A connection cable between network elements is not necessarily one, but two cables or a plurality of arbitrary cables may be routed corresponding to transmission directions of signals communicated therethrough.

In another way, the network topology within the super FEC domain 400 may not be the ring connection as illustrated in FIG. 19, but may be, for example, a linear connection suitable for one-to-one communication, a mesh connection, a star connection, or a combination of these connections.

According to the twentieth embodiment, it is possible to readily configure a wide area network which converts a variety of client signal from a variety of existing networks, which are regarded as local area networks, into super FEC signals for transmission over a long distance, and to configure a network which exhibits a good compatibility with existing networks that handle G.975 signals.

With the use of the method for encoding an error correcting code according to the present invention, it is possible to readily encode an error correcting code which has a sufficient gain of 6 dB or more for a bit error ratio of $10^{-12}$ and is suitable for maintaining an original transmission distance when the degree of time division multiplexing for an optical signal is increased, for maximizing a transmission distance for a mixture of optical signals at different bit rates under the wavelength division multiplexing, and for increasing a regenerator interval on condition that the degree of time division multiplexing is not changed, and an error correcting code which has a higher gain while ensuring a mutual connectivity with an existing transmission network which introduces an 8-error-correcting Reed-Solomon code. Further, with the use of the super FEC signal transmitter/receiver according to the present invention, it is possible to readily realize a transmitting apparatus and a network which have the above-mentioned characteristics.

We claim:

1. A method for encoding an error correcting code for providing an error correcting code to a client signal having a fixed bit rate, said method comprising the steps of:

repeatedly parallelizing said client signal to B systems every A bits to generate B parallelized client signals;

segmenting said B parallelized client signals every C bits to create B parallelized client blocks;

increasing a bit rate of each of said B parallelized client blocks by a factor of D to increase a length of each said parallelized client block from C bits to E bits to create B outer code subblocks;

placing information of said parallelized client blocks in second bit to a (C+1)th bit in each of said B outer code subblocks or a time series basis, leaving a first bit and a (C+2)th bit to an E-th bit as an empty area created by increasing the bit rate, assigning a first bit of said empty area as an overhead area, and an area from a (C+2)th bit to the E-th bit of said empty area as a check bit are for an outer code; and encoding each of said B outer code subblocks independently with an outer code Λ, and placing check bits thereof in said check bit area for the outer code to create B outer encoded subblocks, wherein said A, B, C and E are predetermined integer values, and said D is a predetermined value.

2. A method or encoding an error coding code according to claim 1, further comprising the steps of:

increasing a bit rate of each of said B outer encoded subblocks by a factor of R to create B intermediate subblocks;

allocating an empty area comprised of Q consecutive bits created by increasing the bit rate in every P consecutive bits of an inner code information area in each of said B intermediate subblocks, placing information of said outer encoded subblocks in said inner code information area, and assigning said Q bits of the empty area as a check bit area for an inner code;

segmenting each of said B intermediate subblocks every (P+Q) bits corresponding to said inner code information area and said check bit area for the inner code, collecting a number of segmented (P+Q) bits corresponding to said B intermediate subblocks to create a single inner code subblock;

segmenting again said B intermediate subblocks into J of said inner code subblocks;

encoding each of said J inner code subblocks independently with an inner code Ψ, placing check bits thereof in said check bit area for the inner code to create J inner encoded subblocks;

inserting a framing pattern indicative of starting positions of said outer coded subblocks and said inner coded subblocks, and a plurality of information for OAM& P of a network into said overhead area;

regarding said J inner encoded subblock as a single inner encoded block;

performing predetermined scrambling on said inner encoded block to create a scrambled inner coded block; and interleaving every L consecutive bits from each of G parallel signals in said scrambled inner encoded block to generate a single serial super FEC signal having a bit rate (D×R) times as high as that of said client signal, wherein said P and Q are predetermined integer values and said D R is a predetermined value.

3. A method for encoding an error correcting code according to claim 2, wherein:

said A is set to 1; said B is set to 128; said C is set to 238; said D is set to 15/14; said E is set to 255; said J is set to 19; said L is set to 1; said P is set to 112; said Q is set to 8; and said R is set to 15/14;

said outer code Λ comprises either an eight-error-correcting Reed-Solomon code on Galois field, or an eleven-error-correcting shortened BCH code based on Galois field; and said inner code Ψ comprises either an eight-error-correcting shortened Reed-Solomon code on Galois field, or an eleven-error-correcting shortened BCH code based on Galois field.

4. A method for encoding an error correcting code according to claim 2, wherein:

a capacity equal to or more than a capacity of said client signal multiplied by $\{1-(1/D/R)\}$ is an empty area which can be freely used;

a portion or the entirety of said empty area is regarded as the check bit area for the outer code, the check bit area for the inner code, and said overhead area, without converting the bit rates of said client signal and said super FEC signal; and data of said client signal and said FEC signal are placed at predetermined positions to create said outer code subblock and said inner code subblock, or said outer encoded subblock and said inner encoded subblock.

5. A method for encoding an error correcting code according to claim 2, wherein:

said super FEC signal is generated by:

regarding, as a single column, (G×R) bits or (B×R) bits comprised of a number of parallel columns of R temporally synchronized consecutive bits in each of said J inner coda subblocks;

extracting a total of J columns, one from each of said J inner code subblocks, and arranging said columns successively on a time series basis;

repeatedly performing said rearrangement on all columns in said J inner code subblocks; and newly encoding said rearranged inner code subblocks with said inner code Ψ as J inner code subblocks, or extracting a total of J columns, one from each of said J inner encoded subblocks after encoded with said inner code Ψ, and arranging said columns successively on a time series basis;

repeatedly performing said rearrangement on all columns in said J inner code subblocks; and assigning said rearranged inner code subblocks newly as J inner encoded subblocks.

6. A method for encoding an error correcting code according to claim 1, wherein:

said client signal is any of:

an SDH signal defined in ITU-T Recommendation G.707, and SONET signal defined in ANSI Recommendation T1.105;

a signal error-correction-encoded using an eight-error-correcting Reed-Solomon code on Galois field defined in ITU-T Recommendation G.975;

a signal on an OCh layer defined in ITU-T Recommendation G.872;

any of 1000 Base-SX, 1000 Base-LX and 1000 Base-CX signals defined in IEEE standard 802.3z; and a signal generated by time division multiplexing said above signals in an arbitrary manner.

7. A method for encoding an error correcting code according to claim 1, wherein:

an integer value Kr is set to one of 16, 32 or 64;

said client signal comprises an OC-192 signal of SONET defined in ANSI Recommendation T1.105, or an STM-64 signal of SDH defined in ITU-T Recommendation G.707; and said outer code Λ comprises an eight-error-correcting Reed-Solomon code on Galois field.

8. A method for encoding an error correcting code according to claim 1, wherein said client signal is a signal generated by terminating an 8B10B code of a digital signal encoded using an 8B10B code defined in IEEE standard 802.3z, and reducing a bit rate thereof in an appropriate ratio with respect to the bit rate before the 8B10B code termination, or a signal generated by terminating the 8B10B code and maintaining a bit rate thereof.

9. A method for encoding an error correcting code according to claim 1, further comprising the steps of:
adding F empty blocks to said B outer encoded subblocks, said empty block having the same length as said outer encoded subblock, to create a total of G intermediate subblocks;
assigning an area of said F empty blocks as a check bit area for an inner code;
segmenting each of said G intermediate subblocks every H bits, and collecting an amount of the segmented H bits corresponding to said G intermediate subblocks to create one inner code subblock;
segmenting again said G intermediate sub-blocks into J of said inner code subblocks;
encoding each of said J inner code subblocks independently with an inner code $\Psi$, placing check bits thereof in said check bit area for the inner code to create J inner encoded subblocks;
inserting a framing pattern indicative of starting positions of said outer encoded subblocks and said inner coded subblocks, and a plurality of information for OAM&P of a network into said overhead area;
regarding said J inner subblocks as a single inner encoded block,
performing predetermined scrambling on said inner encoded block to create a scrambled inner coded block; and
interleaving every L consecutive bits from each of G parallel signals in said scrambled inner encoded block to generate a single serial super FEC signal having a bit rate (D×G/B) times as high as that of said client signal,
wherein said F, G, H, J, L are predetermined integer values.

10. A method for encoding an error correcting code according to claim 9, wherein:
said A is set to 1; said B is set to 128; said C is set to 238; said D is set to 15/14; said E is set to 255; sand F is set to 16; said G is set to 144; said H is set to 1; said J is set to 255; and said L is set to 1;
said outer code $\Lambda$ comprises either an eight-error-correcting Reed-Solomon code on Galois field, or an eleven-error-correcting shortened BCH code based on Galois field; and
said inner code $\Psi$ comprises either a single-error-correcting shortened Reed-Solomon code on Galois field, or a double-error-correcting shortened BCH code based on Galois field.

11. A method for encoding an error correcting code according to claim 9, wherein:
said A is set to 1; said B is set to 112; said C is set to 238; said D is set to 15/14; said E is set to 255; said F is set to 16; said G is set to 128; said H is set to 1; said J is set to 255; and said L is set to 1;
said outer code $\Lambda$ comprises either an eight-error-correcting Reed-Solomon code on Galois field, or an eleven-error-correcting shortened BCH code based on Galois field; and
said inner code $\Psi$ comprises either a single-error-correcting shortened Reed-Solomon code on Galois field, or a double-error-correcting shortened BCH code based on Galois field.

12. A method for encoding an error correcting code according to claim 9, wherein:
said client signal is converted into said super FEC signal by first encoding each of said J inner code subblocks with said inner code $\Psi$, and encoding each of said G intermediate subblocks or said B intermediate subblocks with said outer code $\Lambda$; and
said super FEC signal is converted into said client signal by first decoding each of said G intermediate subblocks or said B intermediate subblocks with said outer code $\Lambda$, and decoding each of said J inner encoded subblocks with said inner code $\Psi$ to exchange the order of said encoding and said decoding with said inner code $\Psi$ and said outer code $\Lambda$.

13. A method for encoding an error correcting code according to claim 9, wherein:
when said J inner code subblocks are encoded with said inner code $\Psi$, a check bit of each of said inner code subblocks is placed in a cheek bit area of an inner code subblock subsequent thereto; and
when said J inner encoded subblocks are decoded with said inner code $\Psi$, decoding processing is performed on the assumption that a check bit of each of said inner encoded subblocks is placed in an inner encoded subblock subsequent thereto.

14. A method for encoding an error correcting code according to claim 9, wherein:
said client signal is a code encoded with the same code $\Phi$ as said outer code $\Lambda$;
said client signal is converted into said super FEC signal by:
converting a bit rate of said client signal to a predetermined bit rate, and encoding said client signal with said inner code $\Psi$ to generate said super FEC signal; or
once decoding said client signal with said code $\Phi$, converting a bit rate of said client signal to a predetermined bit rate, and encoding said client signal with said inner code $\Psi$ to generate said super FEC signal; or
once decoding said client signal with said code $\Phi$, again encoding said client signal with said outer code $\Lambda$, converting a bit rite of said client signal to a predetermined bit rate, and encoding said client signal with said inner code $\Psi$ to generate said super FEC signal; or
converting a bit rate of said client signal to a predetermined bit rate, encoding said client signal with said outer code $\Lambda$, and encoding said client signal with said inner code $\Psi$ to generate said super FEC signal, and
said super FEC signal is converted into said client signal by:
decoding said super FEC signal with said inner code $\Psi$, and converting a bit rate of said super FEC signal to a predetermined bit rate to generate said client signal; or
decoding said super FEC signal with said inner code $\Psi$, converting a bit rate of said super FEC signal to a predetermined bit rate, and decoding said super FEC signal with said outer code $\Lambda$ to generate said client signal; or
decoding said super FEC signal with said inner code $\Psi$, subsequently converting a bit rate of said super FEC signal to a predetermined bit rate, once decoding said super FEC signal with said outer code $\Lambda$, and subsequently assigning said super FEC signal once encoded with said code $\Phi$ as said client signal, or
decoding said super FEC signal with said inner code $\Psi$ and said outer code $\Lambda$, and converting a bit rate of said super FEC signal to a predetermined bit rate to generate said client signal.

15. A method for encoding an error correcting code according to claim 14 wherein:
said A as set to 1; said C is set to 238; and said E is set to 255, said outer code Λ comprises an eight-error-correcting Reed-Solomon code on Galois field; and said client signal comprises a signal error-correction-encoded using an eight-error correcting Reed-Solomon code on Galois filed defined in ITU-T Recommendation G.975.

16. A method for encoding an error correcting code according to claim 14, wherein:

when said client signal is converted into said super FEC signal, inserting information indicating which of said four types of conversions has been performed at a predetermined FSI byte position into said overhead area of said super FEC signal; and when said super FEC signal is converted into said client signal in an opposite way, extracting information at a predetermined FSI byte position in said overhead area of said super FEC signal, and determining based on the extracted information which of said four types of conversions is performed.

17. A method for encoding an error correcting code according to claim 9, wherein:

when said client signal is converted into said super FEC signal, inserting information indicating whether or not said client signal was encoded with said outer code Λ and said inner code Ψ at a predetermined FSIC byte position in said overhead area of said super FEC signal; and when said super FEC signal is converted into said client signal in an opposite way, extracting information at a predetermined FSIC byte position in said overhead area of said super FEC signal, and determining based on the extracted information whether or not said super FEC signal is decoded with said inner code Ψ, and whether or not said FEC signal is decoded with said outer code Λ.

18. A method far encoding an error correcting code according to claim 9, wherein:

said super FEC signal is generated by:

grouping every S outer encoded subblocks from among said B outer encoded subblocks, and shifting groups of said S outer encoded subblocks by a constant time interval from one another to newly generate B outer encoded subblocks, or grouping every S parallel signals from among said G or B parallel signals in said inner encoded blocks, and shifting groups of said S parallel signals by constant time interval from one another to newly generate inner encoded blocks, wherein S is an integer value.

19. A method for encoding an error correcting code according to claim 2, wherein:

a capacity equal to or more than a capacity of said client signal multiplied by {1−(B/D/G)} is an empty area which can be freely used;

a portion or the entirety of said empty area is regarded as the check bit area for the outer code, the check bit area for the inner code, and said overhead area, without converting the bit rates of said client signal and said super FEC signal; and data of said client signal and said FEC signal are placed at predetermined positions to create said outer code subblock and said inner code subblock, or said outer encoded subblock and said inner encoded subblock.

20. A method for encoding an error correcting code a cording to claim 9, wherein:

when said client signal is converted into said super FEC signal, information indicating whether or not said overhead area was included in the decoding processing involved in the encoding with said outer code Λ and said inner code Ψ is inserted at a predetermined FSIB byte position in said overhead area of said super FEC signal; and when said super FEC signal is converted into said client signal in an opposite way, information at a predetermined FSIB byte position in said overhead area of said super FEC signal is extracted to determine based on the extracted information whether or not said overhead is included in the decoding processing involved in the decoding with said inner code Ψ and said outer code Λ.

* * * * *